(12) United States Patent
Kilfoyle et al.

(10) Patent No.: US 7,061,891 B1
(45) Date of Patent: Jun. 13, 2006

(54) METHOD AND SYSTEM FOR A REMOTE DOWNLINK TRANSMITTER FOR INCREASING THE CAPACITY AND DOWNLINK CAPABILITY OF A MULTIPLE ACCESS INTERFERENCE LIMITED SPREAD-SPECTRUM WIRELESS NETWORK

(75) Inventors: Daniel B. Kilfoyle, Falmouth, MA (US); Travis H. Slocumb, III, Washington, DC (US); Steven Carson, Washington, DC (US)

(73) Assignee: Science Applications International Corporation, San Diego, CA (US)

( * ) Notice: Subject to any disclaimer, the term of this patent is extended or adjusted under 35 U.S.C. 154(b) by 886 days.

(21) Appl. No.: 09/953,157

(22) Filed: Sep. 17, 2001

Related U.S. Application Data

(63) Continuation-in-part of application No. 09/773,667, filed on Feb. 2, 2001.

(51) Int. Cl.
    *H04B 7/216* (2006.01)
(52) U.S. Cl. ........................ 370/335; 370/401
(58) Field of Classification Search ................ 370/328, 370/329, 331, 335, 338, 342, 431, 465, 401
    See application file for complete search history.

(56) References Cited

U.S. PATENT DOCUMENTS

| | | | |
|---|---|---|---|
| 4,901,307 A | 2/1990 | Gilhousen et al. ............ 370/18 |
| 5,152,002 A | 9/1992 | Leslie et al. ................ 455/11.1 |
| 5,187,806 A | 2/1993 | Johnson et al. ................ 455/15 |
| 5,440,642 A | 8/1995 | Denenberg et al. ........... 381/71 |
| 5,652,765 A | 7/1997 | Adachi et al. ............... 375/211 |
| 5,684,491 A | 11/1997 | Newman et al. ............. 342/374 |
| 5,754,961 A * | 5/1998 | Serizawa et al. ........... 455/517 |
| 5,765,099 A | 6/1998 | Georges et al. ................ 455/14 |
| 5,809,398 A | 9/1998 | Moberg et al. ................ 455/17 |
| 5,809,422 A | 9/1998 | Raleigh et al. ............. 455/449 |
| 5,812,933 A | 9/1998 | Niki ............................. 455/16 |
| 5,835,848 A | 11/1998 | Bi et al. ........................ 455/24 |
| 5,867,485 A | 2/1999 | Chambers et al. .......... 370/281 |
| 5,875,209 A | 2/1999 | Ogata ......................... 375/211 |
| 5,887,261 A | 3/1999 | Csapo et al. ................ 455/450 |
| 5,930,293 A | 7/1999 | Light et al. ................. 375/211 |
| 5,936,754 A | 8/1999 | Ariyavisitakul et al. .... 359/145 |
| 5,953,325 A | 9/1999 | Willars ....................... 370/335 |

(Continued)

FOREIGN PATENT DOCUMENTS

WO WO 97/42720 11/1997

OTHER PUBLICATIONS

Written Opinion for Application No. PCT/US01/45663, dated Nov. 18, 2002 (mailing date).

(Continued)

*Primary Examiner*—Ricky Q. Ngo
*Assistant Examiner*—Christine Ng
(74) *Attorney, Agent, or Firm*—Kilpatrick Stockton LLP

(57) ABSTRACT

The present invention relates to a system and method for extending the coverage area and communication capacity of a spread-spectrum based wireless network. The system comprises a unique dual-scale, asymmetrical cellular architecture for a wireless network, wherein the communication uplink is based on a macro-cellular system, and the communication downlink is based on a micro-cellular system. Through the user of remote downlink transmitters in the micro-cellular system, the present invention provides a cost effective solution for increasing communication capacity, extending coverage area, and providing high speed communication downlink.

25 Claims, 39 Drawing Sheets

U.S. PATENT DOCUMENTS

| | | | | |
|---|---|---|---|---|
| 5,956,333 | A | 9/1999 | Zhou et al. | 370/342 |
| 5,970,410 | A | 10/1999 | Carney et al. | 455/446 |
| 5,991,345 | A | 11/1999 | Ramasastry | 375/347 |
| 6,014,373 | A | 1/2000 | Schilling et al. | 370/342 |
| 6,035,218 | A | 3/2000 | Oh et al. | 455/562 |
| 6,052,558 | A | 4/2000 | Cook et al. | 455/12.1 |
| 6,078,823 | A | 6/2000 | Chavez et al. | 455/562 |
| 6,081,516 | A | 6/2000 | Yoshida et al. | 370/342 |
| 6,085,075 | A | 7/2000 | Van Bezooijen | 455/260 |
| 6,097,928 | A | 8/2000 | Jeon | 455/8 |
| 6,101,399 | A | 8/2000 | Raleigh et al. | 455/561 |
| 6,104,933 | A | 8/2000 | Frodigh et al. | 455/522 |
| 6,108,364 | A | 8/2000 | Weaver, Jr. et al. | 375/130 |
| 6,118,983 | A | 9/2000 | Egusa et al. | 455/69 |
| 6,119,010 | A | 9/2000 | Labedz | 455/446 |
| 6,137,784 | A * | 10/2000 | Wallerius et al. | 370/328 |
| 6,141,533 | A | 10/2000 | Wilson et al. | 455/11.1 |
| 6,370,185 | B1 | 4/2002 | Schmutz et al. | 375/214 |
| 6,405,046 | B1 * | 6/2002 | Kumaran et al. | 455/453 |
| 6,483,355 | B1 | 11/2002 | Lee et al. | 327/113 |
| 6,549,545 | B1 | 4/2003 | Yamamoto et al. | 370/508 |
| 6,711,142 | B1 * | 3/2004 | Suzuki et al. | 370/329 |
| 6,735,438 | B1 * | 5/2004 | Sabatino | 455/427 |
| 2002/0041248 | A1 | 4/2002 | Galton | 341/156 |
| 2002/0067761 | A1 | 6/2002 | Kong et al. | 375/148 |
| 2002/0160804 | A1 | 10/2002 | Bogner et al. | 455/522 |

OTHER PUBLICATIONS

International Search Report for Application No. PCT/US03/21691, dated Oct. 3, 2003 (mailing date).

Lee, William C. Y., et al., "The Impact of Repeaters on CDMA System Performance," Vodafone AirTouch Global Technology, *IEEE*, pp. 1763-1767, 2000.

Written Opinion for Application No. PCT/US03/21691, dated Sep. 7, 2004 (mailing date).

Preliminary Examination Report for Application No. PCT/US03/21691, dated Jan. 10, 2005 (mailing date).

* cited by examiner

Subscriber Assignment Pattern
for a typical cell simulation (a) Rate 1/2 convolutional coder (b) Rate 1/3 convolutional coder

METHOD AND SYSTEM FOR A REMOTE DOWNLINK TRANSMITTER FOR INCREASING THE CAPACITY AND DOWNLINK CAPABILITY OF A MULTIPLE ACCESS INTERFERENCE LIMITED SPREAD-SPECTRUM WIRELESS NETWORK

This application is a continuation in part of U.S. patent application Ser. No. 09/773,667 titled, "REMOTE DOWNLINK TRANSMITTER FOR INCREASING THE CAPACITY OF A MULTIPLE ACCESS INTERFERENCE LIMITED W-CDMA CELLULAR NETWORK," filed Feb. 2, 2001.

BACKGROUND OF THE INVENTION

1. Field of the Invention

The present invention relates generally to wireless networks and communication systems. Specifically, the preferred embodiments of the present invention relate to methods and systems for providing remote antennas to extend the coverage area and call capacity of a spread-spectrum based wireless network and to support quality of service requests with fast data rate requirements.

2. Description of the Related Art

The field of spread spectrum, wireless communication has been active for over a decade. For instance, the advantages of an exemplary code division multiple access (CDMA) system are described in U.S. Pat. No. 4,901,307 issued Feb. 13, 1990 to K. Gilhousen et al. Since then, a number of techniques have been proposed for compensating the multiple access interference (MAI) associated with spread spectrum wireless systems. As conventionally known in the art, MAI is a significant noise source limiting the practical capacity and performance of second generation, spread-spectrum based wireless services, such as one based on CDMA digital transmission.

The foremost technique for compensating MAI and ensuring reliable communication is to control the transmitted power from both the mobile station and the base station. Several examples of this technique are described in U.S. Pat. Nos. 6,119,010, 6,118,983, and 6,104,933. A second technique relies on controlling the patterns of the receiving and transmitting antennas. By dividing the service area into independent sectors or adaptively nulling interferers (so-called space time adaptive processing), MAI from other users that are directionally resolvable may be substantially reduced. U.S. Pat. Nos. 6,101,399, 6,078,823, and 5,953,325 are examples of this technique. Yet another technique utilizes complex, non-linear algorithms in the receiver to concurrently estimate the signals from a multitude of users, as shown in U.S. Pat. Nos. 6,081,516, 6,014,373, and 5,956,333). Termed multi-user detection (MUD), such approaches require extensive computational resources at the receiver and, as such, are suitable for use on the uplink (at the base station) but not on the downlink (at the mobile).

The use of signal repeaters also has been proposed in the field of spread spectrum, wireless communication. As conventionally known in the art, repeaters are basically devices that amplify or regenerate the data signal in order to extend the transmission distance. The industry standard organization for next generation, i.e. 3G CDMA systems has included one implementation of repeaters in its standard. Termed Opportunity Driven Multiple Access (ODMA), that configuration is discussed in the Third Generation Partnership Project (3GPP) Technical Report 25.924 version 1.0.0. A number of patents, such as U.S. Pat. Nos. 6,108,364 and 5,875,209, also relate to the use of repeaters. Additionally, there are patents, such as U.S. Pat. Nos. 5,936,754, 5,867, 485, and 5,809,422, that propose remote emitters linked to the base station via means other than an in-band radio frequency (RF) transmission to support both the uplink and downlink.

BRIEF SUMMARY OF THE INVENTION

The offering of high data rate services, as is envisioned for third generation (3G) wireless services, accentuates the aforementioned problems of multiple access interference (MAI) noise as the higher data rates are achieved at the expense of processing gain. This in turn requires the data users of spread spectrum, wireless networks to operate at higher power levels. In a wide-band code division multiple access (W-CDMA) wireless network, for example, the level of MAI is an important determinant of achievable network capacity; wherein capacity is herein defined to be the maximum data throughput in a network with an acceptable error rate for a given modulation and demodulation architecture.

The potentially large computational capabilities of the base station allow sophisticated signal processing algorithms (e.g., floating point calculations, complex demodulation algorithms, and multiple antenna streams) to be employed to increase capacity in the reception of mobile-to-base station signals (uplink or reverse link) and mitigation of MAI in a spread-spectrum, wireless network. However, the base station to mobile link (downlink or forward link) is limited by the mobile hardware such as the mobile cellular telephone, which is typically quite unsophisticated. Thus, the absence of such large computational capabilities at the mobile subscriber introduces a network imbalance that precludes optimizing system performance and balancing system capacity. Conventional repeaters and remote emitters of the types mentioned earlier have been used to address this network imbalance in MAI mitigation. However, the essential feature of the aforementioned conventional repeaters is that information is conveyed to the remote site using the same frequency band as the underlying spread spectrum system. Due to this constraint, the repeaters extend the range of the network but do not allow an increase in practical capacity of each network cell, which is conventionally known in the art as the basic geographic unit of the cellular architecture often employed in wireless networks. Likewise, the aforementioned conventional remote emitters must support both communication downlink (forward link) and uplink (reverse link) in order to only extend the coverage area; wherein support of the reverse link involves substantially more complexity and cost than support of the forward link. Thus, there exists a need to economically increase the call capacity and coverage area of spread spectrum, wireless networks.

With upcoming wireless networks, such as enhanced second generation networks and beyond, there may be a desire of network operators to offer service for data transfer that does not have a substantial latency requirement or for users that desire high speed data downlink without the need for high speed data uplink. Thus, there also exists a need to increase the cost effectiveness for a wireless network operator who does not need to invest in the hardware required for a fast uplink.

Accordingly, the preferred embodiments of the present invention provide a method and system for implementing remote antennas in a spread-spectrum based wireless network to optimize system performance and extend both the network's coverage area and call capacity.

The preferred embodiments of the present invention also provide a low-cost, dual-scale architecture for a spread-spectrum based wireless network, wherein communication uplink from the user to the network's base station is based on a macro-cellular system, and communication downlink from the base station to the user is based on a micro-cellular system overlaying the macro-cellular system and having at least one remote downlink transmitter (RDT).

The preferred embodiments of the present invention further provide a method and system utilizing the RDT technology to enable wireless service providers to offer a high speed data download capability on the network downlink (at the mobile) while having negligible impact on any existing capacity and requiring no modifications to the uplink physical layer (at the base station).

The preferred embodiments of the present invention also provide a low-cost, optimal method and system for a spread-spectrum based wireless network that comprises at least a base station and a remote emitter, wherein portions of the physical layer processing capability of the base station is relocated out to the remote emitter to reduce the data rate link requirements between the base station and the remote emitter and lower the overall network cost.

The preferred embodiments of the present invention also provide a method and system for a wireless network that adaptively transmits downlink dedicated physical channels (DPCHs) for selected users from an RDT or a central base station based on requested downlink data rates and available radio sources.

The preferred embodiments of the present invention further provide a method and system for a wireless network that uses a controlling base station (BS) of an RDT to send control information to the RDT which, in turn, directly acquires data requested by a subscriber through a local Internet connection; thereby removing the need for data to be retrieved by the wireless network and rerouted across network to the RDT and onto the user.

The preferred embodiments of the present invention further provide a method and system for a wireless network wherein all voice transport channels and control information required by the RDT to create assigned Dedicated Physical Channels is transmitted over a dedicated physical data channel (DPDCH) on the downlink of the central base station.

The preferred embodiments of the present invention further provide a cost-effective method and system for an improved-performance, spread-spectrum based wireless network, wherein support and performance enhancements are restricted to the forward link to achieve lower network cost than what would be required for both downlink and uplink support.

The preferred embodiments of the present invention additionally provide a method and system for embedding at least one RDT in an existing macro-cell of a spread-spectrum based, wireless network to increase not only the coverage area but also the maximum data throughput supported by that cell.

The preferred embodiments of the present invention further provide a method and system for implementing a forward link manager (FLM) in a spread spectrum based wireless network to dynamically and independently control the assignment of user equipment uplink and downlink access to newly available radio sources, including RDTs, and improve the practical network capacity by enabling the use of RDTs and matching the assigned load to available radio resources.

Additional aspects and novel features of the invention will be set forth in part in the description that follows, and in part will become more apparent to those skilled in the art upon examination of the disclosure.

BRIEF DESCRIPTION OF THE DRAWINGS

The preferred embodiments are illustrated by way of example and not limited in the following figures, in which.

DETAILED DESCRIPTION OF THE INVENTION

Through analysis and simulations disclosed herein, it will be shown that the practical capacity of a spread-spectrum based wireless network, such as a wide-band code division multiple access (W-CDMA) network, with nominal system parameters, is nearly a constant per cell rather than a constant per coverage area. More specifically stated, the maximum combined data throughput is set by the combined effect of transmission power limits and individual user signal to interference plus noise ratio (SINR) limits and is, in fact, insensitive to the size of the cell for cell sizes typical of urban implementations (cell radius between 0.5 km and 3.0 km). Thus, according to an embodiment of the present invention, it is determined that a micro-cellular architecture over the same area as a macro-cellular architecture will lead to a higher practical capacity for the network. Furthermore, the improvements may be independently awarded to the uplink or reverse link (the reception of mobile-to-base-station signals) and downlink or forward link (the reception of base-station-to-mobile signals). This is verified via simulations using, for example, W-CDMA network modeling tools for a simplistic one-dimensional, one-cell model as well as a high-fidelity two-dimensional multi-cellular network model.

Figure 1:
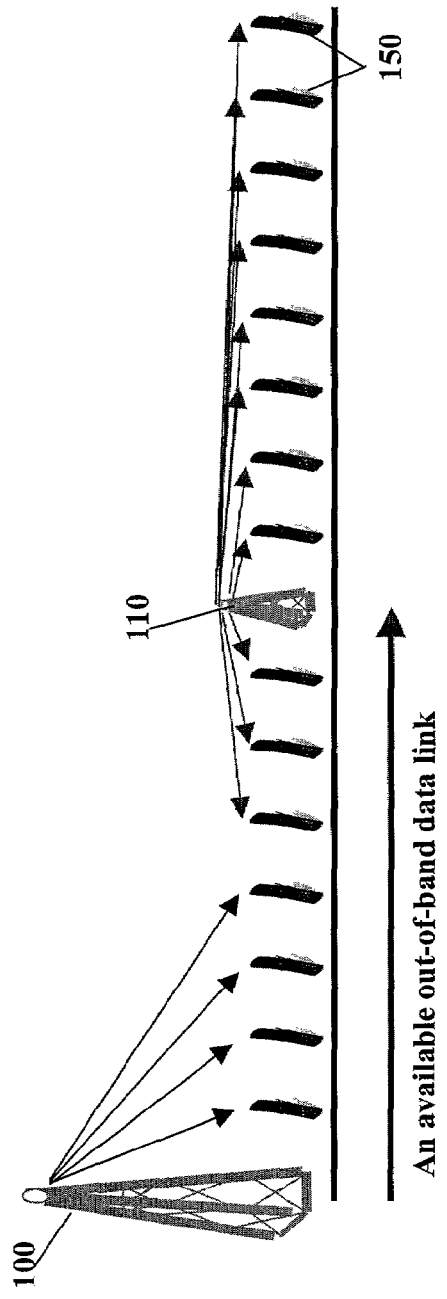
FIG. 1 shows a schematic depiction of a one-dimensional, one-cell wide-band code division multiple access (W-CDMA) model for simulation with a remote-downlink-transmitter (RDT) implementation, wherein the base station to RDT data link is out of band over a network of opportunity, in accordance with one embodiment of the present invention.
Figure 2:
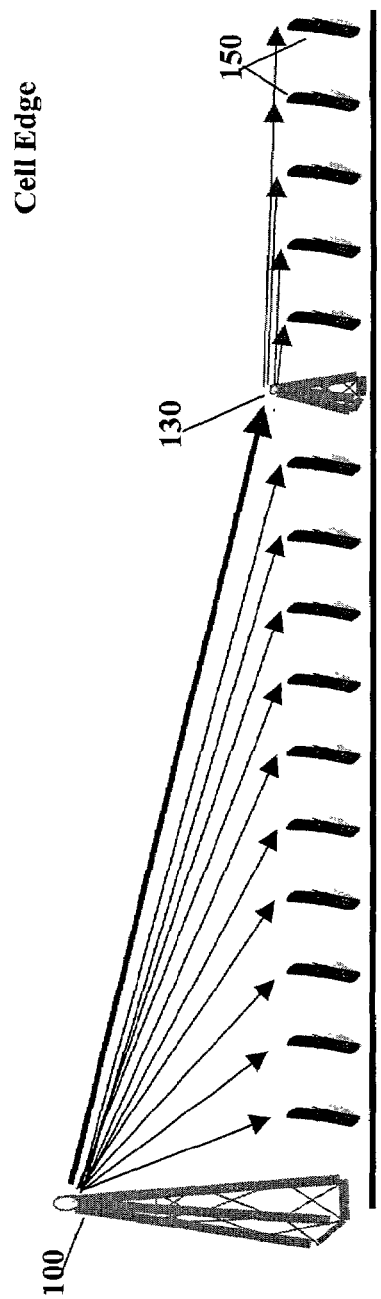
FIG. 2 shows a schematic depiction of a one-dimensional, one-cell W-CDMA model for simulation with an opportunity-driven-multiple-access (ODMA) implementation, wherein the data link is carried over the downlink, in accordance with one embodiment of the present invention.

FIGS. 1 and 2 illustrate a one-dimensional, one-cell W-CDMA model for simulation with a remote-downlink-transmitter (RDT), in accordance with one embodiment of the present invention, and a conventional opportunity-drive-multiple-access (ODMA) terminal, respectively; wherein the base station to RDT data link is out of band over a network of opportunity. The models of FIGS. 1 and 2 begin with a single base station (BS) 100 placed at the origin of a one-dimensional coordinate system. User equipments (UEs) 150 demanding a single quality of service (e.g., 8 kbits/sec voice service) are uniformly distributed out to the cell edge along a line away from the BS 100. The UEs may include cellular telephones or any other devices that desire and/or are capable of wireless communication. At the mid-point of the cell along the line, a remote emitter is placed. It is assumed for simulation purposes that the remote emitter supports at least the physical layer processing of the downlink but may include all aspects of downlink processing, i.e. it can become another BS. As is known to one skilled in the art, the physical layer is one of the layers in the standard open system interconnect (OSI) reference model for a communication architecture. It includes the actual electrical or mechanical interface to the physical medium for communication.

Two systems are modeled and simulated. In the first system, which is shown in FIG. 1, the remote emitter includes a RDT 110 with one sector facing back toward the BS 100 and the other sector facing outward away from the BS 100. Users with UEs 150 are assigned to the BS 100 or the RDT 110 based on which is closer. User data is assumed to be available at the RDT 110. Parameters for processing gain, noise figure, target SINR, and power limitations are taken from the 3GPP Simulation specification, Technical Report (TR) 25.942 Version 2.2.1, which is available on-line at http://www.3gpp.org and herein incorporated by reference in its entirety. In the second system, which is shown in FIG. 2, the remote emitter includes an ODMA remote terminal or repeater 130. User data is assumed to be carried on the downlink from the BS 100 to the ODMA repeater 130, where it is received and retransmitted. In the case of an ODMA implementation, it is only sensible for users with UEs 150 beyond the ODMA remote terminal 130 to be assigned to the ODMA remote terminal 130, as shown in FIG. 2.

Figure 3:
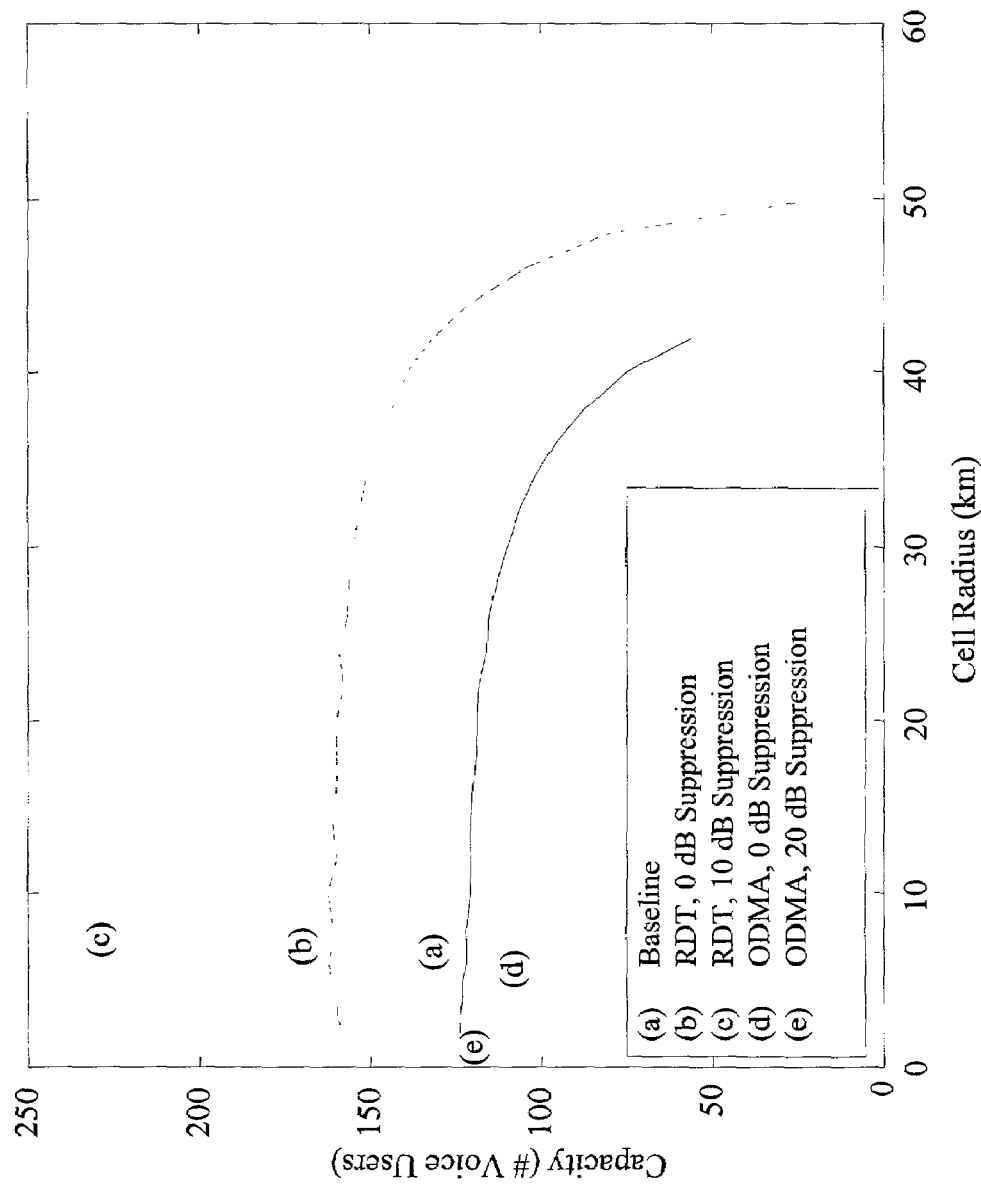
FIG. 3 shows simulations of cell capacity as a function of cell width for several system configurations for models shown in FIGS. 1 and 2, in accordance with one embodiment of the present invention.

FIG. 3 shows the results of a simulation of cell capacity as a function of cell width for the one-dimensional, one-cell models shown in FIGS. 1 and 2, assuming a uniform distribution of users along the cell. FIG. 3 shows the simulation results for the following five system configurations: (a) a baseline system, i.e., one with a base station and no remote emitters; (b) a single RDT at the cell midpoint with no back lobe suppression; (c) a single RDT at the cell midpoint with 10 dB back lobe suppression; (d) a single ODMA at 0.75 of the cell size with no back lobe suppression; and (e) a single ODMA at 0.75 of the cell size with 20 dB back lobe suppression.

In the simulation, the remote emitter, whether it includes the RDT 110 or the ODMA repeaters 130, is assumed to be at a disadvantaged height of 20 meters (m) and the BS 100 at 50 m. An important feature is that below a certain cell size, practical capacity of any given configuration is independent of cell size. Thus, for cell size such that MAI dominates, only the RDTs can increase capacity. As shown in FIG. 3, an addition of an RDT without any back lobe suppression to a baseline system increases the capacity by about 30%, as shown from the comparison of line (b) and line (a); whereas, the increase is 100% for the addition of an RDT with 10 dB back lobe suppression to the baseline system, as shown from the comparison of line (c) to line (a). Indeed, ODMA systems actually decrease capacity without adequate back lobe suppression, as line (d) in FIG. 3 shows, because they increase the interference levels for users between the base station and the repeater. With adequate ODMA back lobe suppression, as shown by line (e) in FIG. 3, coverage is extended to near baseline level with a minimal impact on capacity. In summary, ODMA repeaters, such as the ODMA remoter terminal 130 shown in FIG. 2, can only extend coverage at constant capacity; whereas, the selective use of RDTs, such as the RDT 110 shown in FIG. 1, can both extend coverage and increase capacity.

Similar conclusions can also be reached through mathematical analysis. To first order, the performance of a W-CDMA downlink is described by the constraint that the signal to interference plus noise ratio (SINR) reaches a target value. Specifically, $$\frac{P_i L_i^{-1} G}{\sum_{\substack{j=1 \\ j \neq i}}^{N} P_j L_i^{-1} + N_0} = SINR_{target} \quad \text{Eq. (1)}$$

In Eq. (1), $P_i$ is the transmitted power of the $i^{th}$ user, $L_i$ is the path loss to the user's receiver as given by a Hata model, $N_0$ is the receiver noise power, G is the processing gain, and $SINR_{target}$ is the desired SINR at the receiver. To simplify the mathematics without sacrificing accuracy, many effects such as log-normal shadowing, control channel traffic, and antenna patterns are neglected here in order to focus on the fundamental behavior of the system. If there are N users, there are N such equations. If the system is dominated by MAI and, therefore, heavily loaded, an approximate analytical solution is obtainable. Assume that $P_i$ is of the form $P_0 + \delta_i$ where $P_0$ is a constant. Substituting this solution into Eq. (1) and clearing the denominator results in Eq. (2), $$P_0(G - SINR_{target}(N-1)) = \quad \text{Eq. (2)}$$
$$SINR_{target} \sum_{\substack{j=1 \\ j \neq i}}^{N} \delta_j + SINR_{target} N_0 L_i - G\delta_i$$

If $\delta_i$ is set such that the last two terms cancel and assuming that the network is loaded to the point where including $\delta_i$ in the summation term has little effect, a constant solution for $P_0$ is obtained indicating the solution is correct within the assumptions. For users far enough away from the base station, the inclusion of this term is significant and the approximate solution is not valid in that case as the system is not MAI limited. In FIG. 3, that condition is reached at approximately 30 km. As an example, values of N>77 for any cell radius >1 km ensure the contribution of the last term is less than 5%. Specifically, $P_0$ is found in Eq. (3), $$P_0 \cong \frac{\frac{SINR_{target}^2}{G} N_0 \sum_{j=1}^{N} L_i}{G - SINR_{target}(N-1)} \quad \text{Eq. (3)}$$

Figure 4:
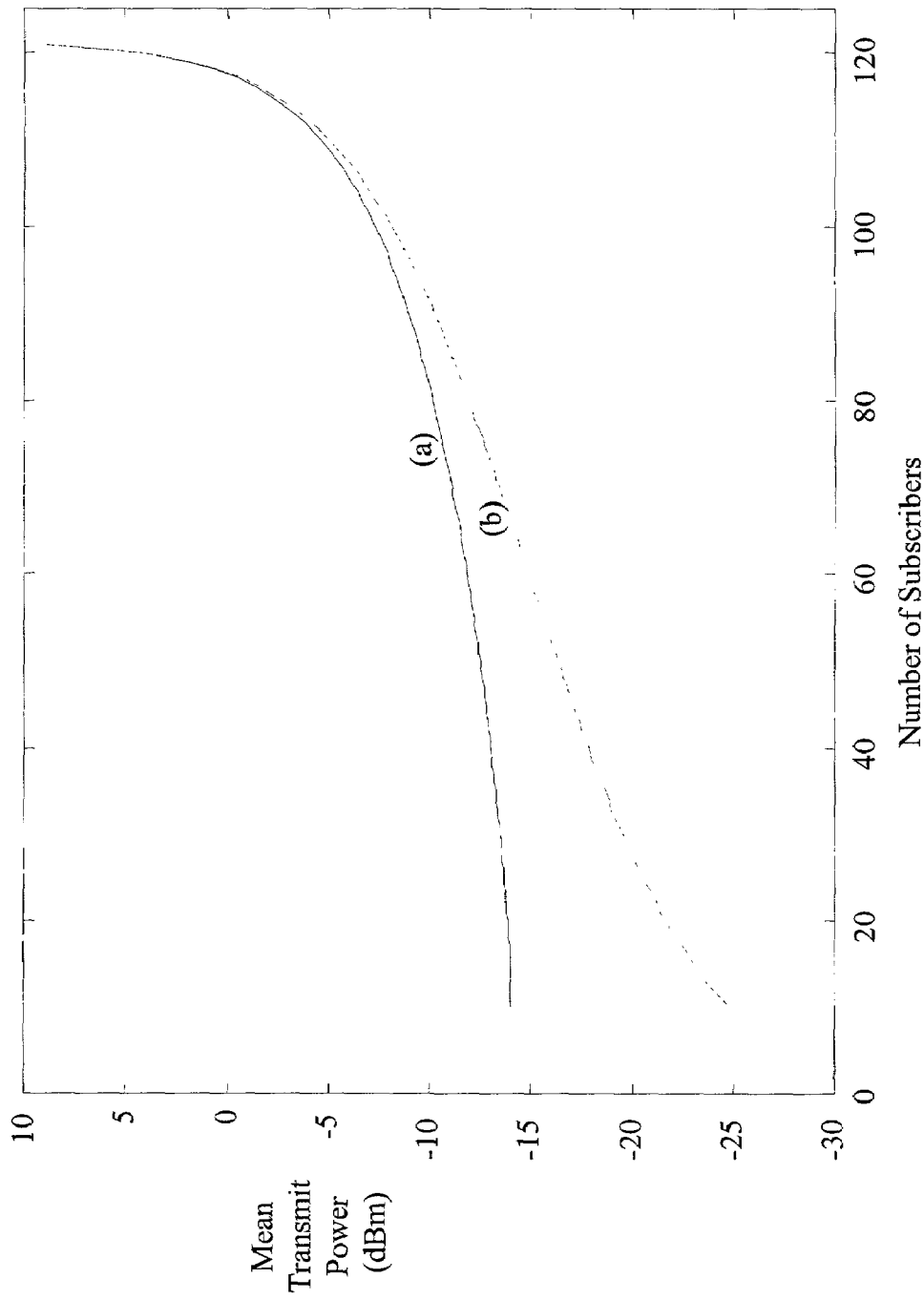
FIG. 4 shows the comparison of the mean transmit powers for all downlinks in a one-dimensional single cell of 2-km radius as calculated by the iterative and approximate methods, in accordance with one embodiment of the present invention.

FIG. 4 shows the comparison of the mean transmit powers for all downlinks in a one-dimensional single cell of 2-km radius as computed by performing the iterative method in accordance with Eq. (2) (line (a) which includes all terms in the summation) and approximately calculated by using Eq. (3) (line (b)). The parameters are those of the baseline and all users are assumed voice users. The figure shows that where the system "breaks", as defined by more than 5% of the users requiring greater than 30 dBm transmit power for their link, the exact numerical and approximate analytic solutions match exceedingly well. In other words, when the cell is heavily loaded, the approximate solution of Eq. (3) is quite close to the complete solution. Thus, Eq. (3) is a good approximation for a heavily loaded cell.

In the case of a heavily loaded cell, the preceding result illustrates an advantage of using RDTs over ODMA. The use of a repeater (as in ODMA) does reduce the effective path loss of users supported by the repeater. However, because the remote users must still satisfy Eq. (1) at the repeater, the required transmit power at the central base station to get an adequate signal to the repeater is unaffected by the effective path loss decrease. Consequently, the cell will still break with the same number of users. There is one advantage for using ODMA repeaters in that for loadings less than the critical value, the total power transmitted by the BS will reduce, resulting in a decrease in interference to other cells. In addition, users supported by the repeater will be able to operate at greater ranges from the base station.

According to an embodiment of the present invention, RDTs also have the aforementioned benefits associated with ODMA repeaters and, in addition, actually eliminate all the transmit power allocated to the remote users at the BS as that traffic is now carried on a landline to the RDT. Thus, users supported by an RDT represent additional capacity for the cell. The complexities of multi-cell networks are not reflected here. Although they will be included in the higher fidelity simulation to be considered next, the increase in network capacity by transition from a macro-cellular to micro-cellular architecture for the downlink within a given cell is still realized.

As seen from FIG. 4, the abrupt failure of the system as N approaches 121 users illustrates an important point. That is, even though the values of noise figure and path loss affect the precise value of $P_0$ at any given loading condition, the value of N that drives the denominator of Eq. (3) to zero is independent of these values and represents an upper bound on the number of users even with infinite power available. The bound is extremely tight. With 121 users, the required transmit power is 9 dBm. With 122 users, no solution exists. Even a 20 dB change in noise figure or path loss would not affect the maximum number of users in this idealized simulation. That observation suggests a key insight, as discussed next in connection with the SINR.

A simple model for the SINR of a downlink UE signal at the input to a Viterbi decoder at the UE is $$SINR = \frac{GP_T B}{P_{loss}(I_{in\text{-}cell} + I_{out\text{-}of\text{-}cell} + N)} = \frac{GP_T B}{P_{loss} I_{in\text{-}cell}\left(1 + \frac{I_{out\text{-}of\text{-}cell} + N}{I_{in\text{-}cell}}\right)} \quad \text{Eq. (4)}$$

In this expression, G is the processing gain, $P_T$ is the transmitted power, $P_{loss}$ is the path loss, $I_{in\text{-}cell}$ is the interference from users in the cell, $I_{out\text{-}of\text{-}cell}$ is the interference from users out of the cell, B is a antenna pattern factor, and N is the noise figure. The in-cell interference results from power transmitted at the base station and seen at the UE. With a given transmission power level for all in-cell UE downlinks, $I_{in\text{-}cell}$ is inversely proportional to $P_{loss}$. As such, the product of $I_{in\text{-}cell}$ and $P_{loss}$ stays largely fixed for modest path loss changes in loading conditions where the in-cell interference dominates (second term in parentheses is <<1). For network applications where capacity is a greater concern than coverage area, this argument suggests that maximum transmitter height above ground is not required. In terms of the simulation described in FIG. 3, cells less than 60 km in diameter (recall this is a simplified one-dimension model) could tolerate path loss increases without appreciable effect on capacity. In fact, the smaller the cell, the higher the path loss penalty that would be tolerable.

Simulations of two-dimensional multi-cellular networks similarly show that an RDT implementation in a spread spectrum, wireless network can both extend coverage and increase capacity. In fact, this effect is the primary motivation for increasing overall network capacity by reducing the cell size. Thus, according to one embodiment of the present invention, by dividing a macro-cellular downlink architecture (e.g., a single BS for every 10–15 km² of service area) into a micro-cellular system, with 3 to 6 additional downlink nodes of RDTs per BS, the practical capacity of the network over the same coverage area is increased, especially when the data link to each RDT is carried out-of-band. Furthermore, by restricting the architecture alterations of the wireless network to only the downlink side, the overall network cost and complexity are reduced.

Figure 5:
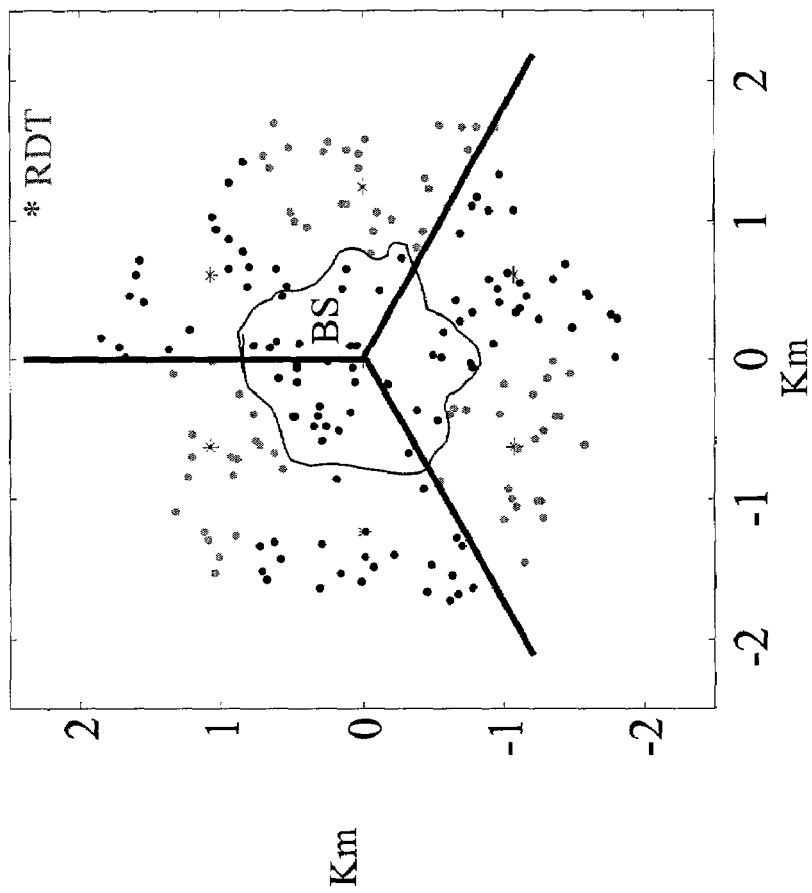
FIG. 5 shows a schematic depiction of a two-dimensional, one-cell W-CDMA model in a three-ring network with three sectors of the base station (BS) for simulation with associated RDTs, in accordance with one embodiment of the present invention.

FIG. 5 shows the structure of a two-dimensional, one-cell model in a three-ring network with three sectors of the BS for a more rigorous simulation of RDT implementations. The figure shows a laydown of UEs (dots) with assignment to the BS (dots inside the circular boundary) or an RDT (dots outside the circular boundary). The black lines depict the sector boundaries of the BS, and the asterisks depict the RDTs. According to one embodiment of the present invention which is simulated here, there are 2 RDTs per sector, and they are positioned approximately midway towards the cell edge. The total simulation includes two rings of cells around the one shown in FIG. 5 for a total of 19 macro-cells and was performed using a W-CDMA network simulation model. Thus, with 19 tri-sectored base stations and 0, 1, or 2 RDTs per BS sector, cell capacity of the second simulation was computed with an average number of high data rate (384 kbps) users and voice (8 kbps) users per sector as a parameter. Details such as control channel overhead, out-of-cell interference, and random UE positioning are now included in this simulation.

Figure 6:
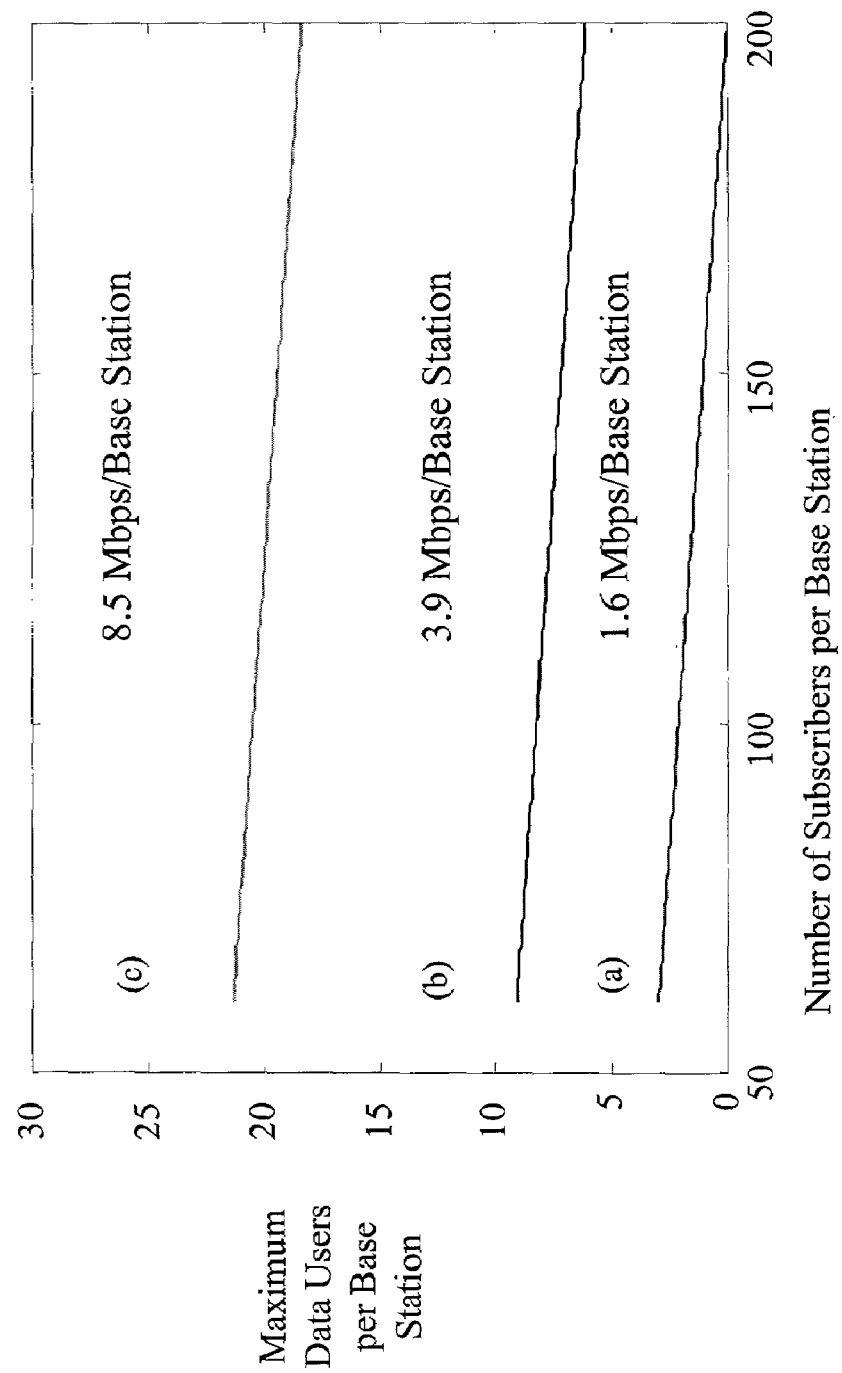
FIG. 6 shows simulated results for the maximum number of uniformly distributed data users per BS as a function of total number of UEs per BS, with and without the use of RDTs in each cellular cell, in accordance with one embodiment of the present invention, in accordance with one embodiment of the present invention.

As with the first simulation for the one-dimensional, one-cell network model, the second simulation uses system parameters from the 3GPP document TR 25.924 mentioned earlier, a Hata path loss model, BS height of 50 m, an RDT height of 20 m, 8 kbps per voice user, 384 kbps per data user, and with shadow fading neglected. FIG. 6 shows graphs of the maximum number of uniformly distributed data users per BS as a function of total number of UEs per BS that result from this simulation. In the figures, graph (a) shows the simulation result for a nominal W-CDMA network without any RDT, graph (b) shows the simulation result for a W-CDMA network with 3 RDTs per cell, and graph (c) shows the simulation result for a W-CDMA network with 6 RDTs per cell. The dotted lines in the graphs show the actual data resulting from the second simulation; with the solid lines showing the fixed capacity model fit or expected average performance, using a model of constant total data throughput (independent of quality of service distribution among UE) and Monte Carlo style simulation, of the actual data resulted from the second simulation.

As FIG. 6 shows in graph (b), the use of 1 RDT per BS sector (i.e., 3 RDTs per cell) improves the forward link (downlink) cell capacity approximately three-fold. Whereas, the use of 2 RDTs per BS sector (i.e., 6 RDTs per cell) improves the forward link cell capacity approximately five-fold, as shown in graph (c) in the figure. Returning to the discussion on sensitivity to path loss, with the BS at the disadvantaged height of 20 m and the RDT at 20 m, or with all path losses from the RDT arbitrarily increased by 3 dB for the second simulation, one observes essentially no significant change in system capacity. Thus, the earlier observation suggesting that disadvantaged citing of the BS and RDT is not an overriding concern is substantiated with the high fidelity of the second simulation.

The above two simulations and mathematical analysis show that transformation of macro-cells within a network to a collection of micro-cells increases the practical capacity per cell and can be achieved independently for the downlink and/or the uplink architectures. However, according to one embodiment of the present invention, an asymmetrical or dual-scale network structure wherein the use of RDTs are restricted to the downlink is used to provide substantive cost benefits, which are proven next.

Supporting a micro-cellular architecture for the uplink to match that proposed for the downlink is not cost effective for three reasons. First, while the uplink physical layer processing could be accomplished at the remote emitter with user decisions transferred back to the BS, that processing is more demanding for the uplink than the downlink. That is because the descrambling and despreading operations of the uplink must occur with floating point accuracy and at a wide range of potential code delays due to the unsynchronized nature of uplink reception. The downlink spreading and scrambling operations, on the other hand, may occur using binary math with a given code delay. Additionally, SINR improvement functions such as maximal ratio combining, multi-user detection, and space time adaptive processing, which are used to mitigate the stringent UE power limitations, further amplify the computational resources required for the uplink. Thus, the combination of high processing demand with low latency requirements leads to high equipment costs for the uplink.

Secondly, the base band in-phase and quadrature data may be transmitted from the user back to the BS at some level of floating point accuracy, thereby removing the need for any uplink processing capability at the remote site. However, obtaining acceptable performance from the uplink receiver algorithm in an uplink RDT would require data samples at twice the W-CDMA system bandwidth per antenna. This equates to approximately 200 Mbits/sec per antenna for 12 bit accuracy. Such an uplink data load from the RDT to the base station is not cost effective given existing bandwidth cost. The required data rate for support of the downlink, however, is substantially lower. The expected bandwidth required of the downlink trunk line is readily computed. For example, if a downlink RDT is to support N users, the total trunk bandwidth is:

$$BW_{trunk} = R_{chip} * 2 * (\log_2(N) + 1) \quad \text{Eq. (5)}$$

The chip rate, $R_{chip}$, for W-CDMA is approximately $3.8*10^6$ chips/sec. The factor of 2 is to include both in-phase (I) and quadrature (Q) channels. As each user's I and Q sequences are elements of the set [−1,1], only $\log_2(N)+1$ bits are required to represent the superimposed sequence of integers. For a W-CDMA system with 50 remote users (half the number of baseline users per sector), the required trunk bandwidth is approximately 51 Mbits/sec which is about the equivalent of a T-3 line. This calculation assumes that all code generation is done at the base station. If the RDT is capable of generating the codes and spreading the sequences, i.e., taking up the physical layer processing, only the unspread user data must be transmitted and $BW_{trunk}$ is reduced by the average spreading factor and error correction coding rate. Assuming 90% voice users and 10% high-speed data users, the required bandwidth is then 2.2 Mbits/sec, which is about the equivalent of a T1 line.

The third justification for the dual-scale network architecture is that a prevalent usage paradigm for 3G wireless services may demand higher data rates for the downlink than the uplink. For example, web browsing is such an activity. The added capacity that a micro-cellular uplink would offer is, thus, not cost-effective and/or may not even be required.

A dual-scale network architecture involving a macro-cellular uplink and a micro-cellular downlink has thus been shown to improve practical capacity of the network. The dual-scale architecture is also asymmetrical in that the communication downlink is handled differently from the communication uplink, which also has been shown to provide substantial cost benefits as well.

Having demonstrated that the invention of a dual-scale architecture has unique, substantial benefits, an RDT implementation in the downlink section of a spread-spectrum based wireless network that achieves those benefits is now explained in accordance to embodiments of the present invention.

Figure 7:
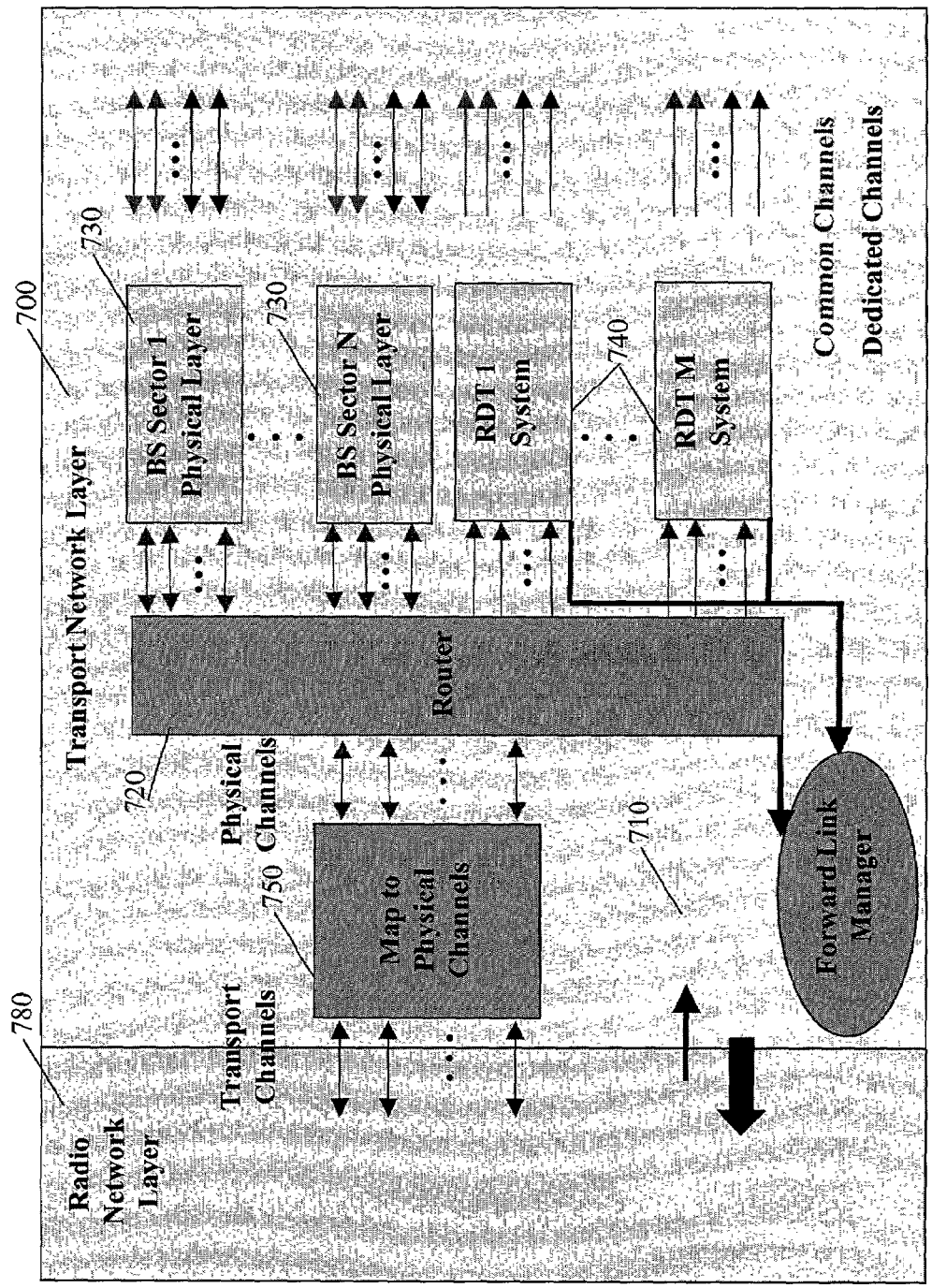
FIG. 7 shows a block diagram of a W-CDMA downlink processing architecture modified to accommodate the RDT systems in accordance with one embodiment of the present invention, in accordance with one embodiment of the present invention.

FIG. 7 shows a block diagram of a spread-spectrum (e.g., W-CDMA) downlink processing architecture modified to accommodate the RDT systems in accordance with one embodiment of the present invention. There are three desired components of a RDT implementation which requires alterations to, for example, a standard W-CDMA architecture. The first desired component includes a Forward Link Manager (FLM) 710, which is added to the transport network layer 700 of an W-CDMA architecture to control the availability of an RDT for registration or access of a new UE, and thus for assignment in the Radio Network Layer 780. As is known to one skilled in the art, the transport network layer and the radio network layer refer to layers in a standard open system interconnect (OSI) reference model for a communication architecture.

The second desired component for an RDT implementation includes the RDT system 740 itself. The third desired component for an RDT implementation includes a Router 720 which is also added to the transport network layer 700 to direct the downlink transport channels from the radio network layer 780 to either a BS sector or an associated RDT node for downloading to the UEs. Communication signals to be transmitted from the BS to the UEs first enter the radio network layer 780, which is responsible for the routing and switching of the communication signals into transport channels, as shown in FIG. 7. The downlink transport channels are then translated into corresponding physical channels by a map 750 in the transport network layer 700. The data from the physical channels are subsequently routed by the Router 720 as physical layer inputs to either a local BS sector via its physical layer 730 (another layer in the OSI reference model) or a RDT system 740 at an associated RDT node, where they are then forwarded to the UEs. According to an embodiment of the present invention, the Router 720 is capable of independently assigning downlink and uplink traffic to the radio sources (BS or RDTs), as the RDTs only support downlink traffic. Where an adequate inter-BS link is available, the Router 720 can also direct downlink traffic to one BS, via an RDT as needed, while the uplink traffic is supported by another BS resource in another cell. Both the Router 720 and the RDT systems 740 transmit information to the FLM 710 that is used in link management decisions.

Figure 8:
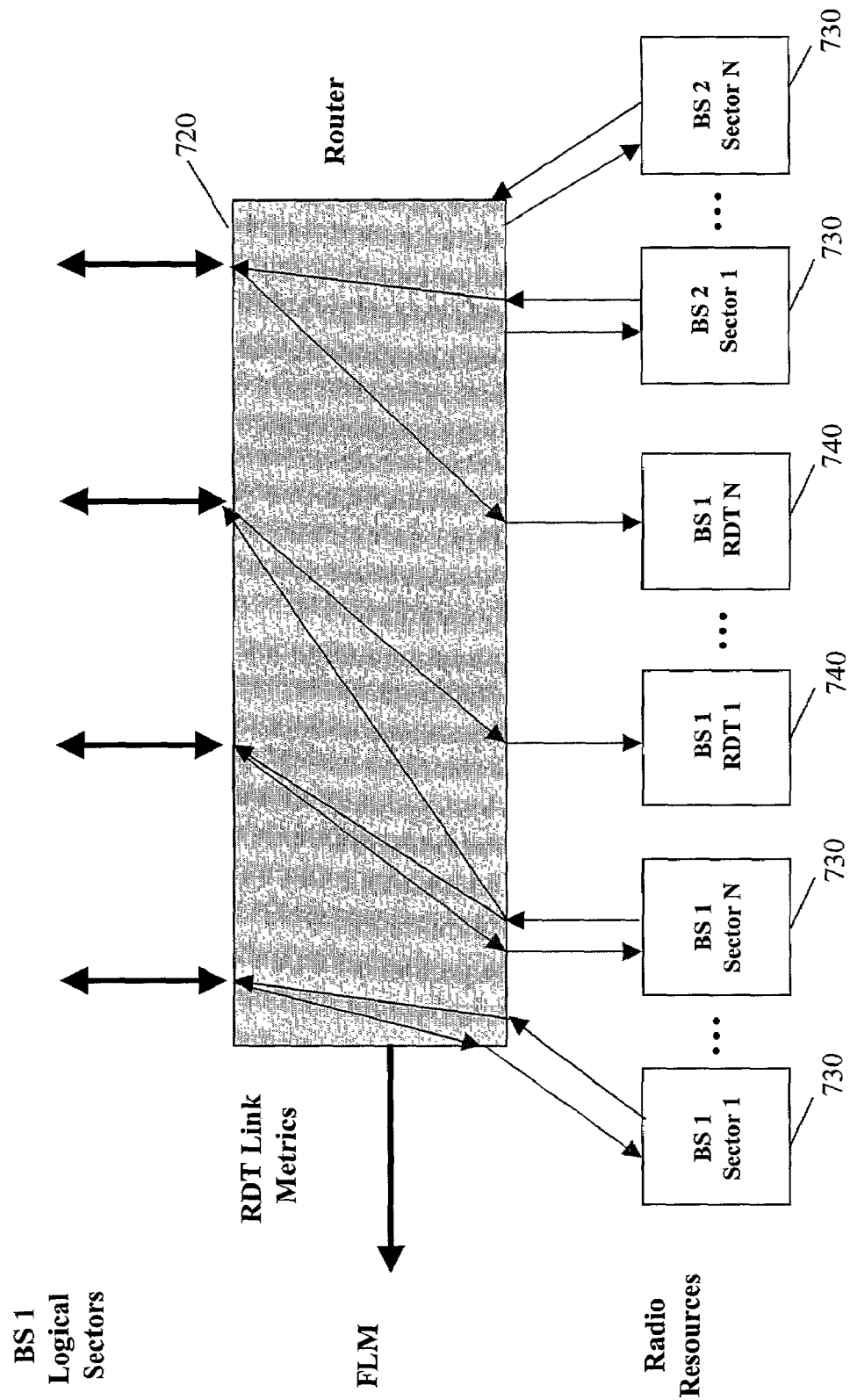
FIG. 8 shows a schematic diagram demonstrating the ability of a router of the architecture shown in FIG. 7 to join uplinks and downlinks from varied radio resources and present a sector with collocated uplink and downlink to the remainder of the transport network layer shown in FIG. 7, in accordance with one embodiment of the present invention.

The function of the Router 720 is to direct downlink data coming into the BS to the physical layer processing system for the radio resource that will support such data, i.e. a BS sector physical layer 730 or an RDT system 740. A standard BS already implements the ability to direct downlink data to an appropriate sector. According to an embodiment of the present invention, each RDT system is logically treated as an additional sector for the BS, and the wireless network includes the ability to independently direct downlink and uplink data to different radio resources. Specifically, all uplink traffic may still be received at the BS while some downlink traffic may be transmitted from an RDT system at a remote site. An appropriate paradigm for describing the Router 720 is that of a filter at all interfaces of the physical layer with the remainder of the transport network layer 700. While the uplink and downlink may be supported by different radio resources, the Router 720 presents a single logical sector for all allowable downlink and uplink pairings. For example, one logical sector may be formed from a single BS sector. Another logical sector may be formed from an RDT-based downlink coupled with the uplink of a BS sector. Yet another logical sector may be formed from an RDT-based downlink of the local BS and the uplink system of a sector belonging to a different BS. FIG. 8 graphically depicts this switching function, i.e., the ability of the Router 720 to join uplinks and downlinks from various radio sources and present a sector with collocated uplink and downlink to the remainder of the TNL 700. While the Router 720 makes the connections, the FLM 710 determines what connections are made during access procedures and handoff procedures. Link quality metrics for the data links to the RDT systems 740 are also reported to the FLM 710. The logical sector paradigm allows the Router 720 to be introduced into existing operator equipment with minimal modifications to the latter. Thus, the dual-scale network architecture of the present invention can be applied to any spread-spectrum wireless network.

Figure 9:
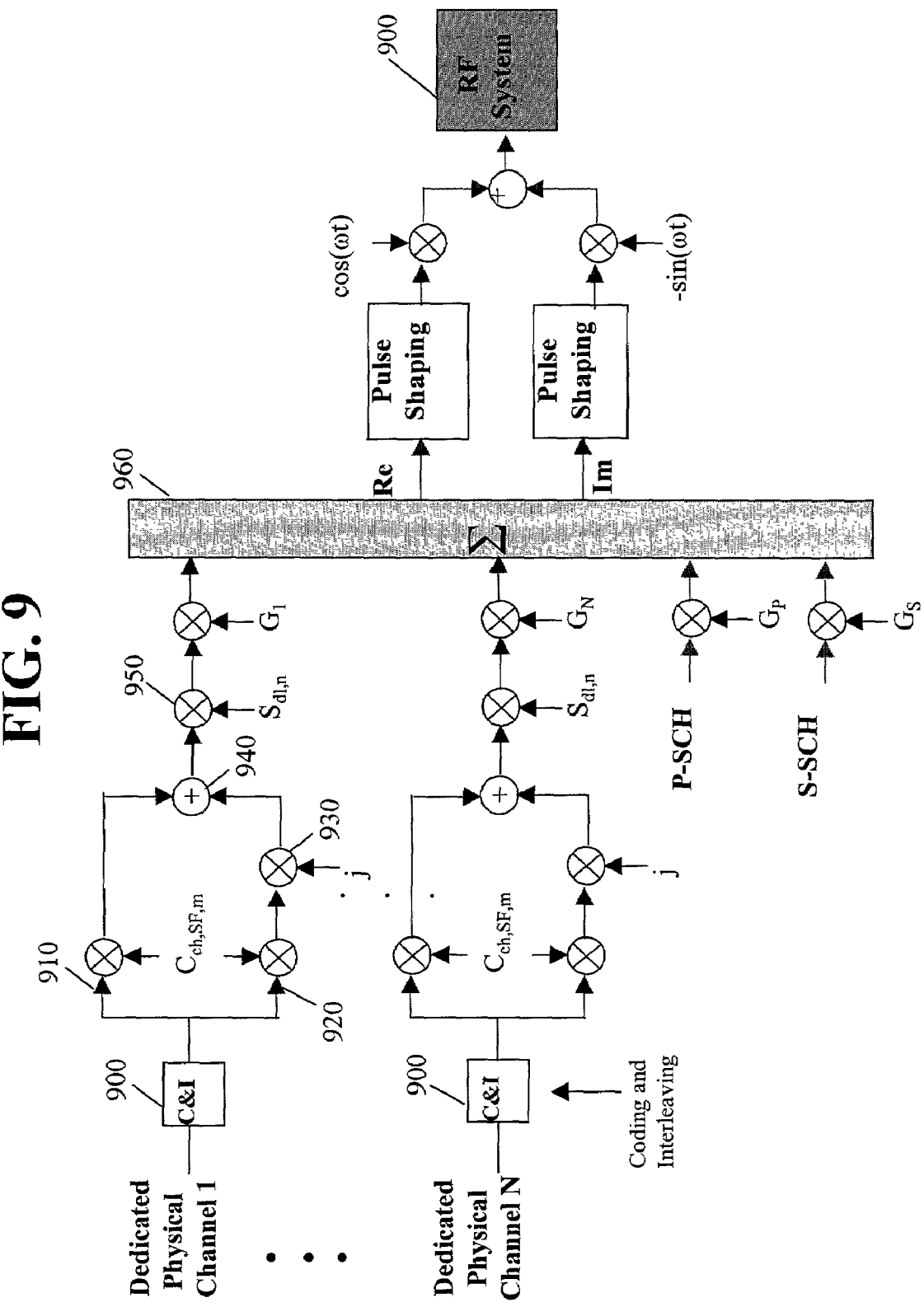
FIG. 9 shows a block diagram of an RDT system, in accordance with one embodiment of the present invention.

According to an embodiment of the present invention, the functionality of the RDT system 740 may be described as that of a physical layer processing for a sector with the addition of a communication backbone that conveys information from the BS to the RDT, which is at a remote site. Except for the communication backbone, the RDT is simply treated as another sector of the BS, with all RDTs sharing a communication trunk line or serviced with independent trunk lines. Any vertical slice between functions of the RDT and the BS may be where the trunk line transmission occurs, dividing processing steps between the BS and the RDT. FIG. 9 shows a block diagram of the RDT system 740, in accordance with one embodiment of the present invention, where $C_{ch,SF,m}$ is the spreading code for the channel, $S_{dl,n}$ is the downlink scrambling code, and $G_N$ is a gain factor. Two of the common channels, the primary synchronization (P-SCH) and the secondary synchronization (S-SCH), are shown. Other common channels including pilot and access channels are also summed but not shown in the figure. The radio frequency (RF) system 700 includes a digital-to-analog converter, a power amplifier, a matching network, and antennas.

Each RDT system 740 emits the same common channels as a sector (e.g. pilot channel, primary synchronization channel, secondary synchronization channel, access channels, paging channels, and common broadcast channels). The RDT system is assigned a unique set of channelization codes in a manner identical to that in which codes are allocated between BS sectors in the wireless network. A user-defined portion of the physical layer processing may be accomplished in the BS. This may range from the logical mapping of transport channels into physical channels to execution of the coding, interleaving, spreading, and scrambling operations. The output of this physical layer processing is conveyed to the RDT via an available communication backbone. Any functionality of the physical layer processing not performed at the BS may be accomplished at the RDT, and the channels are converted to a single radio frequency signal, i.e., the downlink signal. The RDT system 740 then uses an available communication trunk line to transmit data back to the FLM 710 for use in determining RDT availability for additional registration or access requests by UEs.

Figure 13:
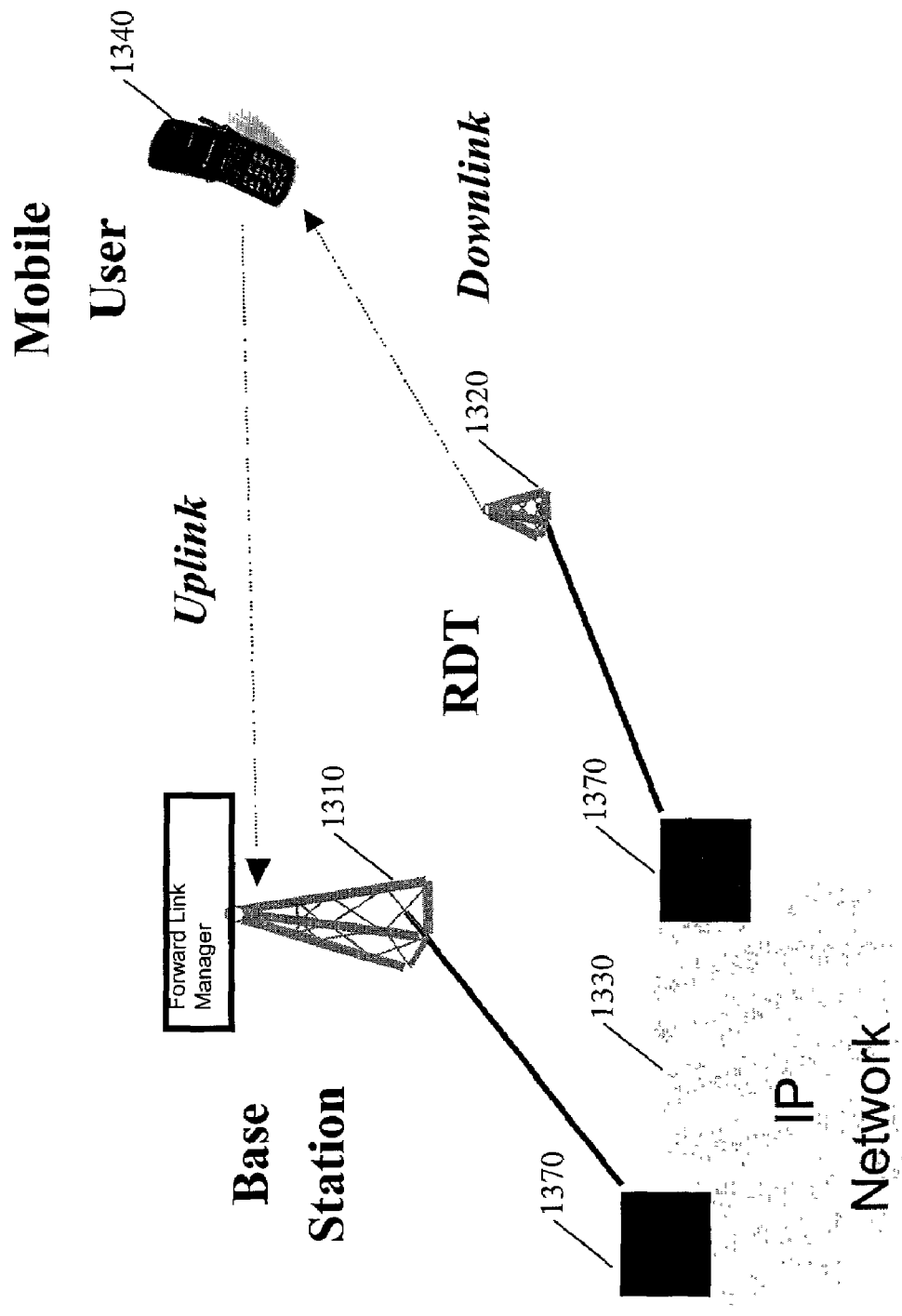
FIG. 13 shows an Internet Protocol (IP) network acting as a communication trunk line between an remote downlink transmitter and a base station in accordance with one embodiment of the present invention.

Consequently, the RDT system 740 represents an additional radio resource for a spread spectrum wireless network with physical constraints that may be different from the BS sectors themselves. For instance, the available data rates over the communication trunk line between an RDT and a BS can be limited to the equivalent of a T-1 line (~1.5 Mbps) and even vary with time if the link is a shared one. According to the embodiments of the present invention, the communication trunk line between an RDT and a BS may be implemented by a landline (i.e., wired) connection, such as via an Internet Protocol (IP) network, an optical data link, or a designated frequency band, such as an out-of-band RF, for wireless connection. FIG. 13 shows the use of an IP network 1370 as the communication link or trunk line between an RDT 1320 and its BS 1310, in accordance with one embodiment of the present invention. The forward link manager or FLM is located at the BS 1310. The RDT 1320 and the BS 1310 are connected to the IP network 1370 via IP routers 1370, which may be used to implement the routing functions of Router 720 shown in FIG. 7, as understood by one skilled in the art. The IP network 1370 can be a dedicated private data network for the communication trunk line, or it can be a public data network such as the Internet.

Referring back to the physical constraints of the RDT system, radiated power of an RDT also may be limited to a value substantially below that of the BS to lower the equipment cost of an RDT system. In addition, processor capacity may also be limited at the RDT such that no more than a fixed number of spreading, scrambling, and summing operations may be performed. As such, a capability is required to manage and optimally use the radio resources offered by the RDT. This functionality may be provided by the FLM 710, which is described next.

According to an embodiment of the present invention, the FLM module 710 may be software implemented at the BS. It receives information that is made available by the Router 720 and the RDT systems 740 for use in the FLM's decision process. That information includes details of a UE access or paging request as well as RDT performance metrics. The FLM 710 then makes decisions such as whether to use the RDT for UE access or paging based on a defined set of rules. Once the decisions are made, the FLM 710 submits them to the radio network layer 780, which either accepts the request or defers it to another radio resource in a different cell of the network. These FLM aspects are further discussed below with reference to FIG. 10.

Figure 10:
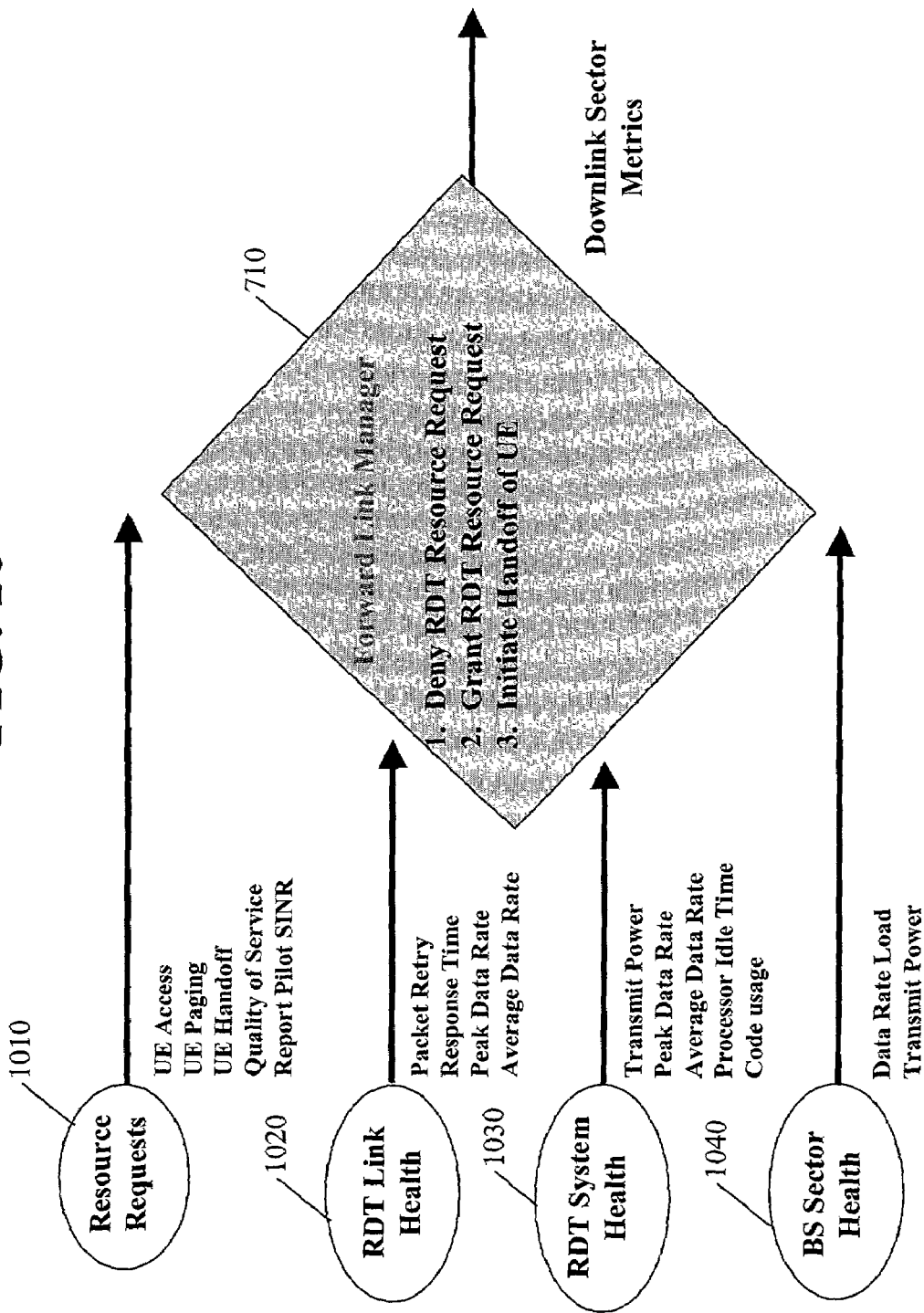
FIG. 10 shows the inputs, possible decisions, and outputs of the Forward Link Manager in accordance with one embodiment of the present invention.

FIG. 10 shows the inputs, possible decisions, and outputs of the FLM 710 in accordance with one embodiment of the present invention. A variety of inputs are desired to aid the FLM 710 in making decisions. For instance, the Router 720 may provide metrics describing the health of the communication trunk line out to the RDT, i.e., the RDT link health 1020. For a packet-based trunk line protocol, a representative set of parameters includes the average number of retransmits required for packets sent to the RDT, average time for successful reception of packet at the RDT, peak data rate, and average data rate. Likewise, other communication protocols may be assessed by other appropriate link health measures. All of these are valuable in ascertaining the ability of the trunk line to support an additional UE with sufficiently low latency. The Radio Network Layer 780 may provide the FLM 710 with resource requests 1010 for downlink support such as UE access, UE paging, and UE handoff. In addition, the desired quality of service (QoS) for the UE and its reported pilot SINR may be made available. The RDT system 740 itself may report current resource usage parameters such as total transmit power, processor idle time, the average and peak data rate coming into the RDT system 740, and the fraction of its assigned channelization codes used. Furthermore, metrics describing the loading of the downlink BS sector that the RDT is augmenting, i.e., BS sector health 1040, may be passed from the Radio Transport Layer 700.

Figure 11:
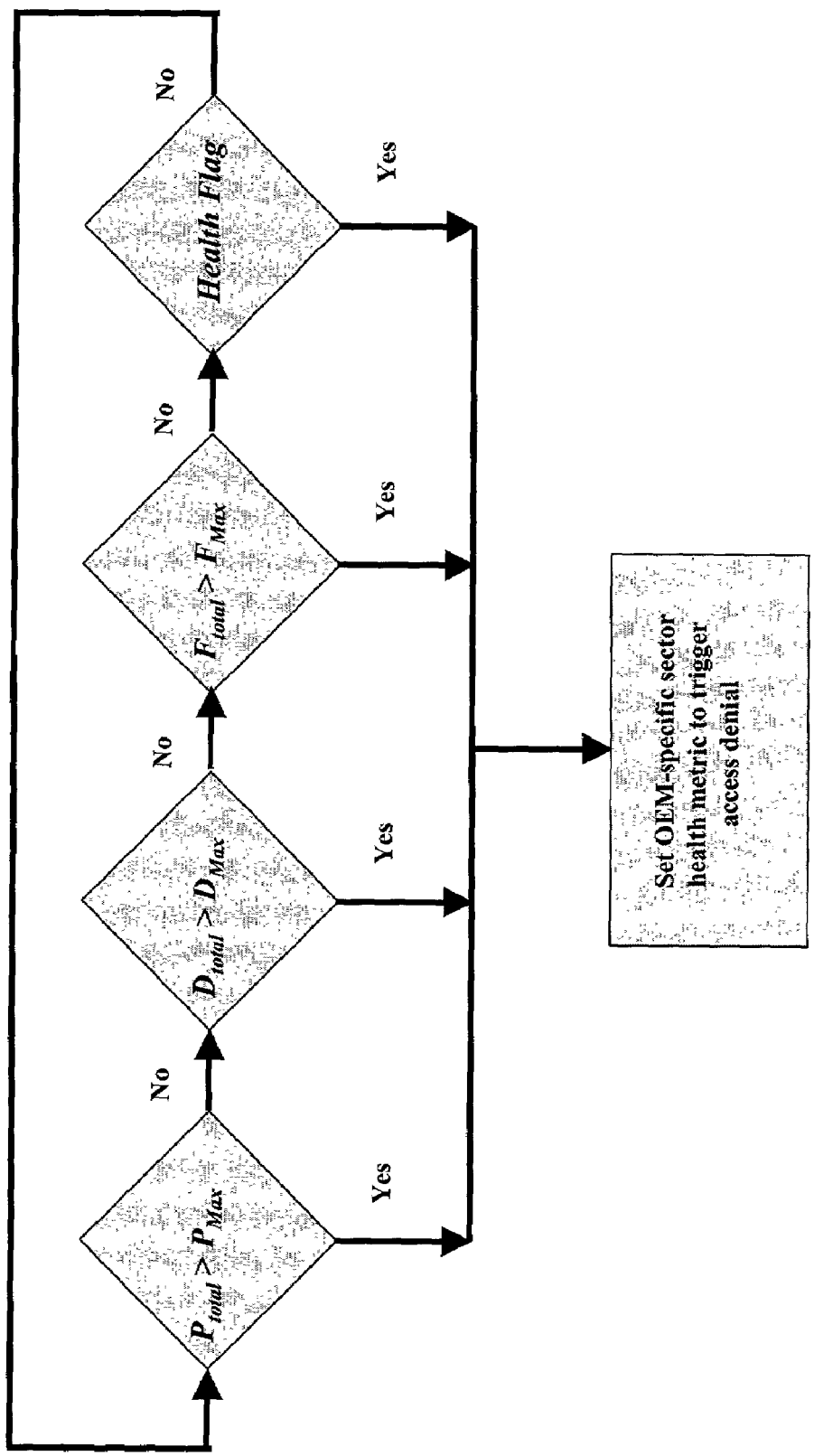
FIG. 11 shows a first-tier decision process as implemented by the FLM 710 shown in FIG. 9 in accordance with one embodiment of the present invention.

The FLM 710 then uses the above inputs to make a series of decisions. FIG. 11 shows a first tier of the decision structure implemented in the FLM 700 for determining whether any incoming UE service requests should be serviced by a particular RDT in a wireless network cell, in accordance with one embodiment of the present invention. P is the total radiated power at the RDT, D is the total data rate carried by the trunk line between the RDT and the BS, F is a measure of the processor load at the RDT, and Health Flag is set whenever an RDT diagnostic routine fails. The first tier of processing is continuous and asynchronous to any UE service requests. In this tier, the FLM 700 continually compares reported RDT resource usage (such as power, data rate, and processor capacity) to user-defined hard limits and forces the Radio Network Layer 780 to defer any additional load for the RDT if and resource exceeds the hard limits. In other words, as shown by conditions in FIG. 11, if the hard limits of P, D, or F are exceeded or the Health Flag is set, all subsequent requests for UE support from the RDT are denied.

Figure 12:
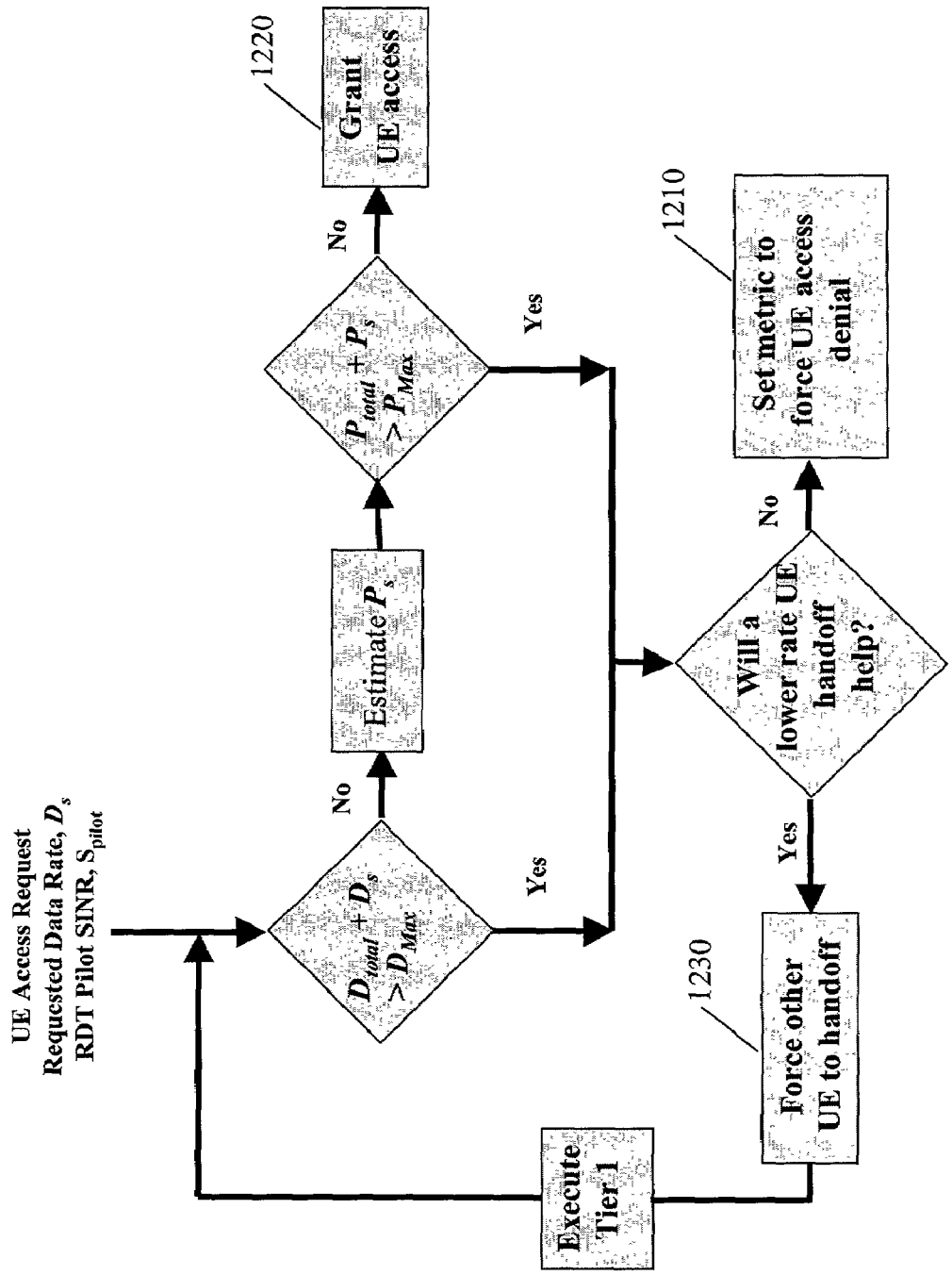
FIG. 12 shows a second-tier decision process as implemented by the FLM 710 shown in FIG. 9 in accordance with one embodiment of the present invention.

The second tier of FLM decisions predict the impact of offering the requesting service at the RDT. At this level, several supporting decisions may be made, including: 1) will providing the service force the RDT to exceed resource limits?; 2) is a channelization code available?; 3) will providing the service leave enough resources to support another UE request?; and 4) if an existing RDT-assigned UE using less resources is to be reassigned to the BS downlink sector, can the request UE service be provided? For instance, a voice user may be placed in handoff for reassignment to the BS downlink section in order to support a high data rate user. FIG. 12 shows a second-tier FLM decision flow in accordance with one embodiment of the present invention. Presuming the first tier processing has not detected any resource allocation violations, the second tier examines each new UE service request to determine the impact of offering the service. Furthermore, the FLM decisions made in the second tier are generally more sophisticated and are directed toward maximizing the load supported by the RDT. Based on the answers to the aforementioned questions in the second tier, which are derived from the FLM inputs, the FLM 700 make possible final decisions, including: 1) denying the RDT resource request 1210; 2) grant the RDT resource request 1220; or 3) force a UE currently supported by the UE into handoff 1230. Other decisions may also be made, such as deferring UE request to the BS downlink sector if it is lightly loaded. Implementation of the second-tier FLM decisions are left to the Radio Network Layer 780. This is done by generating downlink sector metrics that, in turn, are used by the Radio Network Layer 780 to manage downlink resources. In this manner, the RDT may be controlled by the Radio Network Layer 780 just as other BS downlink sectors are controlled.

The specific outputs of the FLM 710 may be whatever metrics that are used by the existing spread-spectrum based wireless network that is to be augmented by the dual-scale architecture of RDT systems of the present invention. Thus, the dual-scale network architecture of the present invention can be applied to any spread-spectrum wireless network. Two sample metrics are the ratio of transmitted power to maximum power and the ratio of current data throughput to maximum allowed throughput. The values of the metrics may be set to force the Radio Network Layer 780 to perform a desired action.

The above description for a micro-cellular architecture for the downlink enables the coding and spreading functions to occur either at the BS or the RDT system at a remote site, depending on the communication trunk line data throughput capability and processing resources allocated to the remote site. The coding, interleaving, spreading, scrambling, and RF subsystem elements can be implemented at the RDT with low cost equipment, as will be further explained later. The FLM 710 may be implemented by software and therefore has essentially zero recurring cost. The communication trunk line between an RDT system and a BS may also be implemented with Internet Protocol (IP) packet structures, as mentioned earlier, which allows low cost commercial routers to be used for the Router 720. Additionally, if all physical layer processing occurs in the RDT system at the remote site, the data throughput requirements for the trunk line are modest. Thus, a dual-scale, asymmetrical architecture for a spread-spectrum based, high-capacity wireless network can be implemented in a cost effective manner.

Now that a high level design of a baseline-RDT system for a spread-spectrum, wireless network has been shown and described, a detailed design of the baseline-RDT system at the component level is provided next as a representative implementation of a RDT system in accordance with one embodiment of the present invention.

Figure 14:
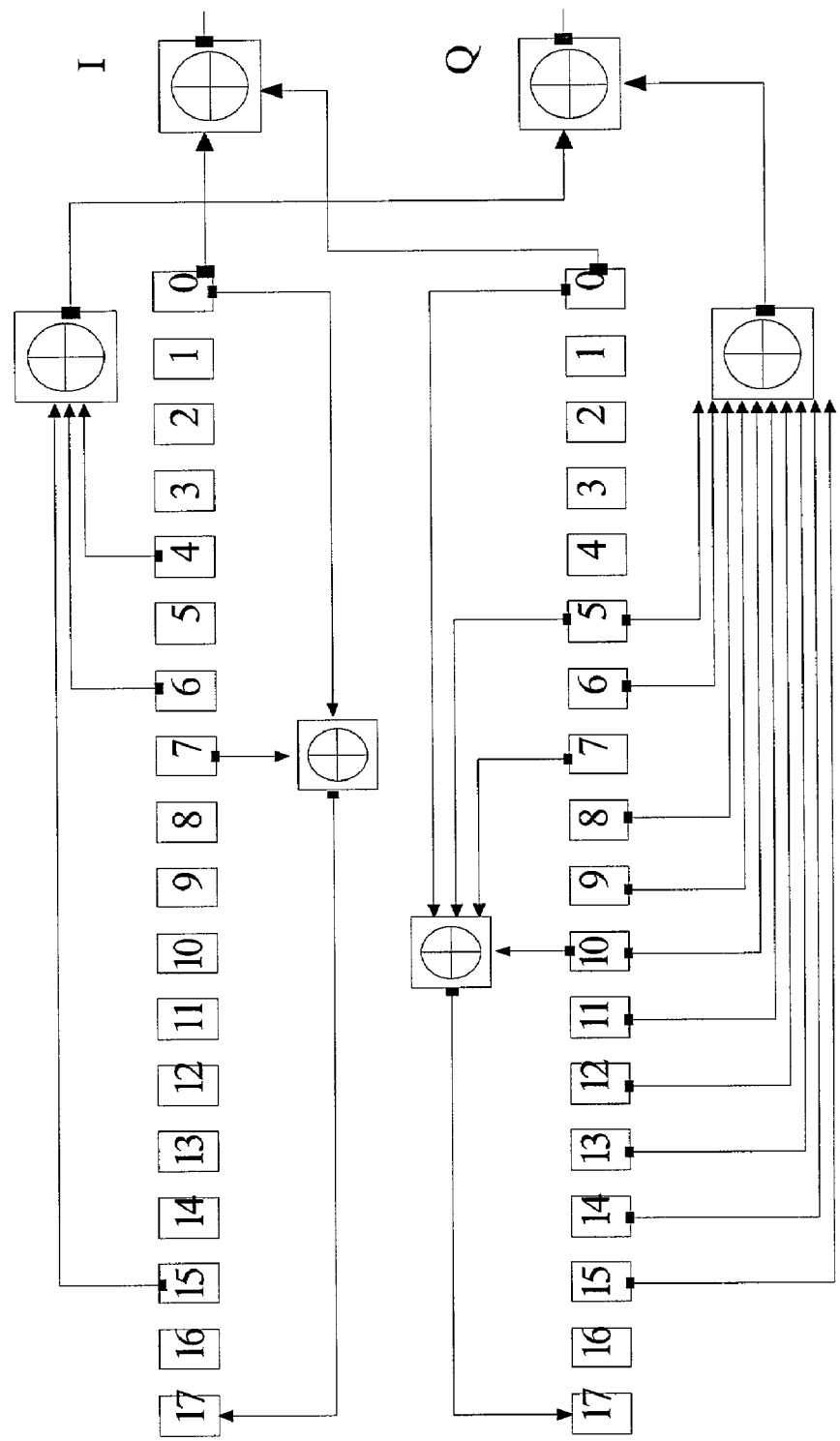
FIG. 14 shows a scrambling code generator that may be employed to support the physical layer processing at a RDT system in accordance with one embodiment of the present invention.
Figure 15A:
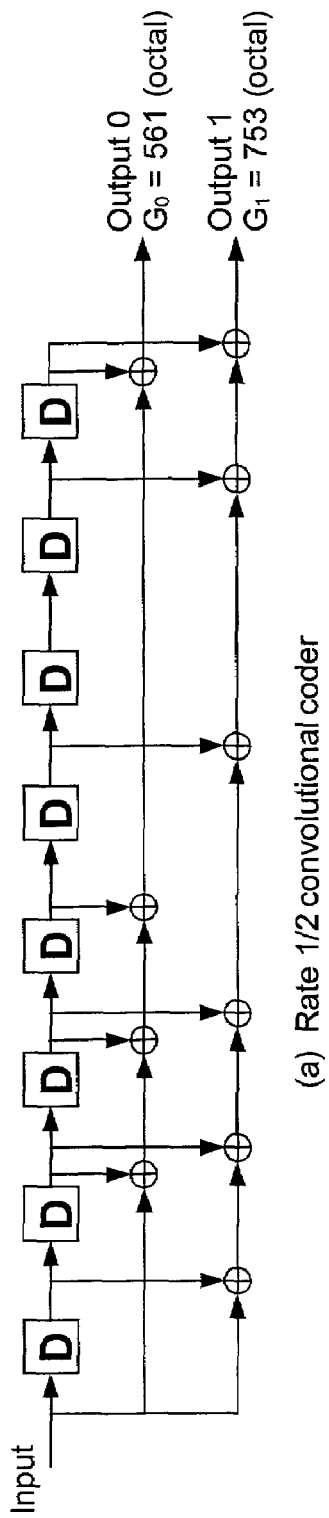
FIGS. 15A, 15B and 16 show various convolutional encoders that may be employed to support the physical layer processing at a RDT system in accordance with one embodiment of the present invention.
Figure 15B:
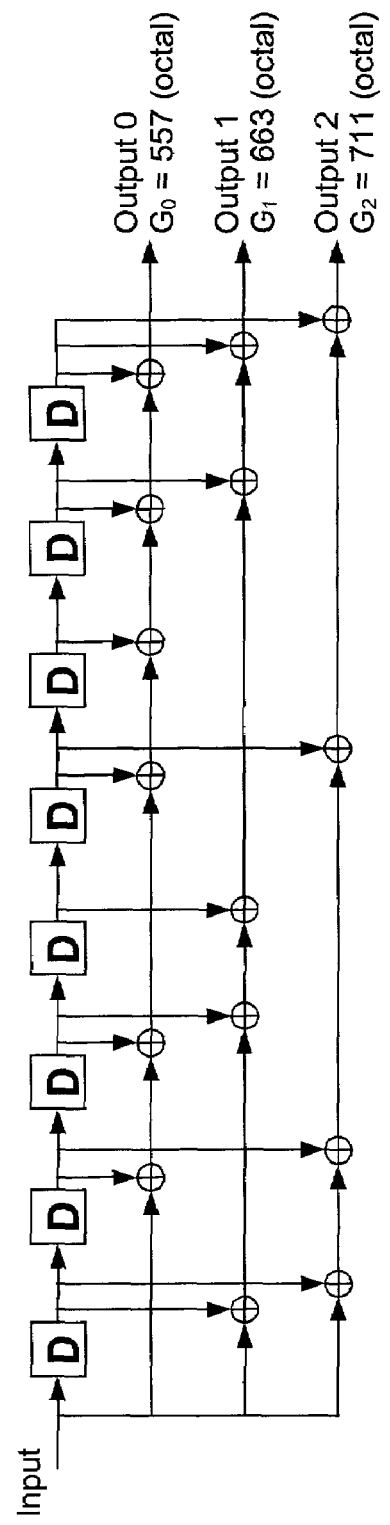
Figure 16:
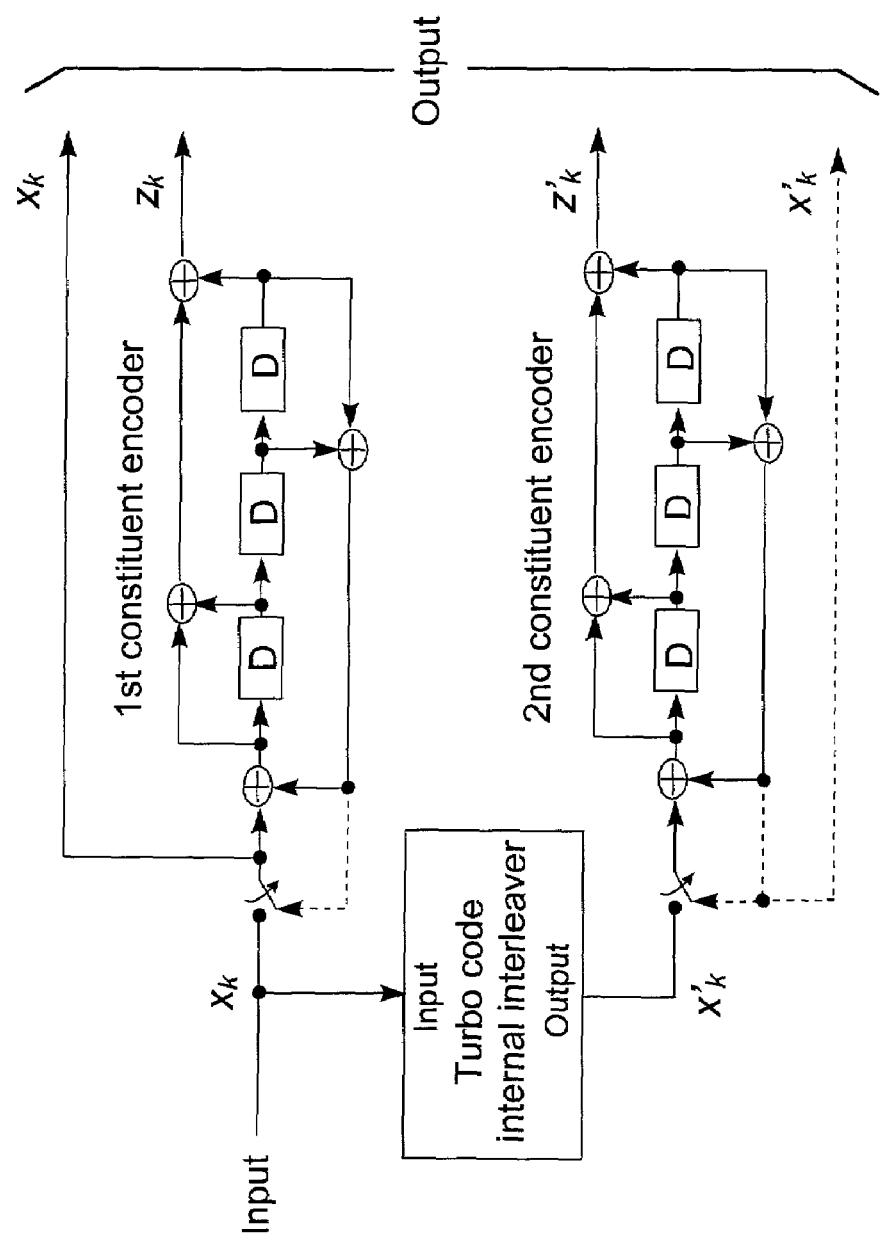

According to an embodiment of the present invention, there are two principle subsystems in an RDT system at the remote site: 1) the digital processing, which includes the digital-to-analog conversion aspect; and 2) the high power RF equipment. First, the RDT system includes a digital processing capability to complete the physical layer processing, including coding, interleaving, spreading, and scrambling. These functions were shown earlier in FIG. 9. In addition to the partially processed data received by the RDT system over the trunk line, control data including a channelization code identifier for each UE Dedicated Physical Channel, the scrambling code offset, a network timing reference, coding format indicator, and rate matching information may also be sent from the BS to the RDT system. Detailed diagrams of the coding and scrambling code generation functions are shown in FIGS. 14, 15, and 16.

Referring back to FIG. 9 with reference to FIG. 7, communication signals from the UEs are translated into physical channels and routed to a BS sector physical layer or an RDT system. Each physical channel is dedicated to a UE and includes two sub-channels for carrying two different streams of information. The first stream of information is carried by the data sub-channel and includes actual data to be sent to the UE. The second stream of information is carried by the control sub-channel and includes control information such as training bits, power control bits, and structural bits. If a physical channel, such as dedicated physical channel 1 in FIG. 9, is routed to an RDT system, the two streams of information from the physical channel is then fed into a coding and interleaving module 900 of the RDT system. Only the data stream is encoded by module 900. FIGS. 15 and 16 show various different encoding methods that can be used for performing the coding and interleaving, as provided in the 3GPP specifications mentioned earlier. For instance, as is known in the art, the coding format for the wireless network may require either rate ½ or rate ⅓ convolutional encoding, which can be implemented by the encoders shown in FIGS. 15A and 15B. These coding functions may be implemented either in a programmable processor or a dedicated integrated circuit (IC) chip within the RDT system. Alternatively, as also known in the art, the coding format for the wireless network may require two-dimensional convolutional encoding (also called Turbo coding), as shown in FIG. 16. This coding function also may be implemented either in the programmable processor or a dedicated integrated circuit (IC) chip within the RDT system. Furthermore, the channelization codes (Orthogonal Variable Spreading Factor codes) are amenable to permanent storage in a look-up table. The combination of these factors makes implementation of the baseband digital processing suitable for a static ram field programmable gate array (FPGA).

Referring back to FIG. 9, after exiting the coding and interleaving module 900, the data sub-channel and the control sub-channel are separated, with the data sub-channel denoted by line 910, and the control sub-channel by line 920. Each sub-channel is then spreaded by a respective spreading code, $C_{ch,SF,m}$. The spreaded control sub-channel is then phase shifted by 90 degrees, as represented by the multiplication of the control sub-channel by j at the multiplier 940, to denote a complex number. At the summation 940, the two sub-channels 910 and 920 are combined as a stream of binary complex numbers representing the signal to be transmitted to a UE. The signal is subsequently scrambled by a downlink scrambling code, $S_{dl,n}$, via the multiplier 950. FIG. 14 shows the generator for the baseband in-phase (I) and quadrature (Q) channel scrambling codes in accordance with one embodiment of the present invention. The appropriate initial state of the shift registers is provided by the BS over the RDT trunk line. The codes are modulo-2 summed with the spread data. Each output bit of the spreader is alternately mapped to the I and Q channels by the appropriate code. The Q-channel scrambling code is then phased shifted by 90 degrees and summed with the I-channel scrambling code to generate the downlink scrambling code, $S_{dl,n}$. The output of the multiplier 950 is them multiplied by a power control gain G1, an amplitude factor, to generate a floating point amplitude for the downlink data signal to the UE. Summation 960 are then used to total the downlink data signals to the UEs from all dedicated physical channels 1 to N for subsequent conversion to RF signals via the RF circuitry shown to the right of the summation 960 in FIG. 9.

Figure 17:
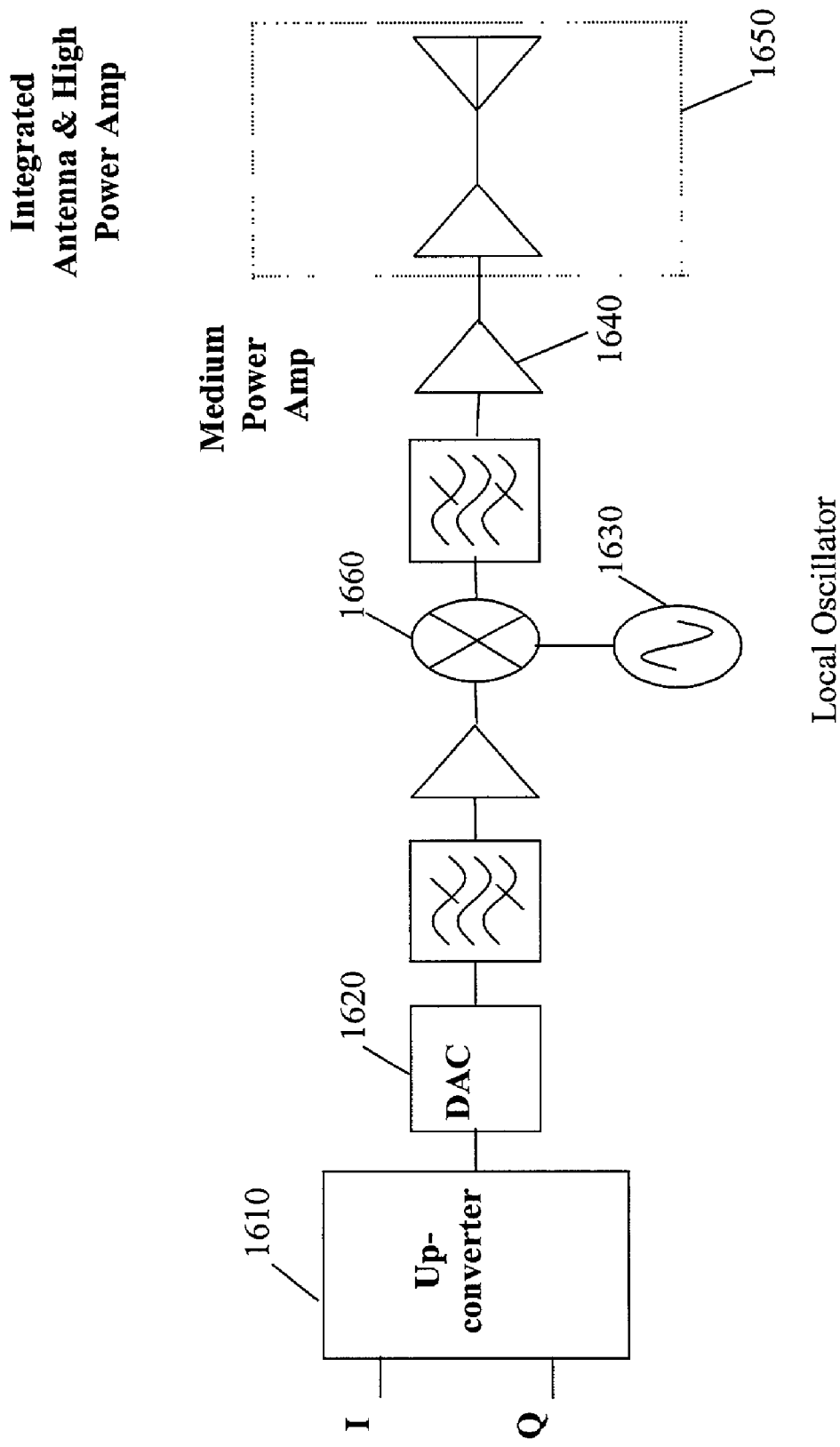
FIG. 17 shows the baseband and intermediate frequency (IF) processing scheme that may be employed at a RDT system in accordance with one embodiment of the present invention.

The RF circuitry of FIG. 9 may be alternately represented as an implementation of the baseband and intermediate frequency (IF) processing, as illustrated in FIG. 17. The figure shows the conversion of the digital, baseband representation of the I and Q channels, which represent the total outputs from the summation 960 of FIG. 9, to high power radio frequency (RF). As seen in FIG. 17, the baseband in-phase (I) and quadrature (O) channels are fed into a digital up-converter 1610 (e.g., a Graychip GC4114 or an Analog Devices AD6622), where the data is filtered, interpolated and mixed with a numerically controlled oscillator (NCO) up to the IF frequency. Next, the digital IF data is fed to a fast digital-to-analog converter (DAC) 1620 (e.g., Analog Devices AD9772). The output of the DAC 1620 is then filtered and mixed with a local oscillator 1630 up to the operating band. The output of this mixer 1660 is amplified by a medium power amplifier 1640 and fed to an integrated power amplifier/antenna high power RF subsystem 1650.

Figure 18:
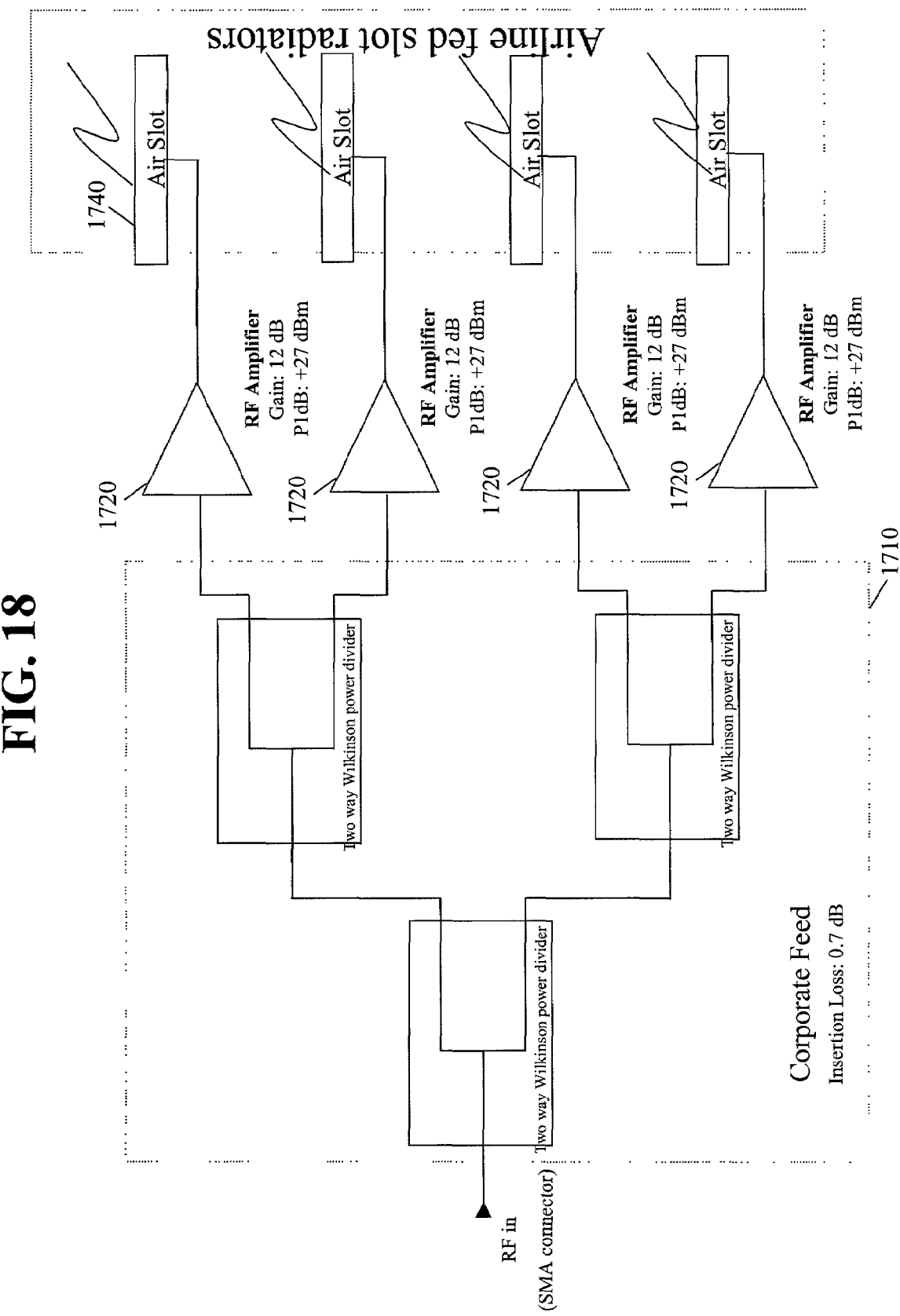
FIG. 18 shows an integrated power amplifier/antenna high power RF subsystem that may be employed in a RDT system in accordance with one embodiment of the present invention.

According to an embodiment of the present invention, one implementation of the integrated power amplifier/antenna high power RF subsystem 1650 in an RDT system is illustrated in FIG. 18, which shows the conversion of medium power RF signals to the high power W-CDMA RF waveforms for transmission to UEs. The antenna includes a 4-element array of slots, producing vertical polarization. The use of air-filled transmission lines improves efficiency and lowers manufacturing cost. This implementation includes an airline corporate feed structure 1710, integrated power amplifiers 1720, and airline fed slot radiating elements 1730 as integral components of a multi-layer board. An airline refers to a waveguide filled with air. A waveguide is constructed of conducting materials. Currents flow in the material generate electromagnetic waves that propagate in the air-filled portion of the waveguide cavity. Because the cavity is filled with air instead of a material (e.g., plastic) there are almost no energy losses to heating. An airline fed slot radiator refers to an opening in the conducting wall of the waveguide that allows the electromagnetic wave to exit or "escape" and radiate in a controlled manner.

Figure 19A:
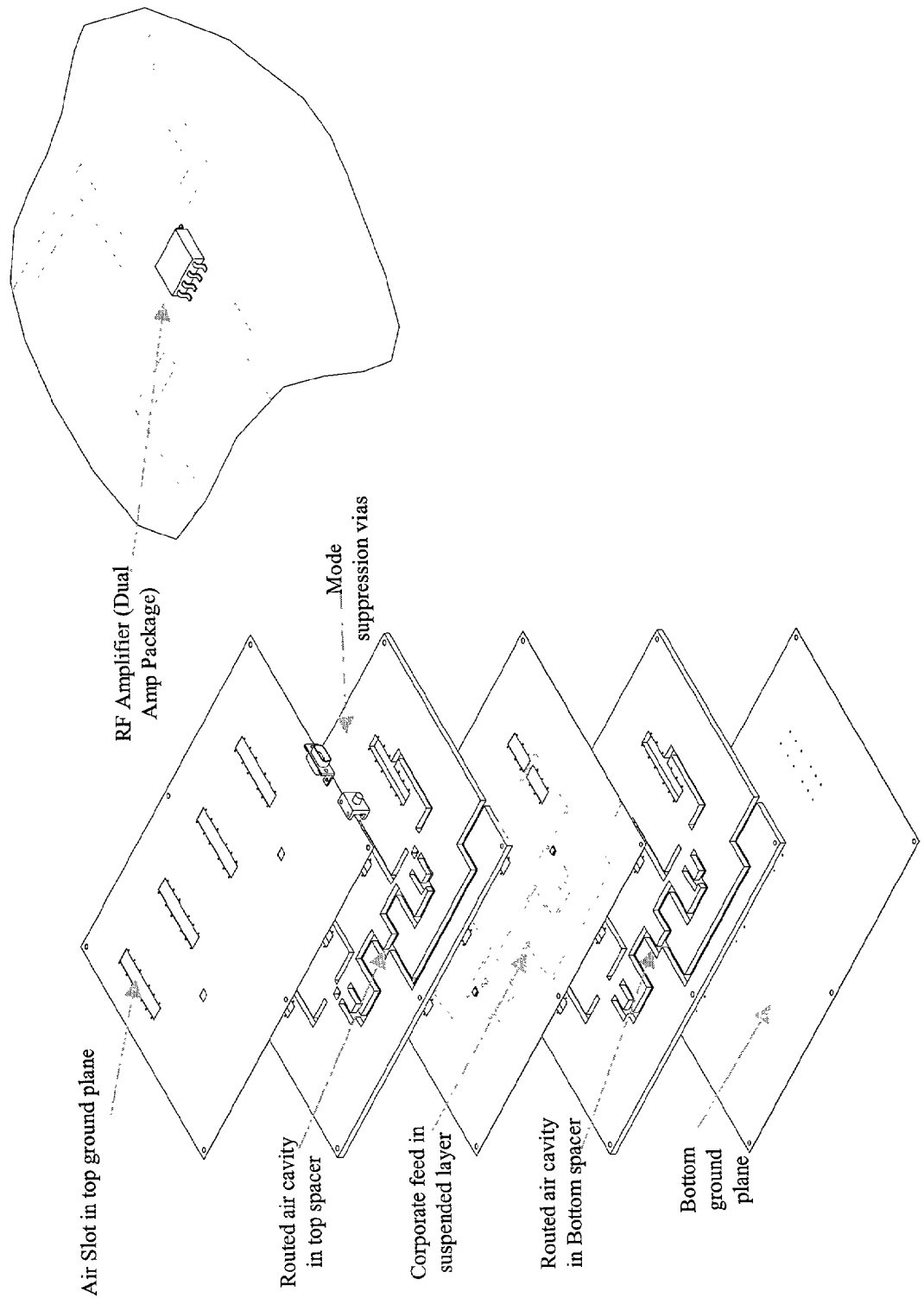
FIGS. 19A and 19B show the high power RF subsystem of FIG. 18 as a multi-layer printed wiring board stack up in accordance with one embodiment of the present invention.
Figure 19B:
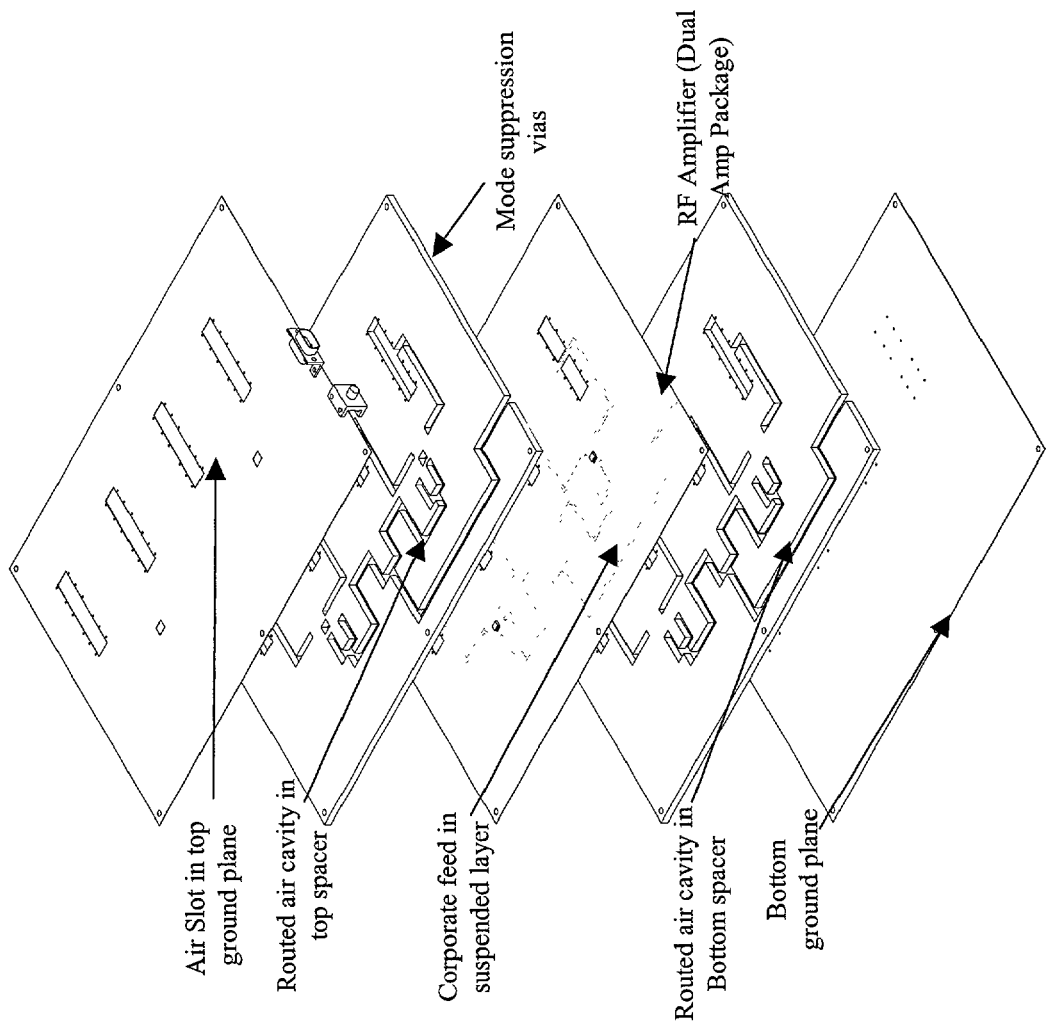

FIGS. 19A and 19B show the high power RF subsystem 1650 including the integrated power amplifier, transmission line, feed, and antenna element as a multi-layer printed wiring board (PWB) stack up, in accordance to various embodiments of the present invention. The coupling mechanism to the slot is an airline as well. The use of unloaded slot provides excellent low loss characteristics for this application. Furthermore, PWB board materials, such as FR4, are inexpensive and easily fabricated. The combination of a FPGA based digital processing architecture and the air-backed slot antenna design lead to an extremely robust and low cost design for the RDT system at the remote site and support the specific initial RDT physical design.

Figure 20:
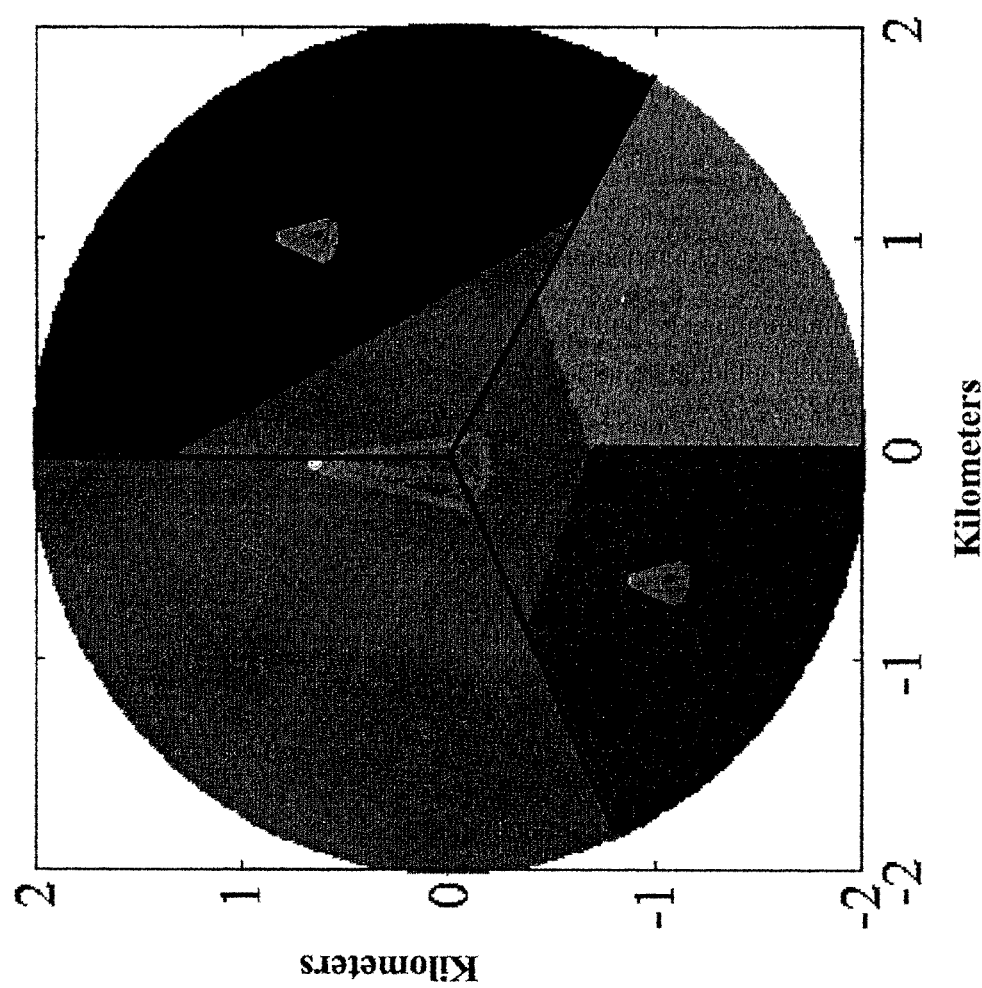
FIG. 20 shows a sample implementation of RDTs in physical sectors of a base station in accordance with one embodiment of the present invention.

In summary, the dual-scale, asymmetrical architecture for a spread-spectrum based wireless network of the present invention may be implemented through the inclusion of the FLM, Router, and RDT systems in original-equipment-manufacturer (OEM) or existing operator equipment. The architecture itself may be implemented via placement of 0, 1, or more RDT systems per BS sector in the existing macro-cellular environment. Optimal citing of the BS and the remote sites for RDT systems can be determined through the use of appropriate network modeling tools, such as the SAIC W-CDMA Network Model. A sample implementation with 0, 1, and 2 RDTs in each of three original BS sectors, respectively, is shown in FIG. 20. The sample RDT implementation is done in a W-CDMA, three-sector macro-cell with a 2 km circular coverage area. The shadings show the coverage area of the BS and the RDTs, assuming assignment is based on the closest downlink radio resource. This assignment assumes the RDTs offer 360-degree coverage. It is also assumed that the uplink resides in the sector containing the RDT although this is not required. As mentioned earlier, simulations have shown total network capacity to be relatively insensitive to disadvantaged citing of the RDT system. As such, RDT placement may be within 3 meters of urban rooftops or lower, e.g. on top of telephone poles.

With regard to the FLM, it may be implemented in Rational Rose Real Time modeling language. As one skilled in the art can realize from the present disclosure, alterations may be desired to tailor the FLM inputs and outputs to those available and expected by the targeted wireless network to which the dual-scale asymmetrical architecture of the present invention is augmented.

With regard to the Router, as mentioned earlier, it may be implemented using existing commercial-off-the-shelf (COTS) equipment IP routers for IP-based base stations. Alternatively, a particular design with the same functionality and capable of interfacing with the OEM BS may be desired.

Figure 21:
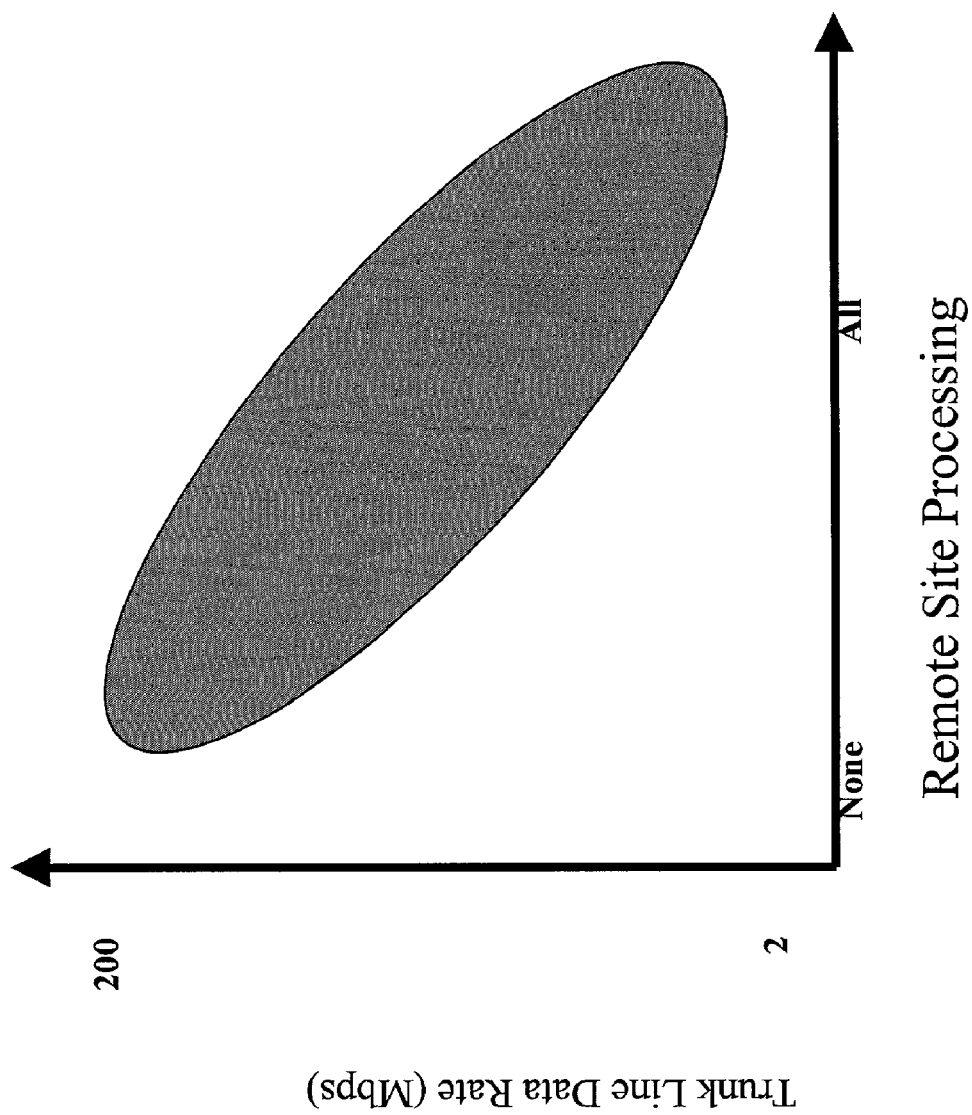
FIG. 21 shows a design space for design variants of a dual-scale wireless network architecture in accordance with one embodiment of the present invention.
Figure 22:
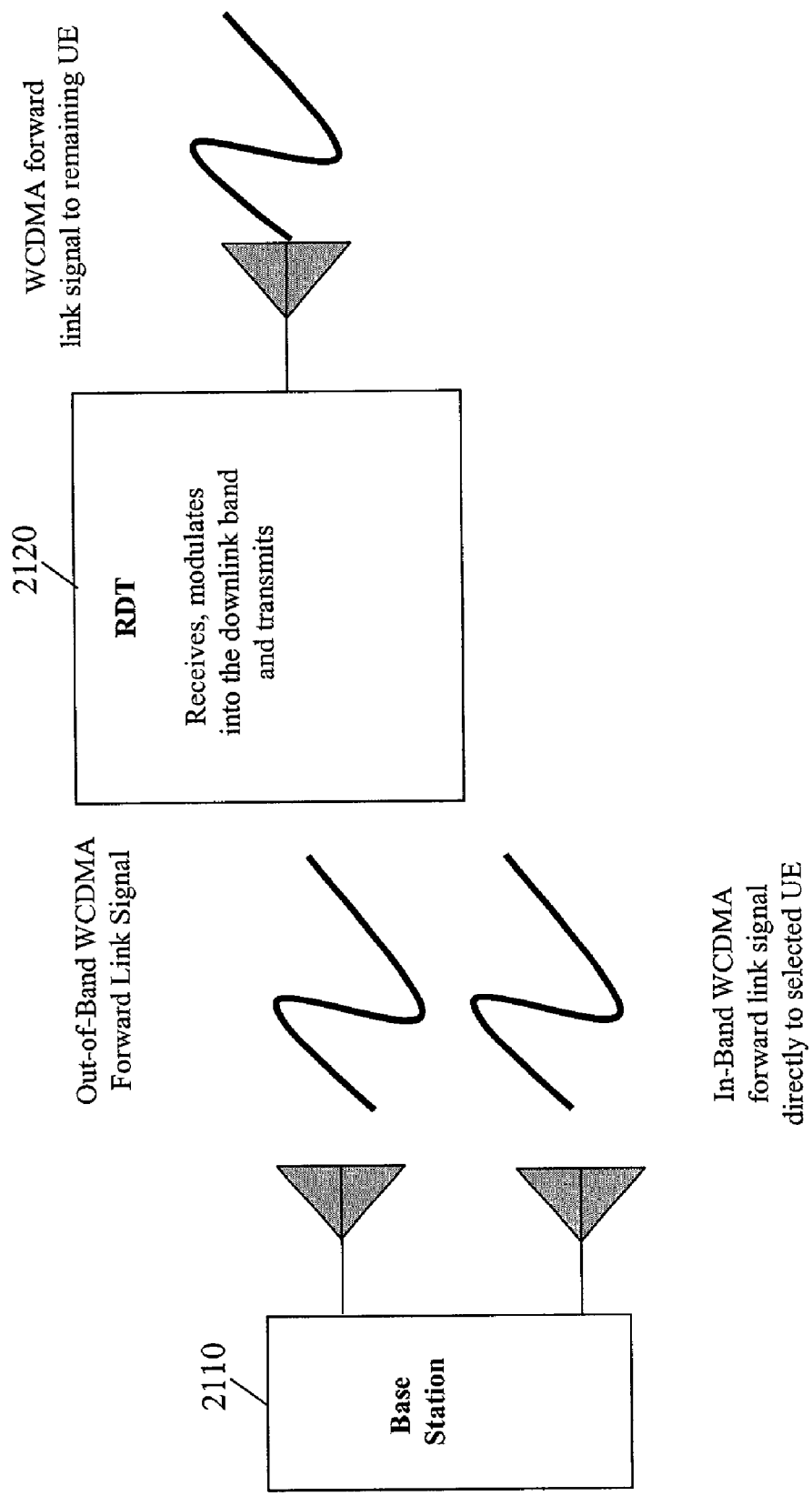
FIGS. 22–25 show various design variants of a dual-scale wireless network architecture that correspond to possible points in the design space shown in FIG. 21.
Figure 23:
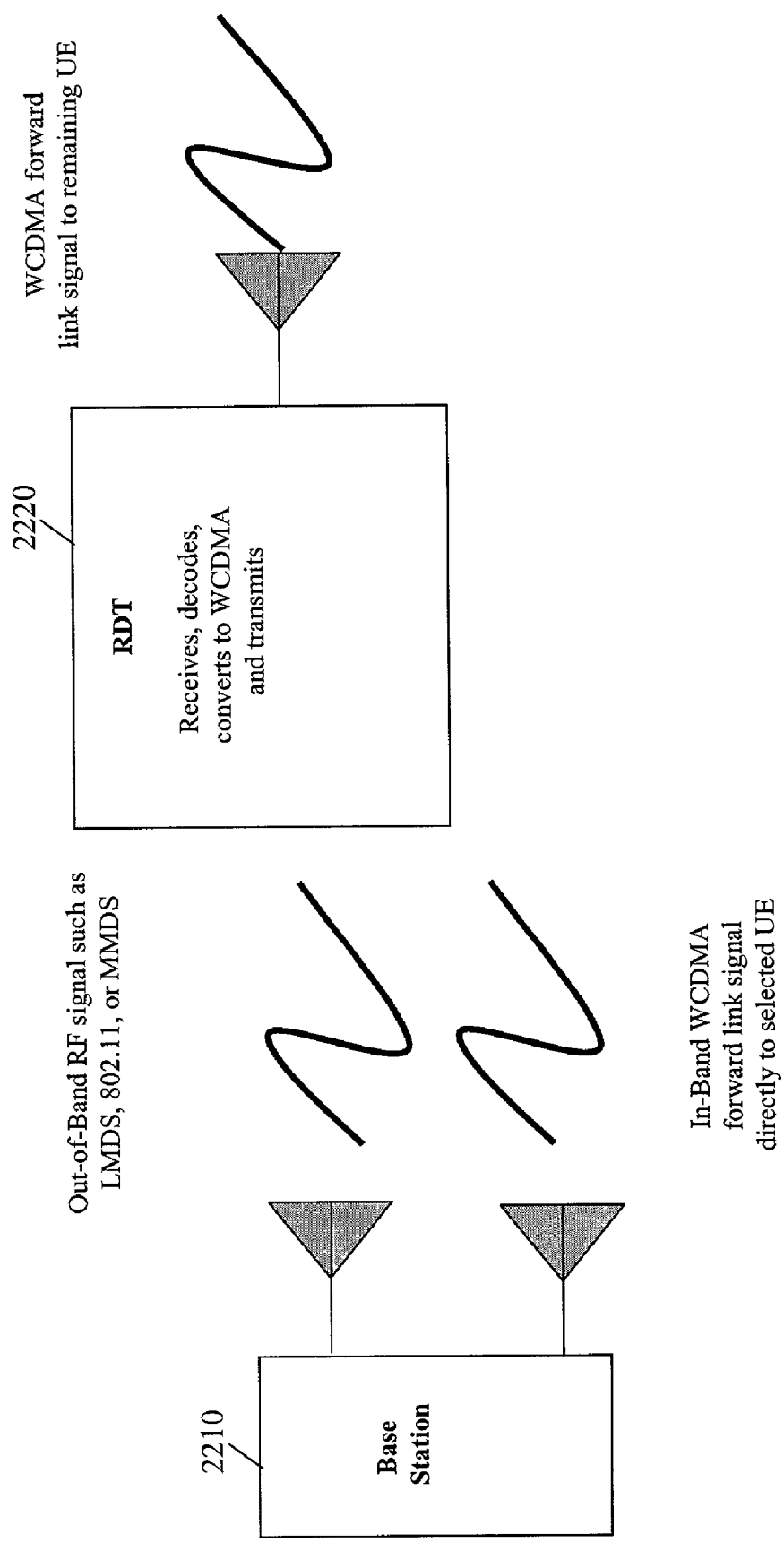
Figure 24:
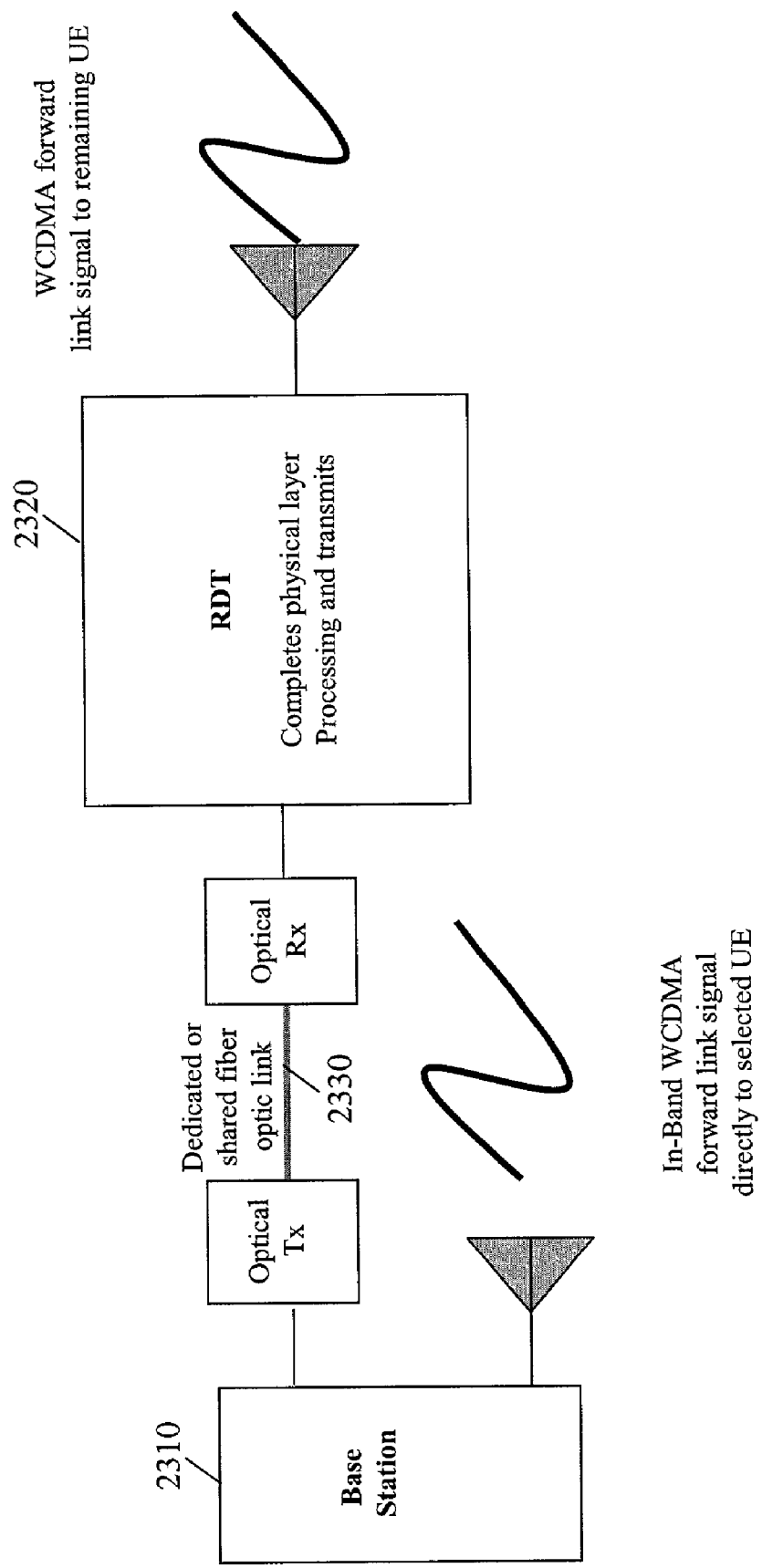
Figure 25:
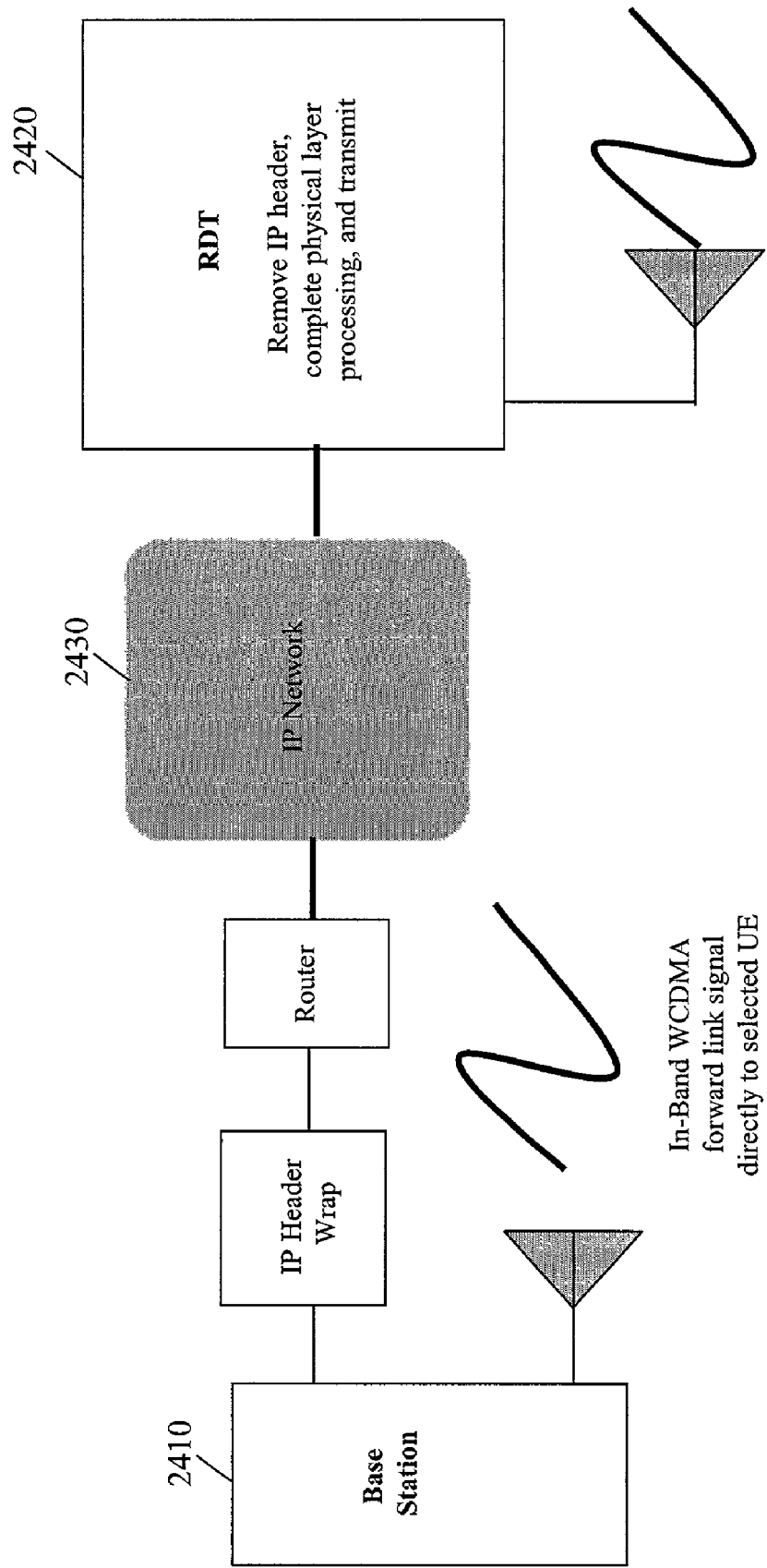

With regard to the RDT systems, they have been described in detail earlier. The principal design space governing other possible implementations includes a two-dimensional design with the communication trunk line characteristics serving as one parameter and the degree of physical layer processing occurring at the remote site as the other parameter. FIG. 21 shows this design space. As simplified in the figure, many of the various implementations of an RDT may be categorized as a point in the design space. The valid space ranges from execution of virtually all physical layer processing at the BS with a high bandwidth trunk line out to the remote site to execution of virtually all physical layer processing at the remote site with a low bandwidth trunk line, wherein the latter implementation may be most cost effective.

FIGS. 22–25 show possible points in the design space of FIG. 20. In the embodiment of an RDT implementation shown in FIG. 22, the complete downlink signal is generated by the BS 2110 and transmitted via an out-of-band frequency link to the RDT 2120 at the remote site. The RDT 2120 then modulates the received signal and transmits the modulated signal to the UE. Thus, the remote site only utilizes analog components, namely an oscillator, mixer, amplifier, filters, and antennas. In the embodiment of an RDT implementation shown in FIG. 23, the output signal of the BS scrambling module is transmitted via an out-of-band radio frequency link to an RDT 2220 at a remote site. The RDT 2220 then decodes the received signal, modulates the decoded signal into a W-CDMA signal, and transmits the modulated signal to the UE. Thus, the remote site does manipulate digital data but does not require any UE specific knowledge such as channelization or scrambling modes. In the embodiment of an RDT implementation shown in FIG. 24, the data flow at any point in the physical layer processing is carried via an available landline connection, such as an optical fiber transmission line 2330 from the BS 2310 to the RDT 2320. Any contiguous portion of the processing steps from the convolutional encoding to the scrambling may be performed at the BS 2310 with the remainder executed at the RDT 2320. In the embodiment of an RDT implementation shown in FIG. 25, the data flow at any point in the physical layer processing is carried via an available dedicated or shared IP network 2430. Any contiguous portion of the processing steps from the convolutional encoding to the scrambling may be performed at the BS 2410 with the remainder executed at the RDT 2420.

The ability of RDTs to increase the capacity of a W-CDMA macrocell, irrespective of the quality of service mix has been demonstrated above. As is understood by one skilled in the art, the quality of service mix refers to the mix of different qualities of service for different types of communication. For instance, all voice communication requires one quality of service, and "high speed data" communication requires another quality of service. Furthermore, the performance enhancements for the downlink path, made possible by the RDTs of the present invention, are independent of the uplink capacity or processing. Such enhancements, coupled with the potential desire of wireless network operators to offer a quality of service with unequal data rates on the downlink and uplink, advance the RDT technology of the present invention as a critical component for W-CDMA network deployments that seek intermediate investment between low-cost voice only coverage high cost, two-way, ubiquitous high data rate coverage. Specifically, operators may wish to offer a service with a low data rate uplink but high data rate downlink. This paradigm has already emerged, for instance, for Internet service providers (ISPs) in the cable industry. Thus, the RDTs may be uniquely utilized to offer an enhanced service option of asymmetric high speed data service to subscribers, as described next.

According to an embodiment of the present invention, the asymmetric high speed data service may be provided by implementing the complete RDT architecture shown in FIG. 7 for a wireless network, including the FLM 710, Router 720, a BS-to-RDT communication channel such as shown in FIGS. 22–25, and the remote site hardware constitute the RDT. As described earlier, each RDT system is logically treated as an additional sector for the BS; i.e., the RDT "appears" to the transport network layer 700 as another BS sector. While the W-CDMA protocol facilitates differing spreading factors (and, hence, data rates) between the uplink and downlink, the network operator can implement link management techniques to admit and serve asymmetric links as described earlier. Hence, the use of the RDT architecture is a cost efficient way to implement those link management decisions.

Figure 26B:
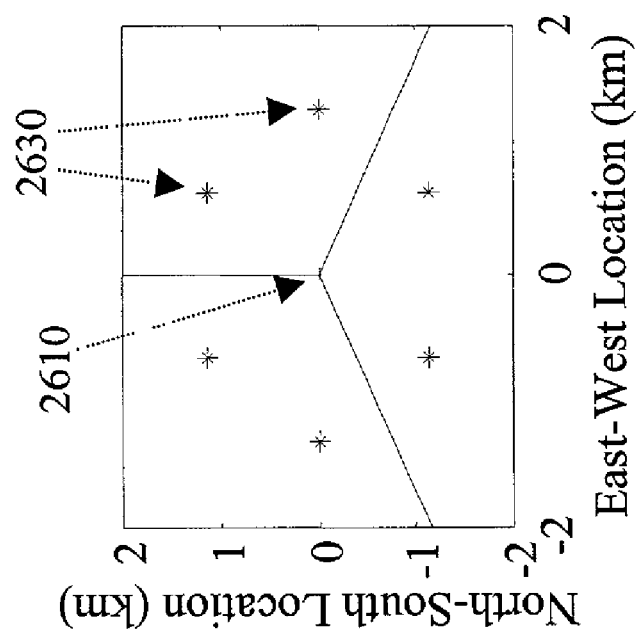
FIGS. 26A and 26B show the positioning of base stations and RDTs in a wireless network for a simulation on enhanced asymmetric data service in accordance with one embodiment of the present invention.
Figure 26A:
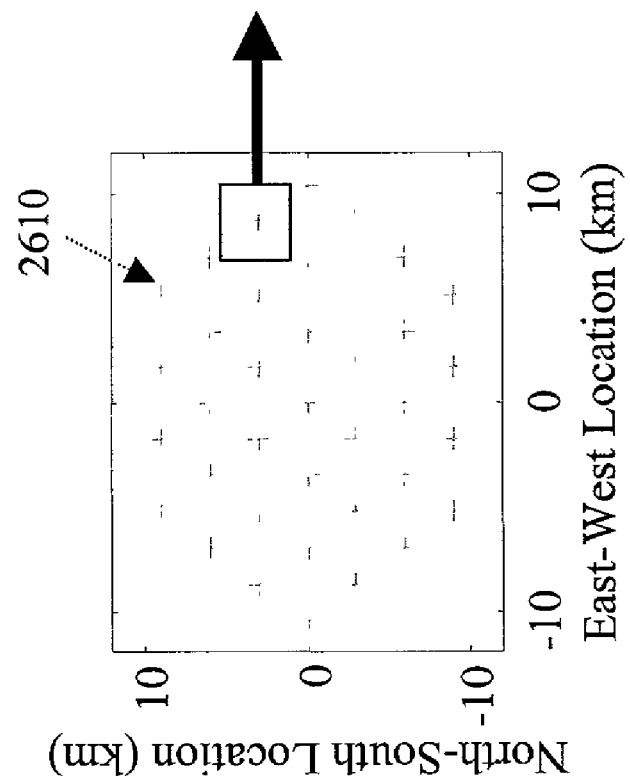

To verify that the RDT technology of the present invention can facilitate an enhanced asymmetric data service, a high-fidelity network simulation is used to predict the fraction of high data rate users (384 kbps) that are denied coverage as a function of the offered number of high data rate users for both a baseline network (no RDT) and an enhanced network (with RDT). Several voice loading conditions are considered, including: high (60 users/sector); medium (40 users/sector); and low (20 users/sector). FIGS. 26A and 26B show the positioning of base stations and RDTs for the high-fidelity network simulation. FIG. 26A shows that the overall network includes 37 BSs 2610 (denoted by the symbol +) covering nearly 300 km$^2$. Each base station 2610 has three sectors 2650 and is provisioned with 0, 1, or 2 RDTs 2630 (denoted by the symbol *) per sector, with the 2 RDTs/sector case being illustrated in FIG. 26B. For the 1 RDT/sector case, the RDT 2630 is positioned about 1.3 km out along the sector bisector. The operating parameters of each three-sectored base station is consistent with the RF simulation guidelines in the 3GPP Specification number 25.922, version 3.10, which is herein incorporated by reference in its entirety. Specifically, power limitations, signal bandwidths, and physical layer processing details are drawn from the specification. The offered load and quality of service mix is assumed uniform over all sectors in the network. In the enhanced networks, the RDTs are placed in each sector at a disadvantaged height of 20 meters and assigned, via a minimum path loss criteria, to the users in the sector. As with the aforementioned RDT simulations, all data required by the RDT to assemble Dedicated Physical Channels (DPCH) for its assigned users may be conveyed via an available out-of-band communications link between a base station and an associated RDT.

Figure 27:
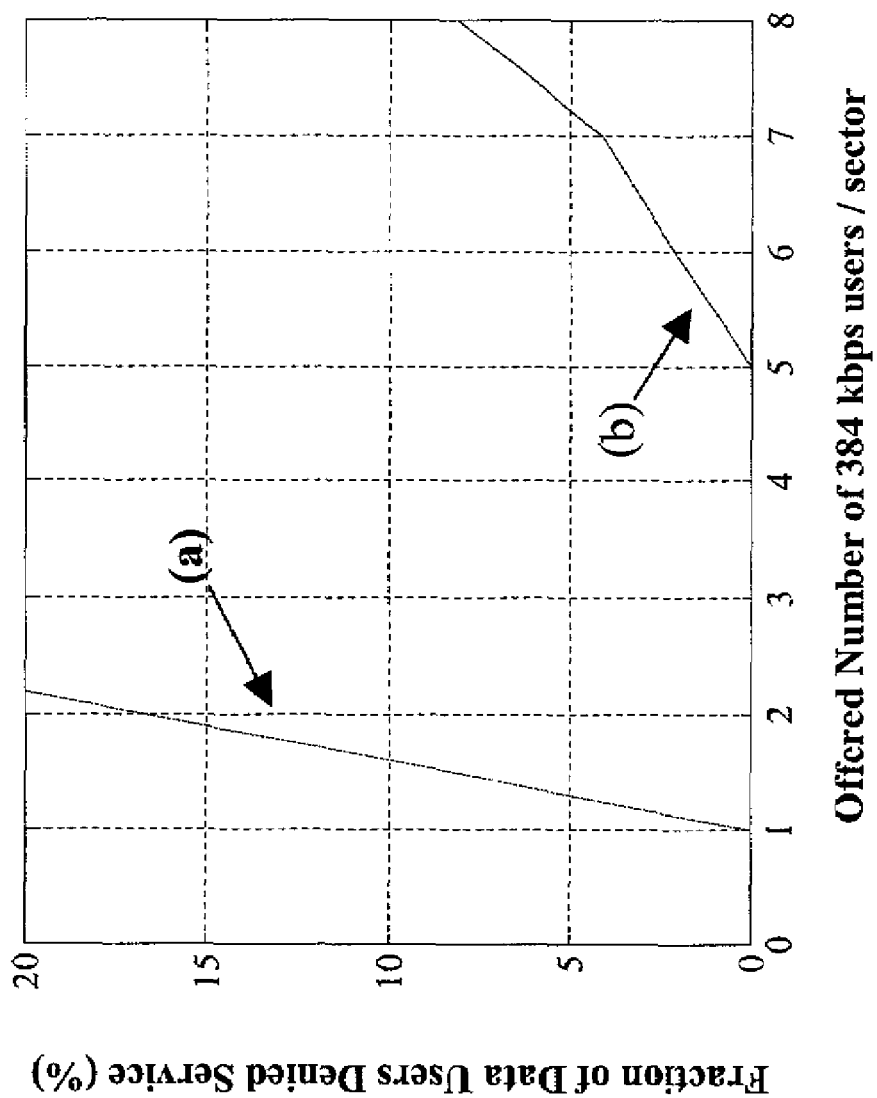
FIG. 27 shows the simulation results for the network of FIGS. 26A–B having relatively high voice channel loading, in accordance with an embodiment of the present invention.
Figure 28:
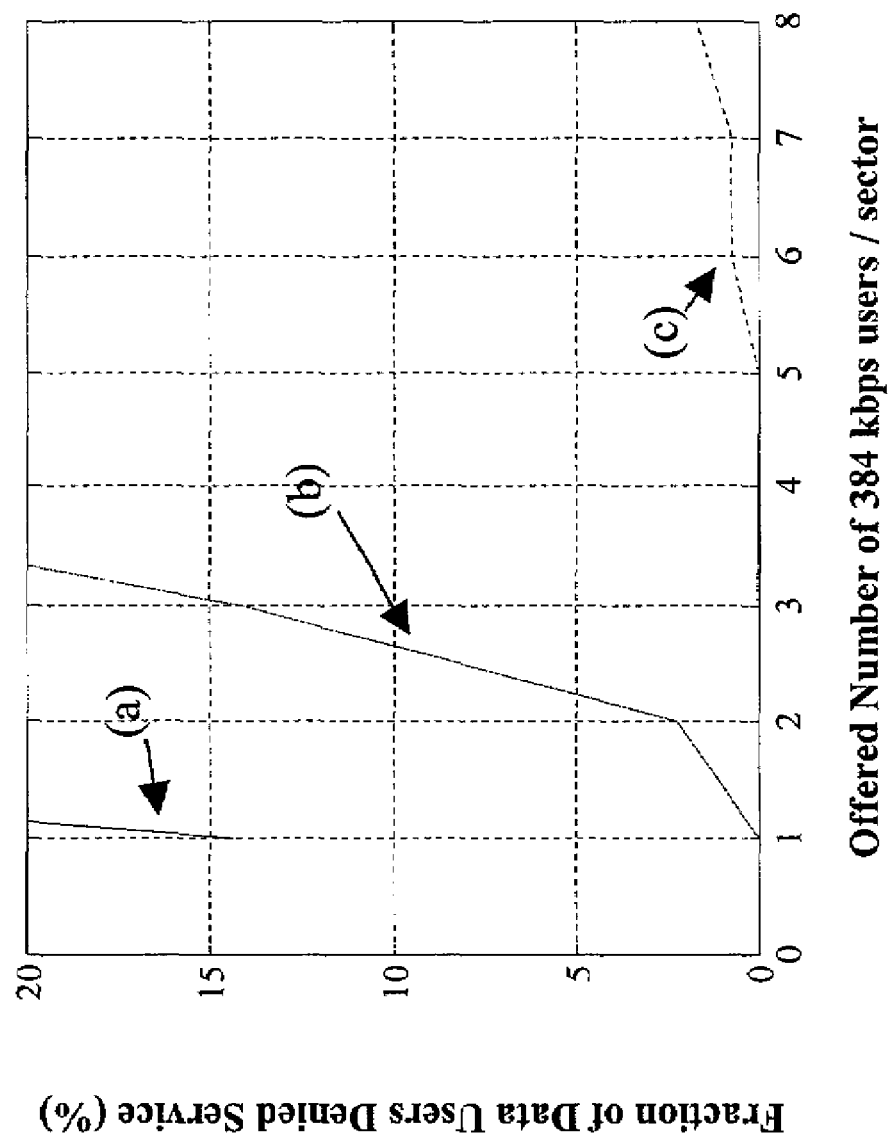
FIG. 28 shows the simulation results for the network of FIGS. 26A–B having relatively moderate or medium voice channel loading, in accordance with one embodiment of the present invention.
Figure 29:
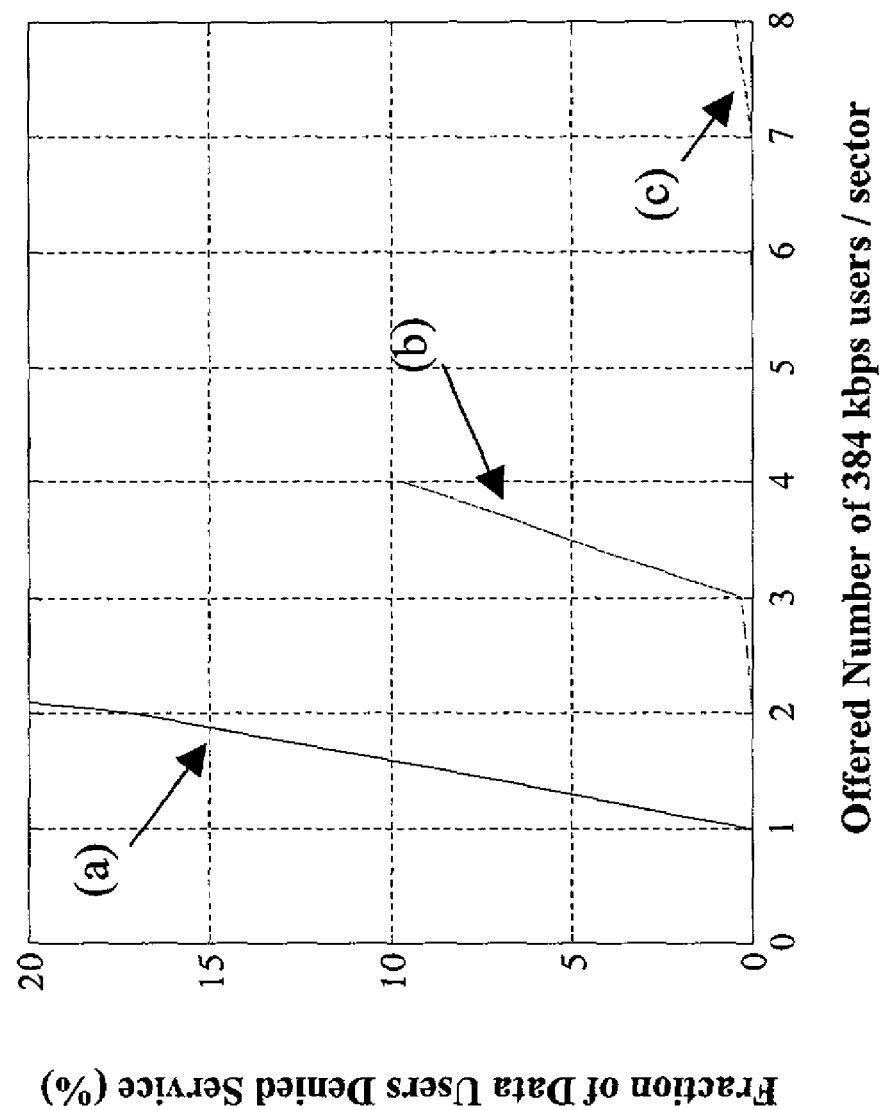
FIG. 29 shows the simulation results for the network of FIGS. 26A–B having relatively low voice channel loading, in accordance with one embodiment of the present invention.

The ability of an RDT architecture of the present invention to support high data rate downlinks is confirmed by the simulation results shown in FIGS. 27–29. These figures show the fraction of high data users denied service as a function of offered high data rate users for a baseline (no RDT) network, a 1 RDT/sector enhanced network, and a 2 RDTs/sector enhanced network of FIGS. 26A–B, all simulated with parameters consistent with a nominal W-CDMA network (per the 3GPP specification). Specifically, FIG. 27 shows the results of a simulation for a relatively high voice channel loading (60 channels/sector) in the baseline and enhanced networks. The baseline network has greater than 20% denial of data service for all offered number of data users per sector; hence, it does not appear in FIG. 27. The simulation results for the 1 RDT/sector network and 2 RDTs/sector network are shown, respectively, in lines (a) and (b) of the figure. FIG. 28 shows the results of a simulation for a relatively moderate or medium voice channel loading (40 channels/sector) in the baseline and enhanced networks. The simulation results for the baseline, 1 RDT/sector, and 2 RDTs/sector networks are shown, respectively, in lines (a), (b), and (c) of FIG. 28. FIG. 29 shows the results of a simulation for a relatively low voice channel loading (20 channels/sector) in the baseline and enhanced networks. The simulation results for a baseline, 1 RDT/sector, and 2 RDTs/sector networks are shown, respectively, in lines (a), (b), and (c) of FIG. 29. As shown in line (c), in the 2 RDTs/sector case, no service denial occurs for less than 8 data users per sector. It should be noted that all uplink traffic is assumed constant for all scenarios in FIGS. 27–29 and solely supported by the BS in each cell. In recap, the aforementioned simulation results support the claim that an asymmetric network architecture based on RDT deployments enables an increased downlink support for high-rate data users in a W-CDMA network.

According to another embodiment of the present invention born out of the above simulation results, once any enhanced UE's downlink is carried by a RDT, most or all other UEs with similar favorable path loss to the same RDT also have their downlinks carried by the same RDT to ensure the network capacity enhancements. In other words, if an RDT supports the high speed download link of an enhanced UE without supporting the downlink of another UE that is as close or closer to the RDT (i.e., the other UE's downlink remains with the BS), the result is a substantial degradation in the capacity improvement. For identification purpose, an enhanced UE herein refers to an UE with a high speed downlink request.

To illustrate the above point, consider a single-cell, single-sector network that has many UE downlinks active and is near capacity. Further assume that path loss conforms to a constant power model in the range between the UEs and the downlink transmission point. The failure mode in a macro-cell as the network attempts to support more downlink load comes about when the maximum allowable transmit power for the downlinks of the UEs on the cell edge is reached, resulting in denial of service to those UEs. Then the inquiry is whether moving a single UE downlink to an RDT lowers the interference level for other UEs at the cell edge if they are not also transferred to an RDT. If an RDT were to be used in this cell for one user, the transmit power of that particular UE downlink could be reduced by the reduction in path loss owing to the shorter range from the RDT to the UE. However, the interference generated by that downlink for all UEs beyond the RDT is largely unaffected (given the path loss model) and, in fact, likely to increase due to the loss of code orthogonality. While UEs between the base station and the RDT will realize a reduction in interference levels, the ability of the network to support the UEs at the cell edge is not improved unless those UE downlinks are also transferred to the RDT. As such, significant capacity improvements owing to the use of RDTs imply any UEs in the network with similar path loss to a RDT below some threshold, should be serviced by the same RDT. As a general rule, the additional UEs to be served by a RDT do not have to be in the same sector as the first UE so long as they have similar favorable path loss as the first UE. However, path loss generally increases as a function of distance raised to the fourth power from the point where the path loss is computed, Thus, the additional UEs tend to be in the same sector as the first UE to be close enough to achieve similar favorable path loss.

In the past, all data servicing solutions available to the network operator generally couple the uplink and downlink together. Thus, if the network operator wishes to offer a great deal of data capacity on the downlink, the network operator generally has to have the hardware in place to also service higher data capacity on the uplink. For instance, the way the W-CDMA protocol is implemented, the network operator does not necessarily have to use a high data rate on the uplink, but the hardware solutions require that the high speed data capability be implemented both ways at a higher cost. On the other hand, the RDT of the present invention is very well suited to allow a network operator to offer a high-speed-downlink-only service without the added cost of an undesired high speed uplink service.

What has been described so far is the increase in the overall network capacity irrespective of the demanded quality of service mix. One of the criteria for supporting a UE downlink from an RDT versus the central base station has been which choice resulted in a lower overall network radio frequency interference environment. As such, a paradigm was introduced that treated an RDT as an additional sector for the base station with admission and management protocols identical to those of existing sectors, with the exception of the constraints imposed by the FLM, as described earlier.

According to another embodiment of the present invention, one of the criteria for supporting a UE downlink from an RDT is whether a given UE has a downlink data rate requirement that can be more efficiently served by the RDT or the BS. The number of UEs in this category may vary considerably over time. With these criteria, having the RDTs participate in the network admission process is unnecessary and removing that capability results in lower complexity and cost for a RDT-based wireless network. Instead of "just another sector" paradigm, the existing 3G W-CDMA protocols for soft handover may be leveraged to control allocation of downlink channels to the RDTs on a dynamic basis in response to the need to offer elevated downlink data service. As is commonly understood in the art, a soft handover or a soft handoff refers to a switching of cellular transmission from one sector to another within the same BS. While the soft-handover based RDT management protocol generates duplicate transmission of dedicated physical control channels (DPCCHs) from both a BS and a RDT as an UE remains in soft-handover between the base station and the RDT, it does not generate duplicate transmission of dedicated physical data channels (DPDCHs). The DPCCH carries control information such as the pilot bits, the Transport Format Combination Indicator (TFCI) bits, the Transmission Power Control (TPC) bits. The pilot bits enable an UE synchronize to the wireless network upon powering up. The TFCI bits provide the UEs with the information about the format of the data frame coming from the DPDCH. The TPC bits command the RDTs to set their power at a certain level. The DPDCH carries actual data information to and from the UE. As demonstrated earlier, the benefit of the lower DPDCH power far outweighs the cost of higher DPCCH power at the BS.

In this embodiment, the focus is on any UE that makes a request to the wireless network for high-speed data service such as a request to download an Internet web page. The network would recognize this fact and respond to it by, if appropriate, moving that UE's downlink and having such downlink served by an RDT. Thus, in normal operating mode, every UE in a cell is served by the cell BS. A UE's downlink is served by an RDT in the cell only when the UE is an enhanced UE in a mode requiring high-speed downlink. For this switch to happen, the enhanced UE's downlink is first handed over to a RDT in the cell so that the downlink data stream, which is originally from the BS is now from the RDT. Second, any other UE in the network whose path loss is similar or less than that of the first UE is also handed over to the RDT for servicing there. The handover protocols and mechanics are now described.

Figure 30:
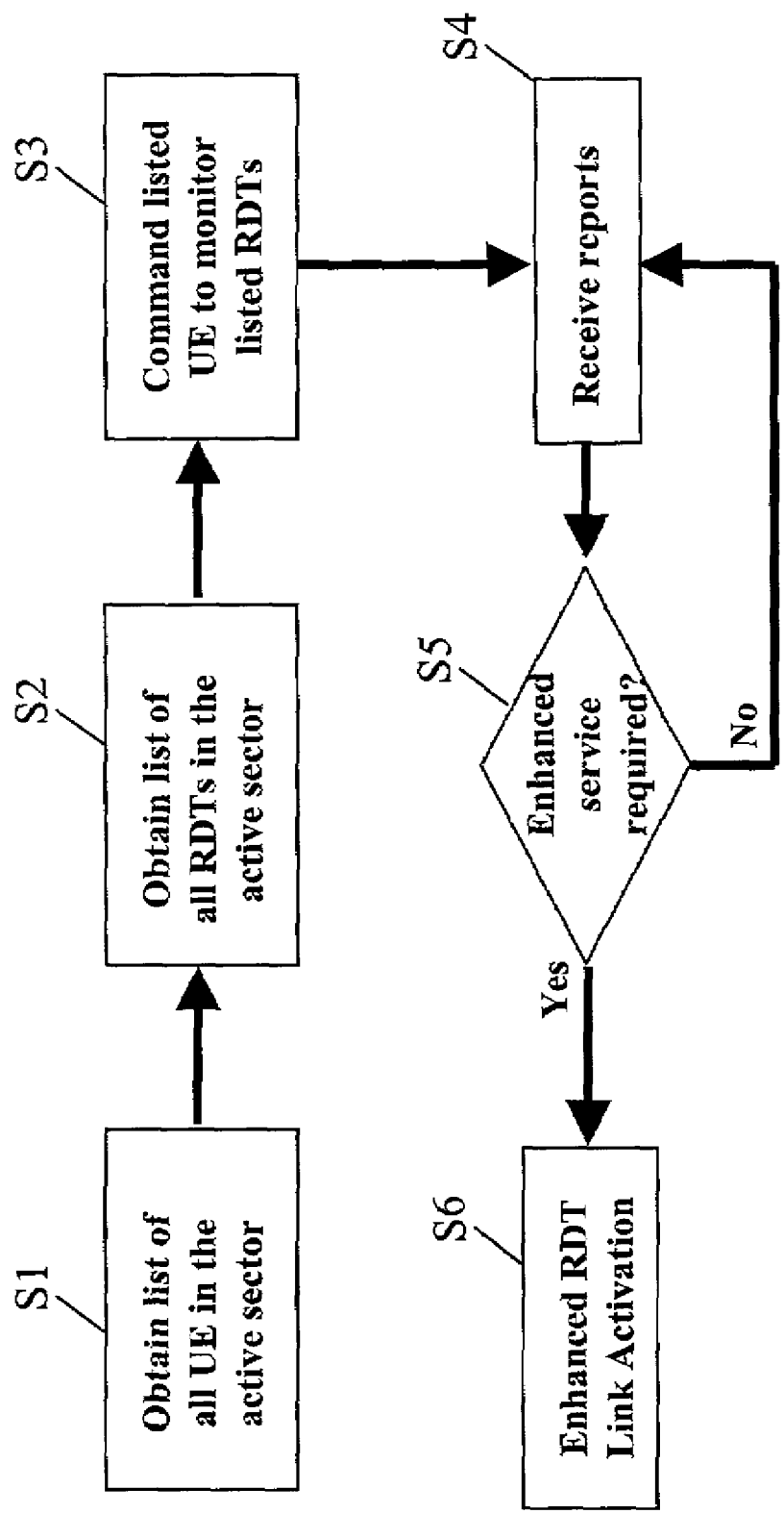
FIG. 30 shows an enhanced UE initialization process of the enhanced downlink data service, in accordance with one embodiment of the present invention.

A network layer of the wireless network, such as the network layer 780 shown in FIG. 7, will identify UEs that are, first, eligible for the enhanced data download service and, second, have established an active Internet Protocol (IP) based DPDCH. This group of subscribers will be denoted enhanced UEs or enhanced UE set members. The implementation of the enhanced downlink data service has three distinct phases: 1) enhanced UE initialization; 2) enhanced UE RDT link activation; and 3) enhanced UE downlink data transmission. The first phase, the enhanced UE initialization process, is shown in FIG. 30. This process prepares potential UEs for handover from a BS to a RDT through established W-CDMA soft handover protocols. While the UE admission process is integrally affected by the RDTs in some of the above-described embodiments of the present invention, the UE admission into the network for this embodiment is largely unaffected by the RDTs. As shown at S1 in FIG. 30, the enhanced UE initialization process first requires the wireless network that is handling the UE, such as the Universal Mobile Telecommunications System Terrestrial Radio Access Network (UTRAN), to obtain a list of all UEs, including enhanced UEs, that are turned on in the active sector. As is known in the art, the UTRAN can have additional software modules in its radio network layer to perform this function. The listed UEs may have links established with either a BS or, when a UE is powered up with immediate demand for high speed, a RDT. How the UTRAN obtains the list of active UEs in the active sector is described next.

When a UE is powered up, it searches for a pilot channel by searching for pilot bits that are constantly being emitted by base stations of the wireless network. In W-CDMA, for example, the pilot channel comprises a 256-bit code sequence that is emitted repeatedly by the base stations. Every UE of the network knows the code sequence of the pilot channel for which it is searching. It receives the pilot bits over the air, and it performs a match filter operation to compare the known code sequence with the received pilot bits and in order to locate the pilot channel. Upon finding the pilot channel, the UE then synchronizes with the emitted code sequence. Generally, the active UE will find multiple synchronizations to the known code sequence because it receives the pilot channel through multiple emissions of nearby base stations. Every time the UE tests the synchronization that lines up appropriately with the pilot channel code sequence emitted from a nearby base station, it identifies a power peak. The UE then picks the loudest power peak, i.e., the one that gives the most correlation when it is tested. Next, the UE uses the coarse timing associated with that power peak to begin the next phase of coming onto the network, which is to search on a secondary synchronization channel to get a finer timing. The UE is now synchronized with a BS of a cell in which the UE is located, with an established DPCCH with that BS, and it can then emits its own access request to that BS.

In order for a BS to hand off a UE to a RDT, the UE must be able to synchronize to the RDT's pilot and synchronization channels as well. Thus, the RDT sites will also emit pilot and synchronization channels with unique offsets and scrambling codes, as all sectors in the network do. As mentioned earlier, with the fast download implementation of the present invention, a RDT is used specifically for a UE that desires to download data at high speed. Thus, it is not desirable to have every UE to synchronize with a nearby RDT upon powering up. Accordingly, the power levels of the RDT sites are suppressed to ensure that UE access requests first appear on the random access channel (RACH) of the BS and that the UEs monitor the paging channel (PACH) of the BS instead of those of the RDTs. The RACH and PACH of a UE are used to establish links with the wireless network, wherein the RACH is used by the UE to initiate a call or request, and the PACH is used by the UE to monitor incoming calls. Each UE will transition from a power-up state to an idle, access, or dedicated channel state while served by a BS. Thus, an RDT's power level is controlled such that its transmission is not dominant to the UEs, and a UE can detect its signal emission and synchronize to it when ordered.

Referring back to FIG. 30 for the enhanced UE initialization process, at S2 the UTRAN also obtains via its base stations a list of all RDTs in the active sector, which is herein defined as a sector where an enhanced UE desires high speed download. At S3, the UTRAN sends messages via its base stations to each UE, including enhanced UEs, commanding them to add all RDTs in the active sector to an intra-frequency monitored cell list. As mentioned earlier, each UE is already served by a BS that provides it with the most powerful synchronization and monitors that link. It does not waste resources listening to other pilot channels, such as those of the RDTs, unless ordered to do so. At S3, the UTRAN ordered the UE to monitor the listed RDTs and report on the power statistics for these other links, which are generally specified as an offset to the synchronization. The individual soft handover activities described in the present invention are drawn from the 3GPP Technical Specification 25331 version 3.50, which is herein incorporated by reference in its entirely. At S4, based on UTRAN set thresholds in the UEs, the pilot signal strength at the UEs of these RDTs and BS are periodically reported to the UTRAN by the UEs, giving it continually updated reports or records of which RDT would be best suited to serve an enhanced UE if needed. The result, for instance, may be that the BS is best suited to serve the enhanced UE downlink, based on the favorable path loss between the BS and the enhanced UE; in this case, any other UEs with the same or more favorable path loss as the enhanced UE will also be served by the BS. Recall that the network layer in the wireless network, such as the UTRAN, is aware of the suppressed power levels of the RDT common channels; thus, it can accurately infer the relative path losses from the enhanced UE to the BS and RDTs. At S5, the UTRAN receives requests from the UEs and ascertains whether any enhanced UE requires an elevated downlink data rate. If the UTRAN grants the request, a radio resource controller initiates an enhanced RDT link activation process, i.e., the second phase, at S6. As known in the art, the radio resource controller is a software module in the UTRAN that determines the network resource needed to serve the UEs. The pilot strength reports of all RDTs from the enhanced UE intra-frequency monitored cell list is also passed to the enhanced RDT link activation process. As known in the art, the radio resource controller is part of a wireless network such as the UTRAN.

If the UTRAN denies the request for enhanced data service, it goes back to S4 to receiving reports as mentioned. In the enhanced UE initialization process, once a sector is active or powered up, the UTRAN is constantly performing the functions in S1 to S4. In other words, the UTRAN continually keeps track of the list of all UEs in the active sector and makes sure that those UEs are monitoring the listed RDTs in the active sector. This is to ensure that if one or all listed UEs desire the enhanced service, they can be handed off from the BSs to the appropriate RDTs. Here, it is assumed that the reports received by the UTRAN in S4 indicate that the enhanced UE is best served by one of the listed RDTs, and not by the BS. Otherwise, the enhanced UE will be continually served by the BS for all of its communication needs, and the next phase—the enhanced UE link activation process—will not be implemented.

Figure 31:
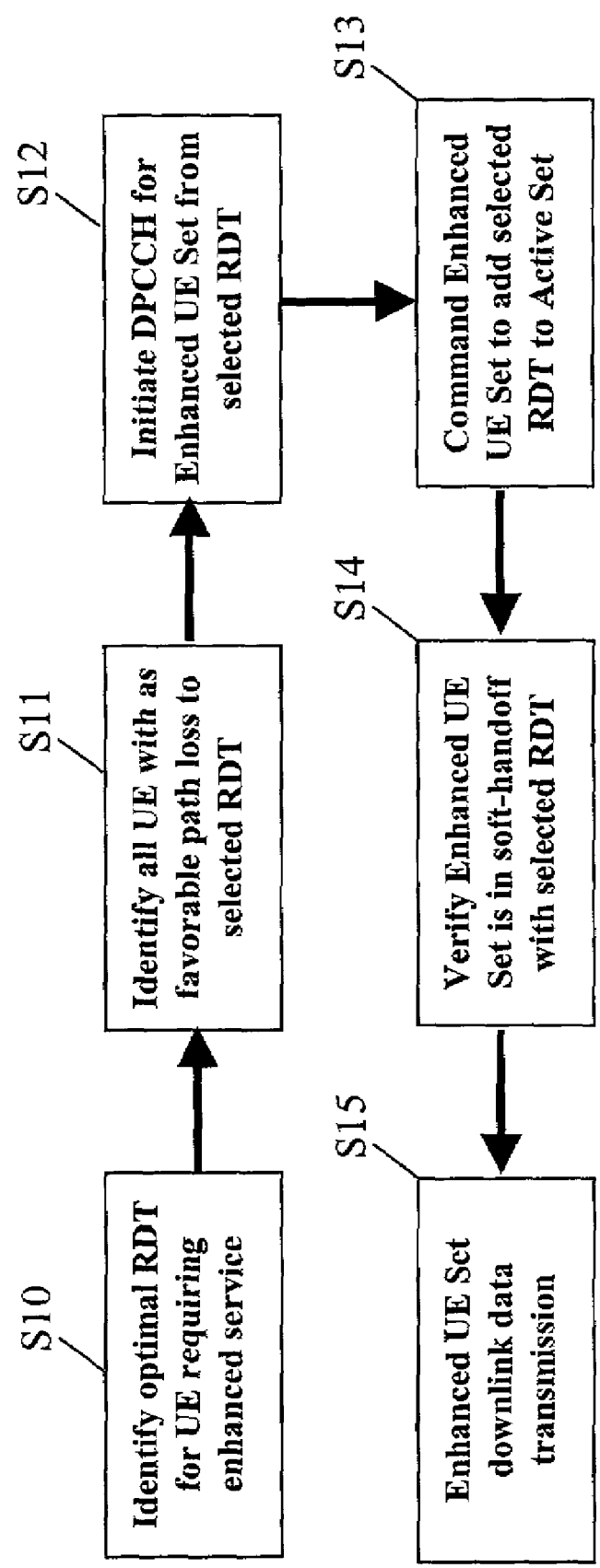
FIG. 31 shows an enhanced UE link activation process of the enhanced downlink data service, in accordance with one embodiment of the present invention.

Continuing from S6 of FIG. 30 and based on the above assumptions, FIG. 31 shows the enhanced UE RDT link activation process, which begins with a review of the reported RDT information from S4 in the first phase and the identification of UEs that desire the enhanced service from S5. At S10, based on reported pilot channel signal strength and the UTRAN assessment of the RDT availability, coupled with the identification of UEs that desire enhanced service, one RDT will be selected from the enhanced UE intra-frequency monitored cell list as the optimal RDT for providing the high rate DPDCH to each enhanced UE that requires enhanced service. At S11, based on the reported measurements of all other UEs in the sector, the set of UEs having as or more favorable path loss to the chosen RDT will be defined and grouped with the enhanced UE to form an enhanced UE Set. As mentioned earlier, this is done to ensure network capacity enhancements.

At S12, the UTRAN initiates a DPCCH for each member of the Enhanced UE Set from the selected RDT to start up the downlink. At S13, the UTRAN then commands each member of the Enhanced UE Set to add the chosen RDT to its active set, i.e., command each UE to start processing DPCCH from the chosen RDT. Thus, each UE now receives a control channel from the base station and a control channel from the selected RDT, the latter of which the UE has been monitoring all along. As prescribed in the 3GPP Technical Specification 25331 version 3.50 mentioned earlier, an UE active set comprises downlink channels currently being demodulated by that UE. At S14, upon receipt of a radio link activation command from the UTRAN, the enhanced UE, along with other UEs in the enhanced UE set, will begin demodulating the new downlink channel (DPCCH) of the selected RDT and, thus, be in soft handoff the BS to the selected RDT. For verification of the soft handoff, the enhanced UE set sends confirmation back to the UTRAN that its members are successfully receiving two control downlinks, one from the BS and the other from the selected RDT. As is understood by one skilled in the art, the downlink dedicated channels (in this case, the DPCCHs) listed in each UE active set are concurrently received, allowing the enhanced UE set members to implement Rake reception algorithms and downlink data transmission to receive and distinguish the DPCCHs. Furthermore, the UTRAN can independently control the power of the two links and can, for example, completely turn off the power of one of the DPCCHs. At S15, once the soft-handoff and control downlinks are established for the enhanced UE and other members of the UE enhanced UE set, downlink data transmission can occur. Pilot channel timing information between the monitored downlinks of RDTs and the BS are reported to the UTRAN by the enhanced UE and used to offset the timing of each link to enable coherent combining. Initially, only a DPCCH will be transmitted from the RDT. The transmission of DPDCH from the RDT to the enhanced UE is described next.

Figure 32:
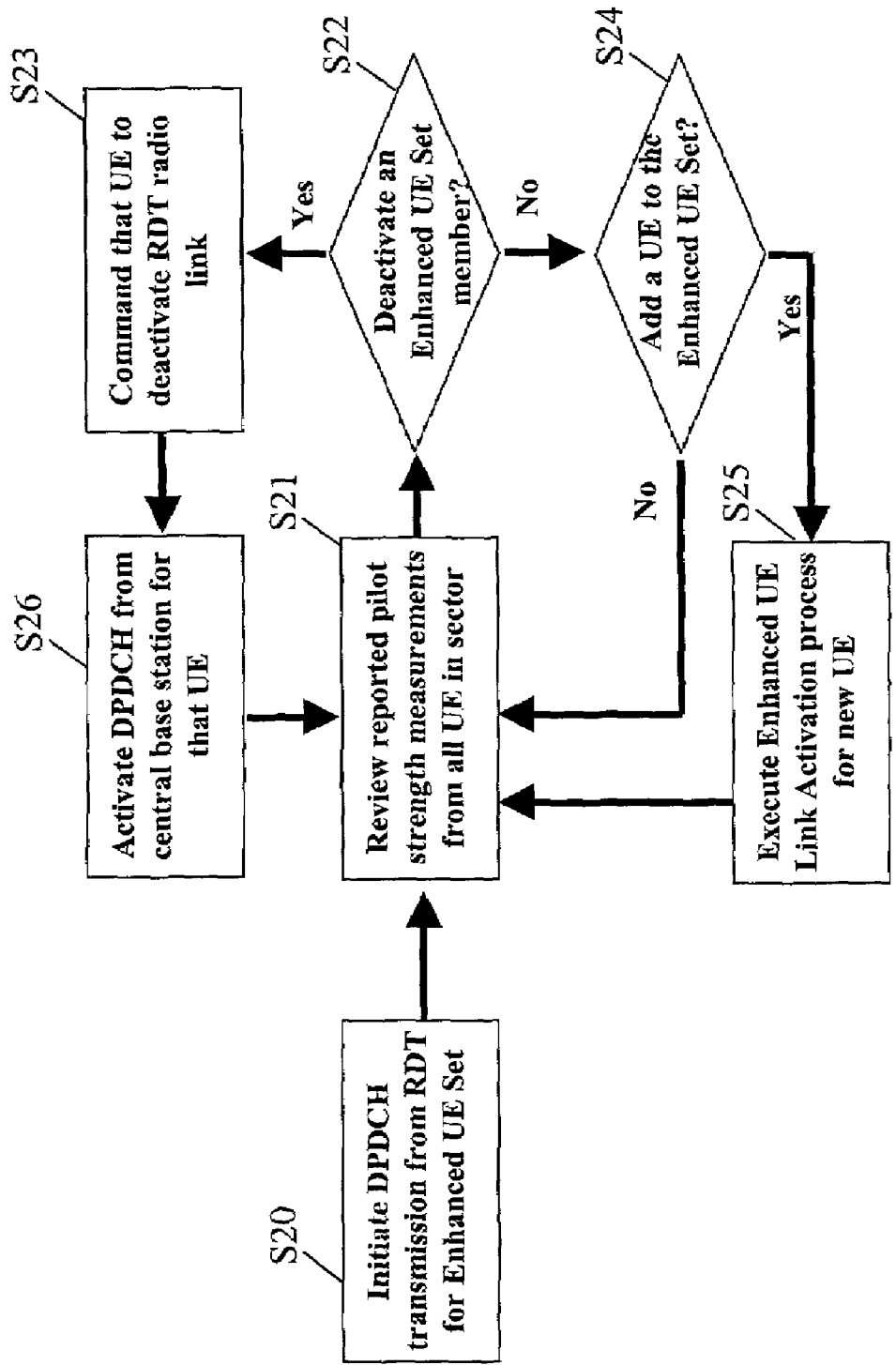
FIG. 32 shows an enhanced UE downlink data transmission process of the enhanced downlink data service, in accordance with one embodiment of the present invention.

Continuing from FIG. 31, the final phase of the enhanced downlink data service, i.e., the enhanced UE downlink data transmission process, is shown in FIG. 32. This process takes into account of the changes that may be happening over time in an active sector. For instance, an enhanced UE may be traveling from one area to another, and BS or RDT assignments need to be changed to accommodate an enhanced data link to the enhanced UE as it moves about. This process is implemented at S20 by activation of a DPDCH from the RDT to initiate DPDCH transmission from RDT for the enhanced UE and the enhanced UE set as a whole. The site selection diversity power control protocol, as described in 3GPP Technical Specification 25.922 version 3.10 and, as indicated earlier, herein incorporated by reference in its entirety is used to ensure that only a DPDCH with non-zero transmit power is the one transmitted by the RDT. To that effect, the site selection diversity power control protocol is used for commensurate suppression of the DPDCH from the BS to terminate the data channel from the base station to the enhanced UE. Thus, the DPDCH from the BS is terminated. An additional DPCCH is active between the RDT and the enhanced UE to leverage the soft-handoff protocols; i.e., all BSs in the active set must keep a DPCCH active for the enhanced UE set during the handoff event. Given the high spreading factor (256) of the control channel and lower signal-to-interference-plus-noise ratio requirements, the increased interference in the network is less than a single additional voice DPDCH. Furthermore, once the handoff is completed, the network layer of the UTRAN can command each member of the enhanced UE set to transition the BS from an UE active set to its monitored set to enable future inclusion or exclusion of UEs from the enhanced UE set.

Referring back to FIG. 32 for the enhanced UE downlink data transmission process, at S21 the UTRAN reviews reported pilot signal strength measurements from all UEs in the sector based on DPCCH transmission from RDTs and the central base station for the enhanced UEs in the sector, as received in S4 (FIG. 30). This is to determine whether a member of the enhanced UE set has moved beyond an area that is served by a particular BS or RDT and thus should be excluded from the enhanced UE set for that particular RDT. To remove a UE from an enhanced UE set, i.e., for UE exclusion, there is an affirmation to deactivate an enhanced UE set member at S22. This happens when the selected RDT is no longer considered optimal, based on path loss and pilot signal strength, for the UE to be removed or excluded. At S23, the particular UE set member is then commanded by the UTRAN to deactivate the RDT radio link and remove that RDT from the listed RDTs obtained in S2 of the first phase (FIG. 30). The DPDCH from the RDT is thus deactivated. Nevertheless, as mentioned earlier, the control channels or DPCCHs from both the BS and the RDT are continually received by the UE to enable the latter to move back and forth between the base station and the RDT. At S26, the DPDCH from the BS is then initiated or activated for that UE. If the UE travels outside of the cell that is being serviced by one BS, the same handoff procedure is performed by the UTRAN to activate a DPDCH from either another BS or another RDT in the cell which the UE is entering.

For UE inclusion, there is a negative response to the deactivation of an enhanced UE at S22. At S24, there is an inquiry as to whether to add any additional UE to the enhanced UE set. As mentioned earlier, an UE is added to the enhanced UE set when it desires an enhanced service of high speed data downlink, or when it has the same or more favorable path loss as one of the UEs already in the enhanced UE set. If there is an affirmative answer to the inquiry, an enhanced UE Link activation process for a new UE is executed at S25, as explained earlier with reference to FIG. 31. If there is a negative answer to the inquiry, no UE is added and the UTRAN continues to monitor the reported pilot strength measurements of existing UEs in each sector at S21. Because the UTRAN continually gets path loss estimates and a variety of other information from all UEs using the network, it continually goes through a process of deciding which UE should be served by the RDT and puts that UE in soft handoff to the RDT. Thus, the process does not require the UEs to be in the same sector. The network can survey the UEs in all sectors served by the BS.

In recap, the invention provides at least an inventive methodology for control of RDT resources by a wireless network, such as the UTRAN, that is optimally suited for selective support of asymmetric data links for a few enhanced UEs. The approach has minimal impact on the network admission procedures and leverages established soft-handover protocols to accomplish all the necessary RDT control. By removing the need for RDTs to participate in the network admission process, RDT complexity is reduced, and long-term cost saving is achieved. As understood in the art, the use of existing W-CDMA soft handoff protocols to provide dynamic allocation of enhanced UE downlink data channels to the RDT may be implemented via vendor-specific alterations to the existing radio resource control algorithm in the UTRAN. Most, if not all, of the required functionality is defined in the industry standard protocols embodied in the 3GPP specifications.

According to another embodiment of the present invention, there is provided a system and method for a wireless network having at least one controlling BS and a RDT, whereby the BS sends control information to the RDT which, in turn, directly acquires data requested by the subscriber through a local data network connection, such as a local Internet connection. As shown earlier, any network architecture employing RDTs does so by carefully controlling the required data flow between the BS and the RDTs. This desire stems from the high recurring cost of leased data lines for the BS-to-RDT link, several implementations which have been described earlier. While the information contained in the control channel (DPCCH) must flow directly from the base station to the RDT with low latency, there is a great deal of redundancy in this data stream. Specifically, the pilot bits and the TFCI bits of the DPCCH may remain constant for numerous frames. The TPC bits, however, must change with each slot but that only requires 1.5 kbps. Sustaining the data in the DPDCH, then, clearly levies the largest load on the link requirements between the BS and the RDT. That load, however, may be removed from the dedicated BS-to-RDT link if the data is derived from the global Internet.

Figure 33:
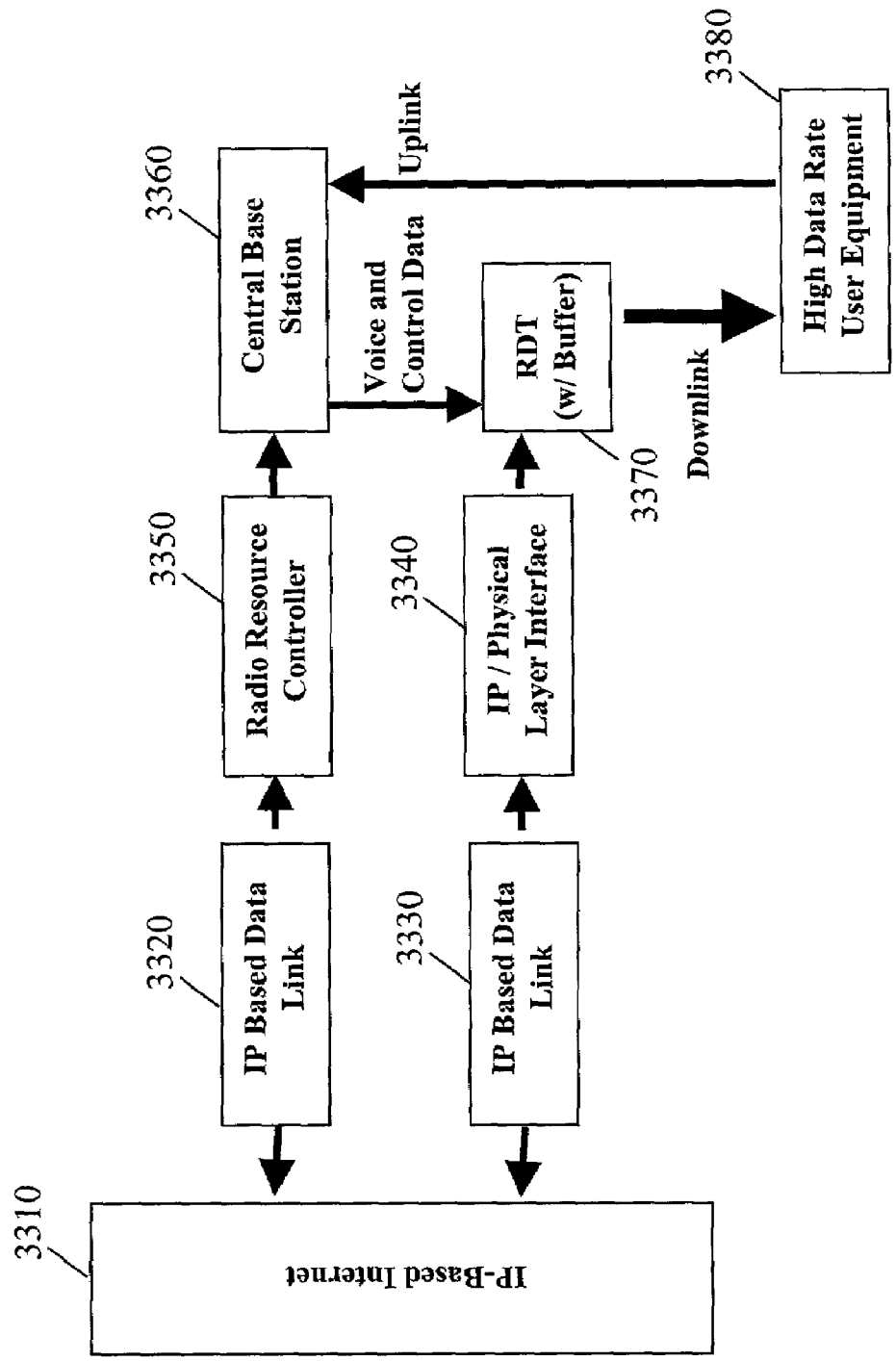
FIG. 33 shows a wireless network for enhanced downlink data service with a direct Internet-to-RDT link, in accordance with one embodiment of the present invention.

FIG. 33 shows a wireless network designed to enable an RDT to retrieve data for an IP-based DPDCH directly from the Internet, in accordance with an embodiment of the present invention. Here, alterations to the above-described embodiments of the present invention are made to support a direct link from RDTs to the Internet. First, the RDT 3370 contains both a physical layer/IP interface 3340 and sufficient processing resources to encode received IP packets into a DPDCH. Second, the RDT 3370 also has a data buffer to match the variable arrival rate of IP packets to the fixed downlink data rate to UEs. Third, the RDT includes a physical IP-based data link 3330 to the Internet 3310. This link can be a phone line with a modem, a DSL, a T1 line, or even a wireless connection. In short, the link can be any past, present, or future communication link suitable for providing IP-based connection between the RDT and the Internet. Fourth, the radio resource controller of the wireless network also includes a communication link 3320 to the Internet that is similar to link 3330. Both links 3320 and 3330, however, need not meet the low latency and high reliability requirements of the direct BS-to-RDT link. That conclusion is based on the lower priority of web-based services, as described in section 6 of 3GPP Technical Specification 25.922 version 3.10 mentioned earlier. As such, the cost per bps of links 3320 and 3330 are substantially lower than that of the core BS-to-RDT link to the base station. Finally, the network layer of the wireless network can handle the variable IP packet arrival rate from the Internet 3310 and route incoming IP packets for enhanced UE to the appropriate RDT 3370. If each RDT has a presence on the Internet, i.e., given an IP address, this task is simplified as standard existing public IP-based networks and routers may be leveraged. As an example, suppose an RDT were to support a single 384 kbps downlink in each of its two sectors. As noted earlier, the RDT must also support a subset of the sectors' voice channels from other UEs with same or more favorable path loss if the capacity gains are to be realized. A conservative estimate of those UE would be an additional 20 voice channels. In this case, the core BS-to-RDT link needs to support no more than 200 kbps (e.g., an inexpensive digital subscriber line) with 768 kbps incoming on the low-cost Internet connection. The combined effect is nearly an additional 1 Mbps capacity for the cell. While there is an establishment of a second data link connection at the RDT (i.e., the Internet-to-RDT link) in accordance to this embodiment of the present invention, the reduction of data rate requirements for the low latency, high reliability core link coupled with the lower cost (owing to less stringent latency and reliability requirements) of the second link combine to improve the cost effectiveness of using RDTs to provide an asymmetric data rate service for W-CDMA networks.

Figure 34:
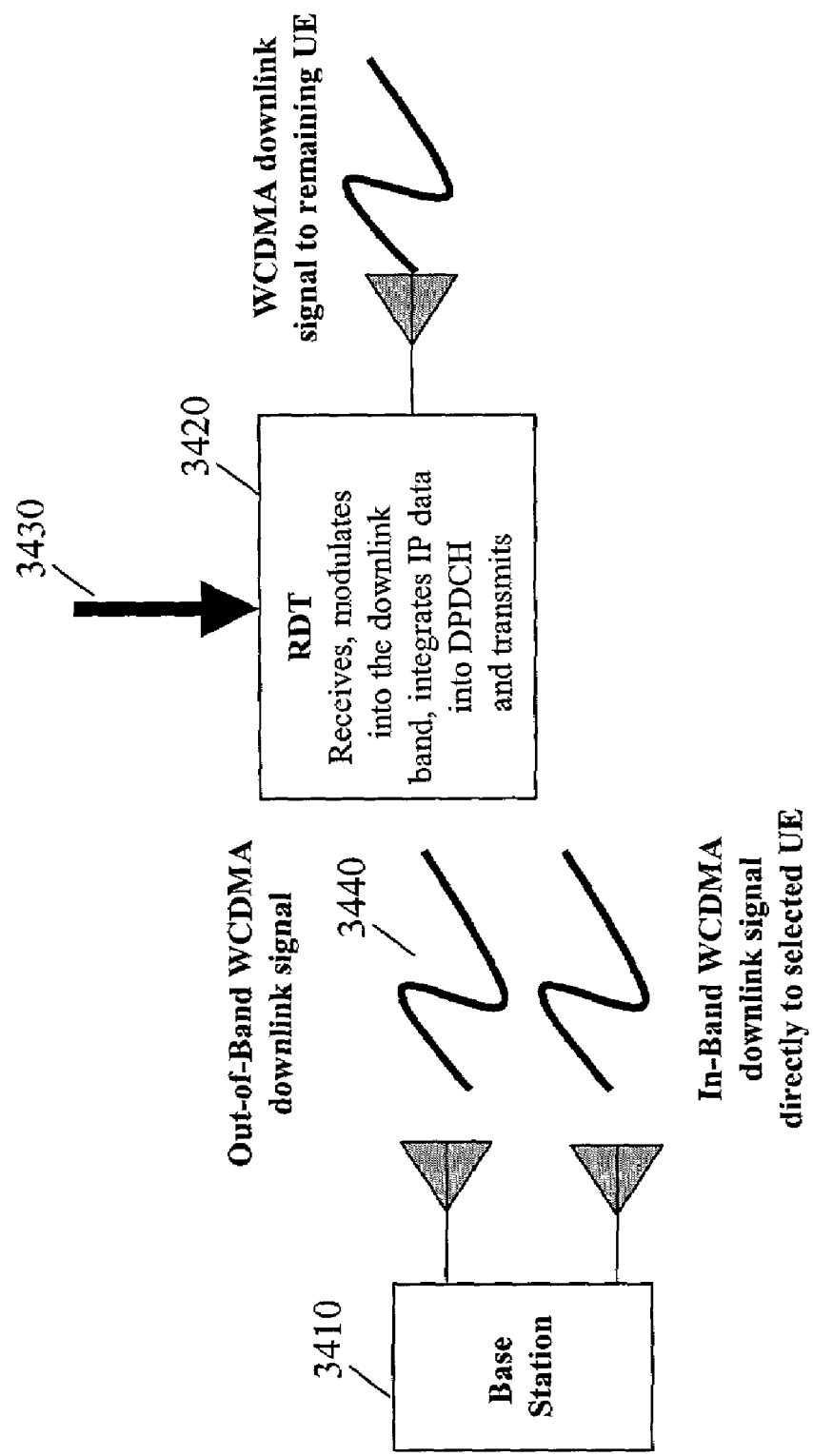
FIGS. 34–37 show the wireless network shown in FIG. 33 with various design variants on the BS-to-RDT core link, in accordance with one embodiment of the present invention.
Figure 35:
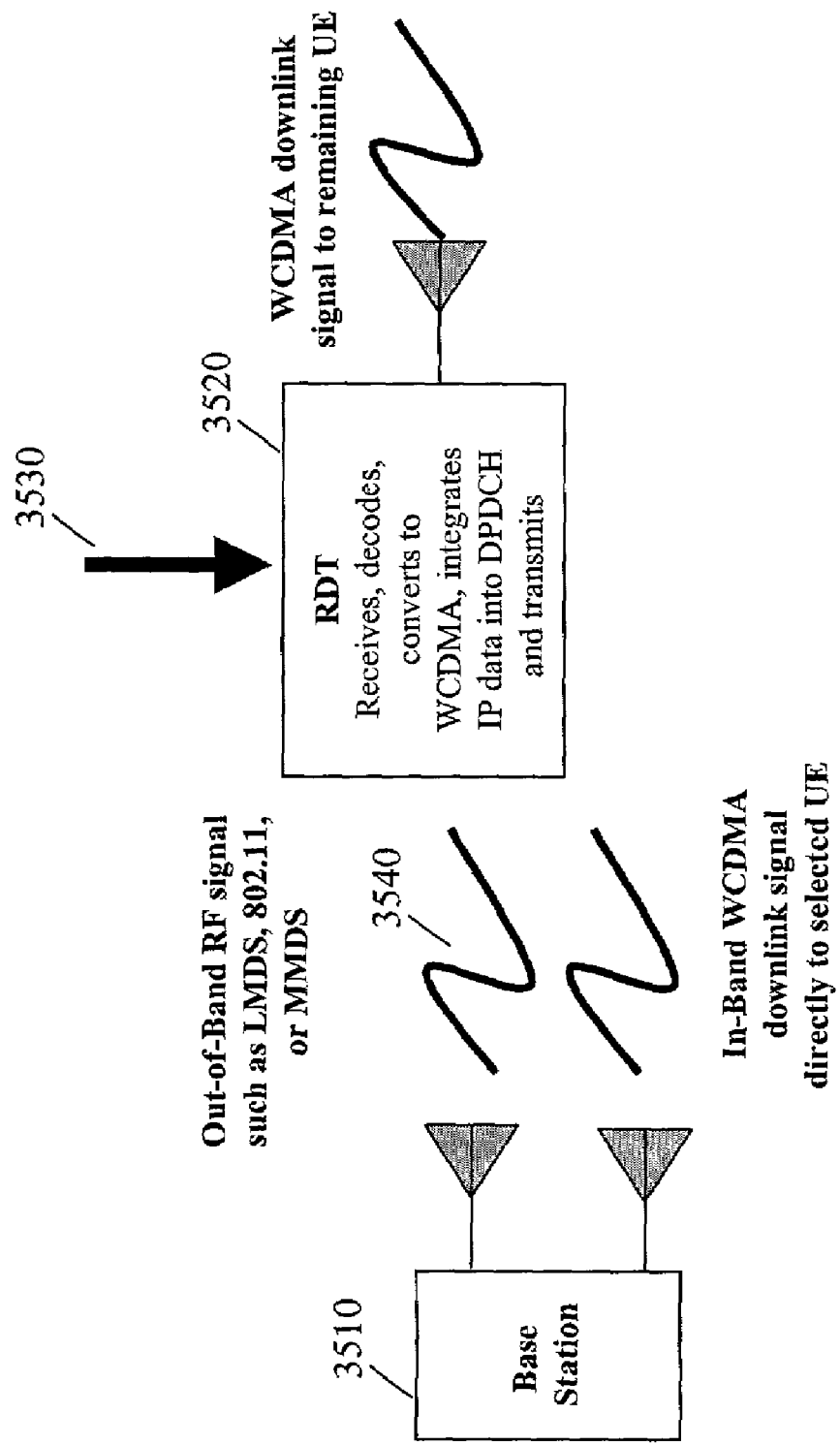
Figure 36:
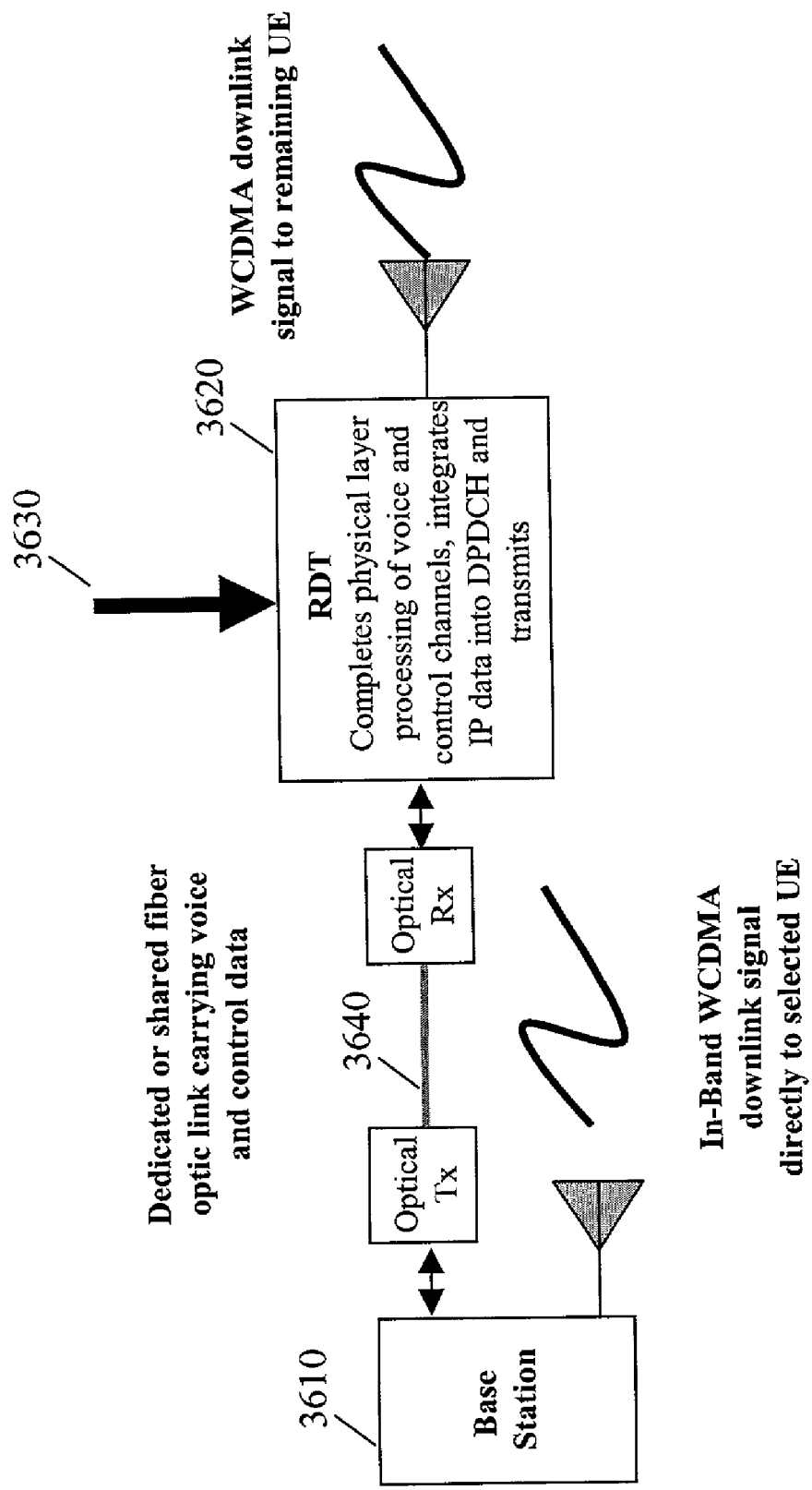
Figure 37:
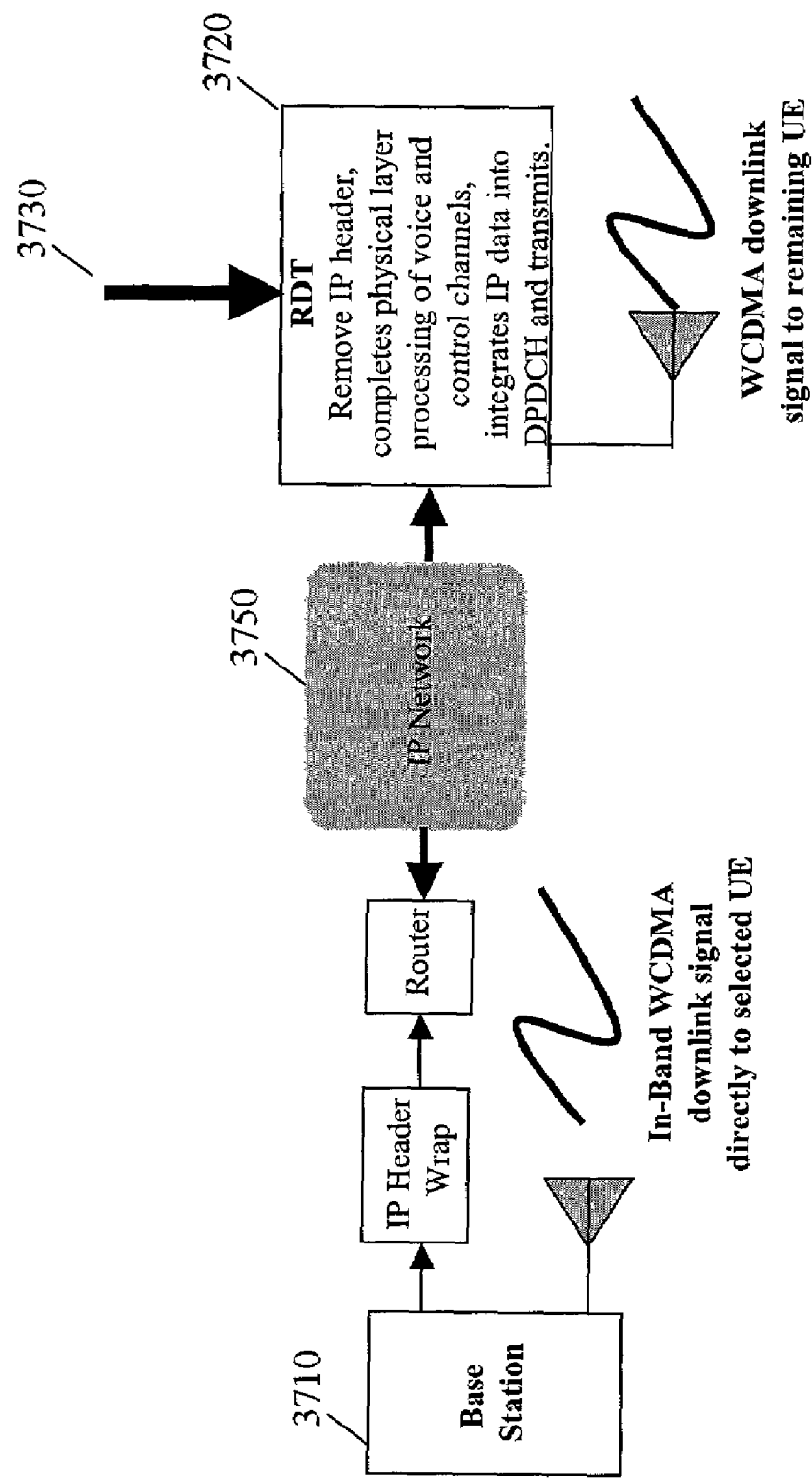

For implementation, FIGS. 34–37 show various BS-to-RDT link configurations similar to those shown in FIGS. 22–25 and similarly described. The key features are the provisioning of selected IP-based DPDCH directly from the Internet via a moderate latency, moderate reliability communication link and the various options for conveying the remaining voice and control channel information from the BS to the RDT. In FIG. 34, the complete downlink signal for the voice and control channels is generated by the BS 3410 and transmitted via an out-of-band RF signal link, such as W-CDMA signal, to the RDT 3420 at the remote site. At the remote site, this signal is received, modulated into the downlink frequency band, summed with the constructed IP DPDCH frames received directly from the Internet at 3430 and transmitted to the UE. In FIG. 35, the output from the scrambling module of each BS 3510 for the voice and control channels is transmitted via an out-of-band RF link, such as LMDS or 802.11 or MMDS, to the RDT 3520 at the remote site. At the remote site, the signal is received, decoded, modulated into a W-CDMA signal, summed with the constructed IP DPDCH frames received directly from the Internet at 3530 and transmitted to the UE. In FIG. 36, the data flow at any point in the physical layer processing for selected voice and control channels is carried via an available optical fiber transmission link 3640 from the BS 3610 to the RDT 3620. Any contiguous portion of the processing steps from the convolutional encoding to the scrambling may be performed at the BS 3610 with the remainder executed at the RDT 3620. The information needed for any IP-based DPDCH transmitted from the RDT is provisioned via a direct Internet connection 3630. In FIG. 37, the data flow at any point in the physical layer processing for the voice and control channels is carried via an available low latency, highly reliable IP network 3750 (dedicated or shared). Any contiguous portion of the processing steps from the convolutional encoding to the scrambling may be performed at the BS 3710 with the remainder executed at the RDT 3720. The information needed for any IP-based DPDCH transmitted from the RDT is provisioned via a moderate latency, moderate reliability, direct Internet connection 3730.

When the direct Internet-to-RDT scheme is implemented, there is no longer a requirement for the BS-to-RDT core link to support the DPDCH for an enhanced UE. The core link is then left with supporting other communication, such as the RDT specific health monitoring data, common channel control information (e.g. pilot strength), DPCCH bits for each enhanced UE supported by the RDT, and the DPDCH and DPCCH, including voice channels and control information, of all other UEs in the enhanced UE set. According to one embodiment of the present invention, all of these voice transport channels and control information required by the RDT to create assigned dedicated physical channels (DPCHs) may be transmitted over a DPDCH on the downlink from the BS. In other words, such information can be transmitted to the RDT over the air with an "in-band" RF link and relayed out to the UEs. As a result, the BS is relieved of the information load. This allows an additional downlink load to be served by the BS and the network. As shown earlier, however, if the provisioning of that information is accomplished using an "in-band" RF link, coverage is enhanced but network capacity may not increase. Such an approach is the basis of the Orthogonal Division Multiple Access (ODMA) protocol described in the 3GPP Technical Report 25.924 version 1.0.0. In an embodiment of the present invention, a hybrid approach between ODMA repeaters and RDTs, herein referred to as a partial-RDT, is disclosed as a means to further lower the cost of an RDT implementation while still offering a capacity increase.

In a partial-RDT, the core link between the base station and the RDT (BS-to-RDT link) is eliminated altogether and replaced with a DPDCH, or other suitable low latency, high reliability in-band RF link, between the BS and the RDT. This results in additional cost saving for the network operators. From the standpoint of the BS, the RDT is now treated as another UE for purposes of acquiring any information needed directly from the BS. From the standpoint of the UEs, the RDT functions as a repeater to extend network coverage but not capacity. To increase capacity, the information required to generate the DPDCH of the enhanced UE may be provided through the Internet over a moderate latency, moderate reliability Internet-to-RDT communications link, as explained earlier. While the additional network capacity offered by a partial-RDT is reduced as compared to a full RDT by data carried over the in-band link, the potentially substantial data derived from the direct Internet connection of the RDT remains as additional network throughput or capacity, when compared to architectures with no RDTs. The incremental cost of implementing a partial RDT architecture is the need to include a capability at the RDT to receive, demodulate, and regenerate the DPCHs (i.e., both the DPDCH and the DPCCH) carried on the in-band link. That capability, however, replaces whatever core link reception hardware exists in the full RDT system, and the high cost associated with it.

Figure 38:
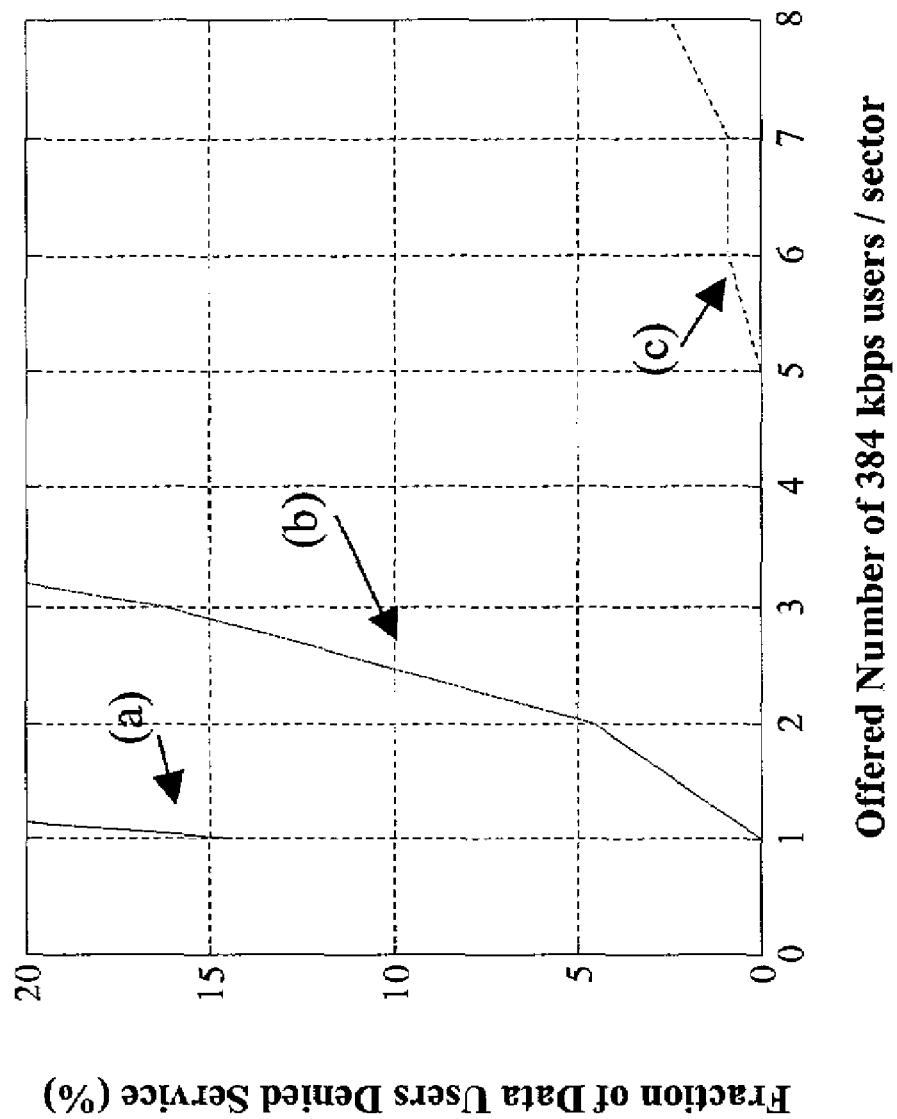
FIG. 38 shows the simulation results of a wireless network having a partial-RDT architecture, in accordance with one embodiment of the present invention.

The capacity improvement of the partial-RDT architecture is verified via the same simulation explained earlier with reference to FIGS. 26–29, including the parameter that the downlinks of all voice and control channels of other members of the enhanced UE set supported by the RDT are also transmitted over-the-air on additional downlinks between the BS and the RDT. The ability of a partial-RDT architecture to support high data rate downlinks is illustrated through the simulation results shown in FIG. 38. Using the network shown in FIGS. 26A–B and parameters consistent with a nominal W-CDMA network per a 3GPP specification, the fraction of high data users denied service as a function of offered high data rate users is given for a baseline network, a 1 RDT/sector network, and a 2 RDT/sector network. The underlying voice loading condition is assumed to be relatively medium with 40 voice channels per sector. Compared to FIG. 28, FIG. 38 shows the performance loss is slight for a 1 RDT/sector network, as shown by line (a), and negligible for a 2 RDTs/sector network, as shown by line (b).

Consequently, the flexibility of implementing partial-RDTs or full RDTs allow network operators to optimally employ an RDT architecture that best accounts for the cost of leased data connections in the region where the network is located. While a partial-RDT architecture increases the potential network capacity by a smaller amount, the cost savings of eliminating a leased low latency, high reliability data connection while offering an asymmetric data rate service combine to further improve the cost effectiveness of an RDT-based solution for network operators.

Figure 39:
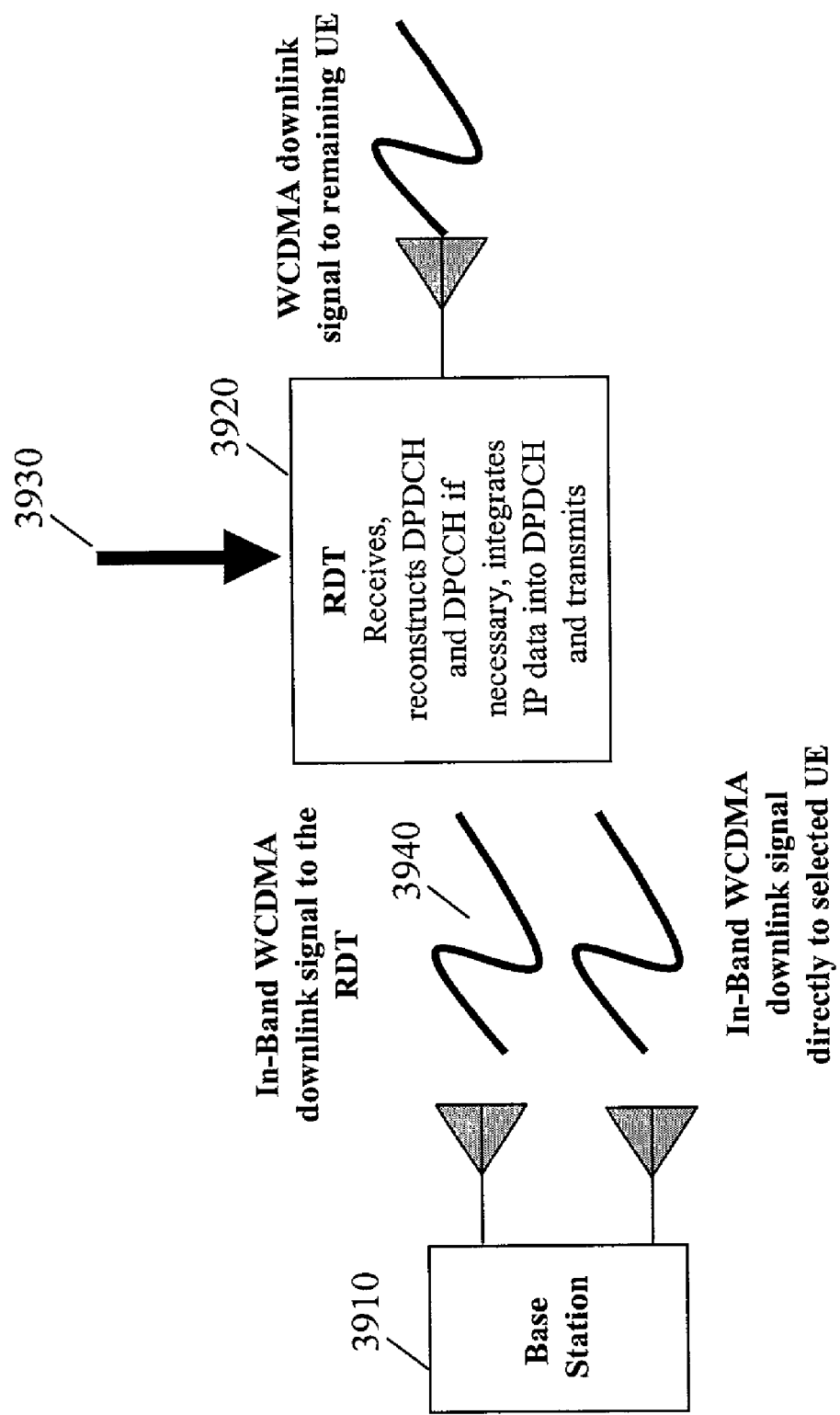
FIG. 39 shows a wireless network with a partial-RDT architecture, in accordance with one embodiment of the present invention.

For implementation of the partial-RDT scheme, FIG. 39 shows a BS-to-RDT link configuration 3940 wherein downlink signals are carried via in-band W-CDMA. The voice and control channels are transmitted as downlink DPCH to the RDT 3920. The channels may be separate with unique spreading codes or the data may be multiplexed into a single, high rate DPDCH. At the RDT 3920, the signal is received, converted (if necessary) into appropriate DPDCH and DPCCH, summed with the constructed IP DPDCH frames received directly from the Internet at 3930 and transmitted to the appropriate UEs.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. Furthermore, any means-plus-function clauses in the claims (invoked only if expressly recited) are intended to cover the structures described herein as performing the recited function and all equivalents thereto, including, but not limited to, structural equivalents, equivalent structures, and other equivalents.

The invention claimed is:

1. A method for increasing user capacity and high speed data service of wireless communication network comprising the steps of:
 receiving at a base station of the network an uplink communication signal from a first user of the network, wherein the uplink communication signal includes a request for data download;
 determining whether the uplink communication signal further includes a request for a high-speed data service;
 processing the uplink communication signal;
 if the uplink communication signal does not include a request for a high-speed data service, providing the requested data download from the base station directly to the first user;
 if the uplink communication signal includes a request for a high-speed data service, providing the requested data download from a remote emitter directly to the first user;
 determining a first path loss from the first user to the remote emitter;
 detecting a second user of the network;
 determining a second path loss from the second user to the remote emitter;
 if the second path loss is equal to or less than the first path loss, directly providing data download from the remote emitter to the second user; and
 if the second path loss is greater than the first path loss, directly providing data download from the base station to the second user.

2. The method of claim 1, wherein the high-speed data service comprises high-speed data download from the network to the first user.

3. The method of claim 1, further comprising:
 providing a communication link between the base station and the remote emitter.

4. The method of claim 3, wherein the communication link comprises an out-of-band radio frequency (RF) communication link.

5. The method of claim 3, wherein the communication link comprises a landline connected communication link.

6. The method of claim 3, wherein the communication link comprises an internet protocol (IP) network.

7. The method of claim 3, wherein the communication link comprises an in-band RF link.

8. The method of claim 1, wherein providing the requested data download from the remote emitter directly to the first user comprises:
providing the requested data download from a data network to the first user via a direct communication link between the data network and the remote emitter.

9. A method for a providing a wireless communication network with increased user capacity and enhanced high speed data service, comprising:
providing a base station for serving a designated area of the network;
providing a plurality of remote emitters associated with the network;
detecting a plurality of user equipments (UEs) active in the network;
obtaining a first list of UEs, from the detected UEs, that are active in the designated area;
obtaining a list of one or more remote emitters, from the plurality of remote emitters, that is serving the designated area;
commanding the first-listed UEs to monitor the listed one or more remote emitters;
receiving reports from the detected UEs indicating a path loss between each one of the detected UEs and each one of the base station or remote emitters;
determining whether any of the first-listed UEs desires an enhanced high speed data service; and
if one of the listed UEs desires an enhanced high speed data service, designating the one UE as an enhanced UE and establishing a data link between the enhanced UE and the base station or one of the listed remote emitters with the most favorable path loss to the enhanced UE.

10. The method of claim 9, wherein establishing the data link between the enhanced UE and the base station or one of the listed remote emitter comprises:
identifying one of the listed remote emitter as an optimal remote emitter with the most favorable path loss to the enhanced UE for serving the enhanced UE;
identifying a second list of UEs, from the detected UEs, with the same or more favorable path loss to the optimal remote emitter;
grouping the enhanced UE and the second-listed UEs into an enhanced UE set;
initiating a control channel for UEs of the enhanced UE set from the optimal remote emitter;
commanding the UEs of the enhanced UE set to process the control channel from the optimal remote emitter and be served by the optimal remote emitter;
verifying that the optimal remote emitter is serving the UEs of the enhanced UE set; and
providing downlink data transmission to the UEs of the enhanced UE set directly from the optimal remote emitter.

11. The method of claim 10, wherein commanding the UEs of the enhanced UE set to process the control channel from the optimal remote emitter and be served by the optimal remote emitter comprises:
providing a control channel to the UEs of the enhanced UE set from the base station while concurrently providing the control channel to the UEs of the enhanced UE set from the optimal remote emitter.

12. The method of claim 11, wherein power of the control channel from the base station and power of the control channel from the optimal remote emitter may be independently controlled.

13. The method of claim 11, wherein verifying that the optimal remote emitter is serving the UEs of the enhanced UE set comprises:
receiving verification that the UEs of the enhanced UE set are receiving control channels from both the base station and the optimal remote emitter.

14. The method of claim 10, wherein providing downlink data transmission to the UEs of the enhanced UE set directly from the optimal remote emitter comprises:
initiating a data channel to the UEs of the enhanced UE set from the optimal remote emitter;
suppressing a data channel to the UEs of the enhanced UE set from the base station; and
reviewing the reports received from the detected UEs indicating the path loss between the one of the detected UEs and the each one of the base station or remote emitters.

15. The method of claim 14, further comprising:
removing a UE from the enhanced UE set based on the received reports; and
adding a UE to the enhanced UE set based on the received reports.

16. The method of claim 14, further comprising:
adding a UE to the enhanced UE set based on the received reports.

17. The method of claim 14, further comprising:
removing a UE from the enhanced UE set based on the received reports.

18. The method of claim 17, wherein removing the UE from the enhanced UE set comprises:
deactivating the downlink data transmission from the optimal remote emitter to the removed UE.

19. The method of claim 18, wherein removing the UE from the enhanced UE set further comprises:
activating the downlink data transmission directly from the base station to the removed UE.

20. The method of claim 18, further comprising:
providing another base station for serving another designated area of the network; and
wherein removing the UE from the enhanced UE set further comprises activating the downlink data transmission directly from the another base station to the removed UE.

21. The method of claim 18, further comprising:
identifying another remote emitter, from the plurality of remote emitters associated with the network, that is serving another designated area of the network; and
wherein removing the UE from the enhanced UE set further comprises activating a downlink data transmission directly from the another remote emitter.

22. The method of claim 9, wherein establishing the data link between the enhanced UE and the base station or one of the listed remote emitter comprises:
identifying the base station as optimal with the most favorable path loss to the enhanced UE for serving the enhanced UE; and providing downlink data transmission to the enhanced UE directly from the base station.

23. The method of claim 9, wherein the received reports from the detected UEs indicating a path loss comprise reports indicating strength of pilot channel signals received by each of the detected UEs from each of the base station and remote emitters.

24. The method of claim 23, wherein the strength of pilot channel signals from the remote emitters are suppressed with respect to the pilot channel signals from the base station.

25. The method of claim 9, further comprising:
 initiating a control channel for the enhanced UE from the optimal remote emitter; and
 providing downlink data transmission to the enhanced UE directly from the optimal remote emitter.

* * * * *

UNITED STATES PATENT AND TRADEMARK OFFICE
CERTIFICATE OF CORRECTION

PATENT NO. : 7,061,891 B1  Page 1 of 1
APPLICATION NO. : 09/953157
DATED : June 13, 2006
INVENTOR(S) : Daniel B. Kilfoyle, Travis H. Slocumb, III, and Steven Carson It is certified that error appears in the above-identified patent and that said Letters Patent is hereby corrected as shown below:

On Title Page
IN THE REFERENCES CITED item (56) - OTHER PUBLICATIONS -

Please add:

International Search report for Application No. PCT/US01/45663, dated April 18, 2002 (mailing date).

"3G TR 25.922 V. 3.1.0 (2000-03) - $3^{rd}$ Generation Partnership Project; Technical Specification Group Radio Access Network; Radio Resource Management Strategies (Release 1999)," Copyright 2000, 59 pp.

"3GPP TS 25.331 V. 3.5.0 (2000-12) - $3^{rd}$ Generation Partnership Project; Technical Specification Group Radio Access Network; RRC Protocol Specification (Release 1999)," Copyright 2000, 158 pp.

"3G TR 25.942 V. 2.2.1 (1999-12) - $3^{rd}$ Generation Partnership Project; Technical Specification Group (TSG) RAN WG4, RF System Scenarios," Copyright 1999, 97 pp.

"3G TR 25.924 V. 1.0.0 (1999-12) - $3^{rd}$ Generation Partnership Project; Technical Specification Group Radio Access Network; Opportunity Driven Multiple Access (3g TR 25.924 version 1.0.0)," Copyright 1999, 13 pp.

Signed and Sealed this

Twenty-ninth Day of August, 2006

JON W. DUDAS
*Director of the United States Patent and Trademark Office*